US012738004B2

(12) United States Patent
Taïeb et al.

(10) Patent No.: US 12,738,004 B2
(45) **Date of Patent: *Sep. 15, 2026**

(54) LIMITED LUMINANCE MOTION BLUR REDUCTION

(71) Applicant: GoPro, Inc., San Mateo, CA (US)

(72) Inventors: Yoël Taïeb, Paris (FR); Thomas Crozier, Vanves (FR)

(73) Assignee: GoPro, Inc., San Mateo, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 19/320,440

(22) Filed: Sep. 5, 2025

(65) Prior Publication Data

US 2026/0004539 A1 Jan. 1, 2026

Related U.S. Application Data

(63) Continuation of application No. 17/941,115, filed on Sep. 9, 2022, now Pat. No. 12,423,936.

(51) Int. Cl.
*G06V 10/141* (2022.01)
*G06T 5/94* (2024.01)
*G06V 10/60* (2022.01)

(52) U.S. Cl.
CPC .............. *G06V 10/141* (2022.01); *G06T 5/94* (2024.01); *G06V 10/60* (2022.01);
(Continued)

(58) Field of Classification Search
CPC ........ G06V 10/141; G06V 10/60; G06T 5/94; G06T 2207/10016; G06T 2207/10144; G06T 2207/10152
See application file for complete search history.

(56) References Cited

U.S. PATENT DOCUMENTS 9,167,174 B1 10/2015 Rivard
2009/0324074 A1* 12/2009 Dembo .................... H04N 5/20 382/168

(Continued)

FOREIGN PATENT DOCUMENTS

WO WO-2016157839 A1 * 10/2016 ........... H04N 21/431

OTHER PUBLICATIONS

S. Garmer, S. Hold, A. Kummert, U. lurgel and M. Meuter, "Multi-exposure image acquisition for automotive high dynamic range imaging," 13th International IEEE Conference on Intelligent Transportation Systems, Funchal, Portugal, 2010, pp. 1881-1886, doi: 10.1109/ITSC.2010.5625024. (Year: 2010).*

*Primary Examiner* — Chan S Park
*Assistant Examiner* — Paulo Andres Garcia
(74) *Attorney, Agent, or Firm* — Young Basile Hanlon & MacFarlane, P.C.

(57) ABSTRACT

Adaptive acquisition control including limited luminance motion blur reduction for image and video acquisition and processing includes obtaining a target gain value and a target exposure duration value by obtaining a current scene luminance value, obtaining a current maximum gain using the current scene luminance value, obtaining a current interpolated gain-exposure duration curve using the current maximum gain and a current angular speed value, and obtaining the target gain value and the target exposure duration value from the current interpolated gain-exposure duration curve in accordance with a current maximum exposure duration. Adaptive acquisition control including limited luminance motion blur reduction for image and video acquisition and processing includes obtaining a frame of a video in accordance with the target scene exposition data and outputting the video.

20 Claims, 13 Drawing Sheets

(52) U.S. Cl.
CPC ............... *G06T 2207/10016* (2013.01); *G06T 2207/10144* (2013.01); *G06T 2207/10152* (2013.01)

(56) References Cited

U.S. PATENT DOCUMENTS

2013/0329996 A1 12/2013 Webb
2016/0379347 A1* 12/2016 Chiang ................ H04N 23/741 348/234
2018/0341804 A1* 11/2018 Takayama .............. G06V 10/60

* cited by examiner 100
142
110
136
134
132
140
138

LIMITED LUMINANCE MOTION BLUR REDUCTION

CROSS-REFERENCE TO RELATED APPLICATION(S)

This application is a continuation of U.S. patent application Ser. No. 17/941,115, filed on Sep. 9, 2022, the entire disclosure of which is hereby incorporated by reference.

TECHNICAL FIELD

This disclosure relates to adaptive acquisition control, including exposure and tone control, for image and video acquisition and processing.

BACKGROUND

Images and video may be acquired, or captured, and processed, such as by an image capture apparatus, such as a camera. Light may be received and focused via a lens and may be converted to an electronic image signal by an image sensor. The image signal may be processed by an image signal processor to form a processed, or output, image, which may be stored and/or encoded.

SUMMARY

Disclosed herein are implementations of adaptive acquisition control including limited luminance motion blur reduction for image and video acquisition and processing.

An aspect of the disclosure is a method of adaptive acquisition control including limited luminance motion blur reduction for image and video acquisition and processing. Adaptive acquisition control including limited luminance motion blur reduction for image and video acquisition and processing may include obtaining target scene exposition data including a target gain value and a target exposure duration value. Obtaining the target scene exposition data may include obtaining a current scene luminance value, obtaining a current maximum exposure duration, and obtaining a current maximum gain using the current scene luminance value. Obtaining the current maximum gain may include in response to a determination that the current scene luminance value is less than or equal to a first defined luminance threshold, using a first defined gain as the maximum gain, in response to a determination that the current scene luminance value is equal to or greater than a second defined luminance threshold, using a second defined gain as the maximum gain, and in response to a determination that the current scene luminance value is greater than the first defined luminance threshold and is less than the second defined luminance threshold, interpolating the maximum gain between the first defined gain and the second defined gain. Obtaining the target scene exposition data may include obtaining a current angular speed value, obtaining a current interpolated gain-exposure duration curve using the current angular speed value and the current maximum gain, and obtaining the target gain value and the target exposure duration value from the current interpolated gain-exposure duration curve in accordance with the current maximum exposure duration. Adaptive acquisition control including limited luminance motion blur reduction for image and video acquisition and processing may include obtaining a frame of a video in accordance with the target scene exposition data and outputting the video.

Another aspect of the disclosure is another method of adaptive acquisition control including limited luminance motion blur reduction for image and video acquisition and processing. Adaptive acquisition control including limited luminance motion blur reduction for image and video acquisition and processing may include obtaining, by a target exposure component of an image capture apparatus, a target gain value and a target exposure duration value by obtaining a current scene luminance value, obtaining a current maximum gain using the current scene luminance value, obtaining a current interpolated gain-exposure duration curve using the current maximum gain and a current angular speed value, and obtaining the target gain value and the target exposure duration value from the current interpolated gain-exposure duration curve in accordance with a current maximum exposure duration. Adaptive acquisition control including limited luminance motion blur reduction for image and video acquisition and processing may include obtaining a frame of a video in accordance with the target gain value and the target exposure duration value and outputting the video.

Another aspect of the disclosure is another method of adaptive acquisition control including limited luminance motion blur reduction for image and video acquisition and processing. Adaptive acquisition control including limited luminance motion blur reduction for image and video acquisition and processing may include obtaining, by a target exposure component of an image capture apparatus, first target scene exposition data including a first target exposure duration value and a first target sensor gain value, accessing, by the target exposure component, a first input frame of a video captured by an image sensor of the image capture apparatus in accordance with a defined frame rate, an adaptive acquisition control sample rate that is one third of the defined frame rate, and the first target scene exposition data, and obtaining, by the target exposure component, in accordance with the first target scene exposition data and the first input frame, second target scene exposition data including a second target exposure duration value and a second target sensor gain value. Obtaining the second target scene exposition data may include obtaining a current scene luminance value in accordance with the first input frame, obtaining a current maximum gain using the current scene luminance value, obtaining a current interpolated gain-exposure duration curve using the current maximum gain and angular speed data corresponding to capturing the first input frame, and obtaining the second target sensor gain value and the second target exposure duration value from the current interpolated gain-exposure duration curve in accordance with a current maximum exposure duration. Adaptive acquisition control including limited luminance motion blur reduction for image and video acquisition and processing may include accessing, by the target exposure component, a second input frame of the video captured by the image sensor of the image capture apparatus in accordance with the defined frame rate, the second target exposure duration value, and the second target sensor gain value.

Another aspect of the disclosure is an apparatus for adaptive acquisition control including limited luminance motion blur reduction for image and video acquisition and processing. The apparatus may be an image capture apparatus comprising an image sensor, memory, and a processor, which may execute instructions stored in the memory to implement adaptive acquisition control including limited luminance motion blur reduction for image and video acquisition and processing.

In the aspects described herein, obtaining the current maximum exposure duration may include obtaining the current maximum exposure duration in accordance with a current defined frame rate defined for the current video. Obtaining the current maximum gain may include determining that the current defined frame rate differs from a defined reference frame rate. Obtaining the current maximum gain may include, in response to determining that the current defined frame rate differs from the defined reference frame rate, obtaining, as a normalized first defined luminance threshold, a product of multiplying the first defined luminance threshold by a result of dividing the defined reference frame rate by the current defined frame rate.

Obtaining the current maximum gain may include, in response to determining that the current defined frame rate differs from the defined reference frame rate, using the normalized first defined luminance threshold as the first defined luminance threshold. Obtaining the current maximum gain may include, in response to determining that the current defined frame rate differs from the defined reference frame rate, obtaining, as a normalized second defined luminance threshold, a product of multiplying the second defined luminance threshold by the result of dividing the defined reference frame rate by the current defined frame rate.

Obtaining the current maximum gain may include, in response to determining that the current defined frame rate differs from the defined reference frame rate, using the normalized second defined luminance threshold as the second defined luminance threshold. Obtaining the target scene exposition data may include obtaining a product of multiplying the target gain value by the target exposure duration value as a target scene exposition value. Obtaining the current interpolated gain-exposure duration curve may include obtaining the current interpolated gain-exposure duration curve based on at least one of a first previously defined gain-exposure duration curve, a second previously defined gain-exposure duration curve, or a third previously defined gain-exposure duration curve.

Obtaining the current interpolated gain-exposure duration curve may include obtaining the current interpolated gain-exposure duration curve using the current angular speed value may by in response to a determination that the current angular speed value is less than or equal to a defined low angular speed threshold, obtaining the current interpolated gain-exposure duration curve by using the first previously defined gain-exposure duration curve as the current interpolated gain-exposure duration curve. Obtaining the current interpolated gain-exposure duration curve may include obtaining the current interpolated gain-exposure duration curve using the current angular speed value may by in response to a determination that the current angular speed value is greater than the defined low angular speed threshold and less than a defined medium angular speed threshold, obtaining the current interpolated gain-exposure duration curve by interpolating between the first previously defined gain-exposure duration curve and the second previously defined gain-exposure duration curve.

Obtaining the current interpolated gain-exposure duration curve may include obtaining the current interpolated gain-exposure duration curve using the current angular speed value may by in response to a determination that the current angular speed value is equal to the defined medium angular speed threshold, obtaining the current interpolated gain-exposure duration curve by using the second previously defined gain-exposure duration curve as the current interpolated gain-exposure duration curve.

Obtaining the current interpolated gain-exposure duration curve may include obtaining the current interpolated gain-exposure duration curve using the current angular speed value may by in response to a determination that the current angular speed value is greater than the defined medium angular speed threshold and less than a defined high angular speed threshold, obtaining the current interpolated gain-exposure duration curve by interpolating between the second previously defined gain-exposure duration curve and the third previously defined gain-exposure duration curve. Obtaining the current interpolated gain-exposure duration curve may include obtaining the current interpolated gain-exposure duration curve using the current angular speed value may by in response to a determination that the current angular speed value is equal to or greater than the defined high angular speed threshold, obtaining the current interpolated gain-exposure duration curve by using the third previously defined gain-exposure duration curve as the current interpolated gain-exposure duration curve.

Obtaining the current interpolated gain-exposure duration curve may include obtaining the current interpolated gain-exposure duration curve using the current maximum gain. Obtaining the current interpolated gain-exposure duration curve using the current maximum gain may include, subsequent to obtaining the current interpolated gain-exposure duration curve using the current angular speed value, generating an updated current interpolated gain-exposure duration curve using the current maximum gain as a maximum gain for the updated current interpolated gain-exposure duration curve. Obtaining the current interpolated gain-exposure duration curve using the current maximum gain may include, subsequent to obtaining the current interpolated gain-exposure duration curve using the current angular speed value, using the updated current interpolated gain-exposure duration curve as the current interpolated gain-exposure duration curve.

In the aspects described herein, adaptive acquisition control including limited luminance motion blur reduction for image and video acquisition and processing may include obtaining, by a target exposure component of an image capture apparatus, a target exposure value for processing the frame. Adaptive acquisition control including limited luminance motion blur reduction for image and video acquisition and processing may include obtaining, by an aggregate gain component of the image capture apparatus, a target aggregate gain value and a remaining gain value for processing the frame. Adaptive acquisition control including limited luminance motion blur reduction for image and video acquisition and processing may include obtaining, by an auto-exposure compensation component of the image capture apparatus, an auto-exposure compensation tone curve and an auto-exposure compensation gain value for processing the frame, in accordance with the target scene exposition data. Adaptive acquisition control including limited luminance motion blur reduction for image and video acquisition and processing may include obtaining, by a contrast control component of the image capture apparatus, a contrast control tone curve and a contrast control black point value for processing the frame. Adaptive acquisition control including limited luminance motion blur reduction for image and video acquisition and processing may include obtaining, by a tone control driver of the image capture apparatus, a tone control tone curve and a tone control black point value for processing the frame, in accordance with the target scene exposition data. Adaptive acquisition control including limited luminance motion blur reduction for image and video acquisition and processing may include processing the frame in accordance with the tone control tone curve and the tone control black point value to obtain a processed frame. Adaptive acquisition control including limited luminance motion blur reduction for image and video acquisition and processing may include including the processed frame in the video.

Obtaining the current maximum gain may include, in response to a determination that the current scene luminance value is less than or equal to a first defined luminance threshold, using a first defined gain as the maximum gain. Obtaining the current maximum gain may include, in response to a determination that the current scene luminance value is equal to or greater than a second defined luminance threshold, using a second defined gain as the maximum gain. Obtaining the current maximum gain may include, in response to a determination that the current scene luminance value is greater than the first defined luminance threshold and is less than the second defined luminance threshold, interpolating the maximum gain between the first defined gain and the second defined gain.

Obtaining the target gain value and the target exposure duration value may include obtaining the current maximum exposure duration. Obtaining the current maximum exposure duration may include obtaining the current maximum exposure duration in accordance with a current defined frame rate defined for the current video. Obtaining the current maximum gain may include determining that the current defined frame rate differs from a defined reference frame rate. Obtaining the current maximum gain may include, in response to determining that the current defined frame rate differs from the defined reference frame rate, obtaining, as a normalized first defined luminance threshold, a product of multiplying the first defined luminance threshold by a result of dividing the defined reference frame rate by the current defined frame rate. Obtaining the current maximum gain may include, in response to determining that the current defined frame rate differs from the defined reference frame rate, using the normalized first defined luminance threshold as the first defined luminance threshold. Obtaining the current maximum gain may include, in response to determining that the current defined frame rate differs from the defined reference frame rate, obtaining, as a normalized second defined luminance threshold, a product of multiplying the second defined luminance threshold by the result of dividing the defined reference frame rate by the current defined frame rate. Obtaining the current maximum gain may include, in response to determining that the current defined frame rate differs from the defined reference frame rate, using the normalized second defined luminance threshold as the second defined luminance threshold.

Obtaining the target gain value and the target exposure duration value may include obtaining, as a target scene exposition value, a product of multiplying the target gain value by the target exposure duration value. Obtaining the current interpolated gain-exposure duration curve may include obtaining the current interpolated gain-exposure duration curve based on at least one of a first previously defined gain-exposure duration curve, a second previously defined gain-exposure duration curve, or a third previously defined gain-exposure duration curve.

Obtaining the current interpolated gain-exposure duration curve may include obtaining the current interpolated gain-exposure duration curve using the current angular speed value by, in response to a determination that the current angular speed value is less than or equal to a defined low angular speed threshold, obtaining the current interpolated gain-exposure duration curve by using the first previously defined gain-exposure duration curve as the current interpolated gain-exposure duration curve.

Obtaining the current interpolated gain-exposure duration curve may include obtaining the current interpolated gain-exposure duration curve using the current angular speed value by, in response to a determination that the current angular speed value is greater than the defined low angular speed threshold and less than a defined medium angular speed threshold, obtaining the current interpolated gain-exposure duration curve by interpolating between the first previously defined gain-exposure duration curve and the second previously defined gain-exposure duration curve.

Obtaining the current interpolated gain-exposure duration curve may include obtaining the current interpolated gain-exposure duration curve using the current angular speed value by, in response to a determination that the current angular speed value is equal to the defined medium angular speed threshold, obtaining the current interpolated gain-exposure duration curve by using the second previously defined gain-exposure duration curve as the current interpolated gain-exposure duration curve.

Obtaining the current interpolated gain-exposure duration curve may include obtaining the current interpolated gain-exposure duration curve using the current angular speed value by, in response to a determination that the current angular speed value is greater than the defined medium angular speed threshold and less than a defined high angular speed threshold, obtaining the current interpolated gain-exposure duration curve by interpolating between the second previously defined gain-exposure duration curve and the third previously defined gain-exposure duration curve.

Obtaining the current interpolated gain-exposure duration curve may include obtaining the current interpolated gain-exposure duration curve using the current angular speed value by, in response to a determination that the current angular speed value is equal to or greater than the defined high angular speed threshold, obtaining the current interpolated gain-exposure duration curve by using the third previously defined gain-exposure duration curve as the current interpolated gain-exposure duration curve.

Obtaining the current interpolated gain-exposure duration curve may include obtaining the current interpolated gain-exposure duration curve using the current maximum gain, wherein obtaining the current interpolated gain-exposure duration curve using the current maximum gain by, subsequent to obtaining the current interpolated gain-exposure duration curve using the current angular speed value, generating an updated current interpolated gain-exposure duration curve using the current maximum gain as a maximum gain for the updated current interpolated gain-exposure duration curve. Obtaining the current interpolated gain-exposure duration curve may include obtaining the current interpolated gain-exposure duration curve using the current maximum gain, wherein obtaining the current interpolated gain-exposure duration curve using the current maximum gain by, subsequent to obtaining the current interpolated gain-exposure duration curve using the current angular speed value, using the updated current interpolated gain-exposure duration curve as the current interpolated gain-exposure duration curve.

The aspects described herein may include performing any combination of obtaining the current maximum exposure duration in accordance with a current defined frame rate defined for the current video; determining that the current defined frame rate differs from a defined reference frame rate; in response to determining that the current defined frame rate differs from the defined reference frame rate, obtaining, as a normalized first defined luminance threshold, a product of multiplying the first defined luminance threshold by a result of dividing the defined reference frame rate by the current defined frame rate; in response to determining that the current defined frame rate differs from the defined reference frame rate, using the normalized first defined luminance threshold as the first defined luminance threshold; in response to determining that the current defined frame rate differs from the defined reference frame rate, obtaining, as a normalized second defined luminance threshold, a product of multiplying the second defined luminance threshold by the result of dividing the defined reference frame rate by the current defined frame rate; in response to determining that the current defined frame rate differs from the defined reference frame rate, using the normalized second defined luminance threshold as the second defined luminance threshold; obtaining a product of multiplying the target gain value by the target exposure duration value as a target scene exposition value; obtaining the current interpolated gain-exposure duration curve based on at least one of a first previously defined gain-exposure duration curve, a second previously defined gain-exposure duration curve, or a third previously defined gain-exposure duration curve; obtaining the current interpolated gain-exposure duration curve using the current angular speed value by in response to a determination that the current angular speed value is less than or equal to a defined low angular speed threshold, obtaining the current interpolated gain-exposure duration curve by using the first previously defined gain-exposure duration curve as the current interpolated gain-exposure duration curve; obtaining the current interpolated gain-exposure duration curve using the current angular speed value by in response to a determination that the current angular speed value is greater than the defined low angular speed threshold and less than a defined medium angular speed threshold, obtaining the current interpolated gain-exposure duration curve by interpolating between the first previously defined gain-exposure duration curve and the second previously defined gain-exposure duration curve; obtaining the current interpolated gain-exposure duration curve using the current angular speed value by in response to a determination that the current angular speed value is equal to the defined medium angular speed threshold, obtaining the current interpolated gain-exposure duration curve by using the second previously defined gain-exposure duration curve as the current interpolated gain-exposure duration curve; obtaining the current interpolated gain-exposure duration curve using the current angular speed value by in response to a determination that the current angular speed value is greater than the defined medium angular speed threshold and less than a defined high angular speed threshold, obtaining the current interpolated gain-exposure duration curve by interpolating between the second previously defined gain-exposure duration curve and the third previously defined gain-exposure duration curve; obtaining the current interpolated gain-exposure duration curve using the current angular speed value by in response to a determination that the current angular speed value is equal to or greater than the defined high angular speed threshold, obtaining the current interpolated gain-exposure duration curve by using the third previously defined gain-exposure duration curve as the current interpolated gain-exposure duration curve; obtaining the current interpolated gain-exposure duration curve using the current maximum gain by, subsequent to obtaining the current interpolated gain-exposure duration curve using the current angular speed value, generating an updated current interpolated gain-exposure duration curve using the current maximum gain as a maximum gain for the updated current interpolated gain-exposure duration curve; obtaining the current interpolated gain-exposure duration curve using the current maximum gain by, subsequent to obtaining the current interpolated gain-exposure duration curve using the current angular speed value, using the updated current interpolated gain-exposure duration curve as the current interpolated gain-exposure duration curve; obtaining, by a target exposure component of an image capture apparatus, a target exposure value for processing the frame; obtaining, by an aggregate gain component of the image capture apparatus, a target aggregate gain value and a remaining gain value for processing the frame; obtaining, by an auto-exposure compensation component of the image capture apparatus, an auto-exposure compensation tone curve and an auto-exposure compensation gain value for processing the frame, in accordance with the target scene exposition data; obtaining, by a contrast control component of the image capture apparatus, a contrast control tone curve and a contrast control black point value for processing the frame; obtaining, by a tone control driver of the image capture apparatus, a tone control tone curve and a tone control black point value for processing the frame, in accordance with the target scene exposition data; processing the frame in accordance with the tone control tone curve and the tone control black point value to obtain a processed frame; and including the processed frame in the video.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figures 1A, 1B:
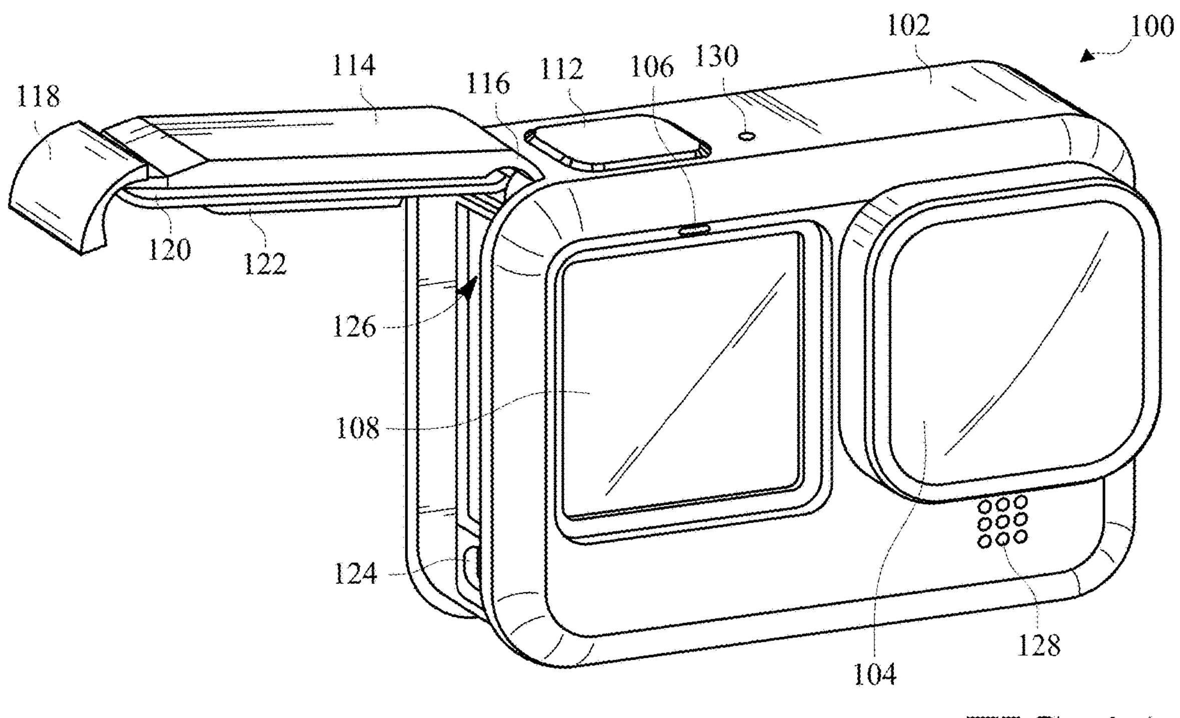
FIGS. 1A-1B are isometric views of an example of an image capture apparatus.

Some image capture apparatus may have constraints, such as hardware constraints, that limit image quality in some conditions, such as lowlight or midlight (moderate light) scenes with relatively large motion. Hardware constraints, such as ruggedness constraints, may limit or prevent the use of autofocus, which may correspond with the use of a relatively large depth of field, which may correlate to the amount of light captured by the sensor, as lens pupil diameter influences depth of field. The quantity of light captured is correlated to image quality, such that quality, such as measured by signal-to-noise ratio (SNR), increases as the amount of light increases. In some image capture apparatus, the aperture, and lens pupil diameter, may be fixed. Gain increases, or amplifies, the captured image signal for that amount of light captured. The amount of light captured may be controlled, for a respective scene, by controlling the exposure duration. The exposure duration may be limited by the framerate, which may be expressed as frames per second (fps), such that determining a maximum exposure duration (exp_dur_max) may be expressed as exp_dur_max=1/fps. The combination of exposure duration and image capture apparatus motion may correlate to motion blur, which may limit, such as reduce the strength of, the performance of electronic image stabilization (EIS). For example, relatively high exposure duration and image capture apparatus motion corresponds with relatively high motion blur. As captured by the image sensor, such as in a RAW image, the signal-to-noise ratio corresponds with the gain and the grey level per pixel. An increase in gain for a respective grey level corresponds with a lower signal-to-noise ratio. An increase in the grey level for a respective gain corresponds with a higher signal-to-noise ratio.

In highlight scenes, such as scenes with relatively bright lighting conditions, a relatively short exposure duration may capture sufficient light to achieve high quality, such as measured using signal-to-noise ratio, wherein a sensor gain of 1.0 may be used, such that motion blur is limited or eliminated with high image capture apparatus motion. In midlight or lowlight scenes, a short exposure duration limits the amount of light captured, or accumulated, such that captured images have low image quality. Increasing gain may provide moderate improvements in image quality, such as with respect to quantification and read noise. In some conditions, such as conditions having low grey level, using a high gain may correspond with inaccurate color, such as a red or blue tint.

Image capture apparats that implement limited luminance motion blur reduction as described herein capture video frames, of scenes that include lowlight or midlight lighting conditions and relatively high image capture apparatus motion, which have relatively high image quality, relative to image capture apparatus in similar scenes that omit implementing limited luminance motion blur reduction as described herein. In some implementations, the reduction in motion blur may correspond with a reduction in signal-to-noise ratio. In some implementations, the reduction in motion blur may correspond with an increase in EIS strength. Image capture apparats that implement limited luminance motion blur reduction as described herein interpolate exposure-gain curves in accordance with scene luminance to control maximum gain, which reduces or eliminates color accuracy errors in conditions having low grey level.

Figure 3:
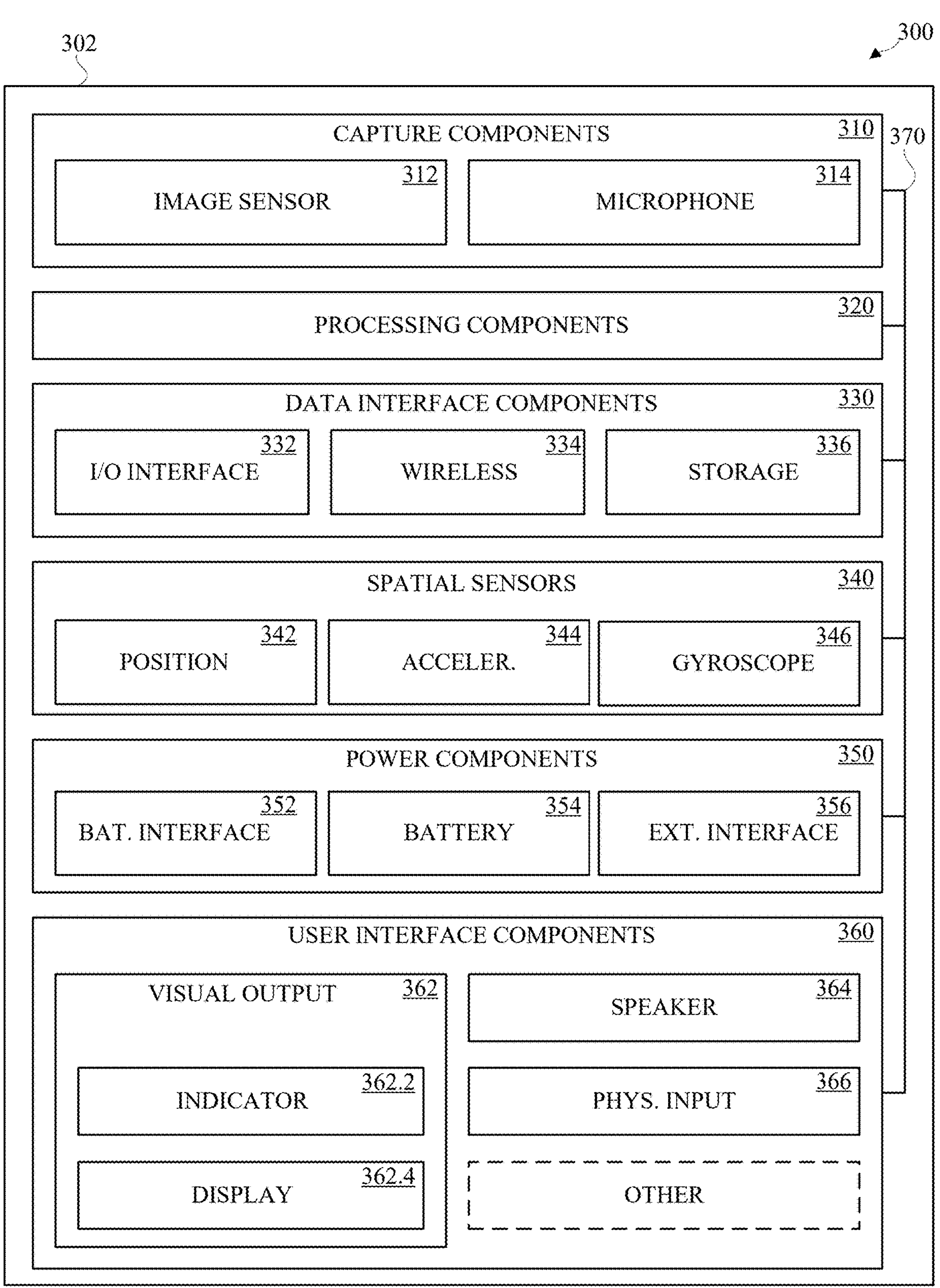
FIG. 3 is a block diagram of electronic components of an image capture apparatus.

FIGS. 1A-B are isometric views of an example of an image capture apparatus 100. The image capture apparatus 100 includes a body 102, an image capture device 104, an indicator 106, a display 108, a mode button 110, a shutter button 112, a door 114, a hinge mechanism 116, a latch mechanism 118, a seal 120, a battery interface 122, a data interface 124, a battery receptacle 126, microphones 128, 130, 132, a speaker 138, an interconnect mechanism 140, and a display 142. Although not expressly shown in FIGS. 1A-1B, the image capture apparatus 100 includes internal electronics, such as imaging electronics, power electronics, and the like, internal to the body 102 for capturing images and performing other functions of the image capture apparatus 100. An example showing internal electronics is shown in FIG. 3. The arrangement of the components of the image capture apparatus 100 shown in FIGS. 1A-B is an example, other arrangements of elements may be used, except as is described herein or as is otherwise clear from context.

The body 102 of the image capture apparatus 100 may be made of a rigid material such as plastic, aluminum, steel, or fiberglass. Other materials may be used.

As shown in FIG. 1A, the image capture apparatus 100 includes the image capture device 104 structured on a front surface of, and within, the body 102. The image capture device 104 includes a lens. The lens of the image capture device 104 receives light incident upon the lens of the image capture device 104 and directs the received light onto an image sensor of the image capture device 104 internal to the body 102. The image capture apparatus 100 may capture one or more images, such as a sequence of images, such as video. The image capture apparatus 100 may store the captured images and video for subsequent display, playback, or transfer to an external device. Although one image capture device 104 is shown in FIG. 1A, the image capture apparatus 100 may include multiple image capture devices, which may be structured on respective surfaces of the body 102.

As shown in FIG. 1A, the image capture apparatus 100 includes the indicator 106 structured on the front surface of the body 102. The indicator 106 may output, or emit, visible light, such as to indicate a status of the image capture apparatus 100. For example, the indicator 106 may be a light-emitting diode (LED). Although one indicator 106 is shown in FIG. 1A, the image capture apparatus 100 may include multiple indictors structured on respective surfaces of the body 102.

As shown in FIG. 1A, the image capture apparatus 100 includes the display 108 structured on the front surface of the body 102. The display 108 outputs, such as presents or displays, such as by emitting visible light, information, such as to show image information such as image previews, live video capture, or status information such as battery life, camera mode, elapsed time, and the like. In some implementations, the display 108 may be an interactive display, which may receive, detect, or capture input, such as user input representing user interaction with the image capture apparatus 100. Although one display 108 is shown in FIG. 1A, the image capture apparatus 100 may include multiple displays, which may be structured on respective surfaces of the body 102. In some implementations, the display 108 may be omitted or combined with another component of the image capture apparatus 100.

As shown in FIG. 1B, the image capture apparatus 100 includes the mode button 110 structured on a side surface of the body 102. Although described as a button, the mode button 110 may be another type of input device, such as a switch, a toggle, a slider, or a dial. Although one mode button 110 is shown in FIG. 1B, the image capture apparatus 100 may include multiple mode, or configuration, buttons structured on respective surfaces of the body 102. In some implementations, the mode button 110 may be omitted or combined with another component of the image capture apparatus 100. For example, the display 108 may be an interactive, such as touchscreen, display, and the mode button 110 may be physically omitted and functionally combined with the display 108.

As shown in FIG. 1A, the image capture apparatus 100 includes the shutter button 112 structured on a top surface of the body 102. Although described as a button, the shutter button 112 may be another type of input device, such as a switch, a toggle, a slider, or a dial. Although one shutter button 112 is shown in FIG. 1A, the image capture apparatus 100 may include multiple shutter buttons structured on respective surfaces of the body 102. In some implementations, the shutter button 112 may be omitted or combined with another component of the image capture apparatus 100.

The mode button 110, the shutter button 112, or both, obtain input data, such as user input data in accordance with user interaction with the image capture apparatus 100. For example, the mode button 110, the shutter button 112, or both, may be used to turn the image capture apparatus 100 on and off, scroll through modes and settings, and select modes and change settings.

As shown in FIG. 1A, the image capture apparatus 100 includes the door 114 coupled to the body 102, such as using the hinge mechanism 116. The door 114 may be secured to the body 102 using the latch mechanism 118 that releasably engages the body 102 at a position generally opposite the hinge mechanism 116. As shown in FIG. 1A, the door 114 includes the seal 120 and the battery interface 122. Although one door 114 is shown in FIG. 1A, the image capture apparatus 100 may include multiple doors respectively forming respective surfaces of the body 102, or portions thereof. Although not shown in FIGS. 1A-B, the door 114 may be removed from the body 102 by releasing the latch mechanism 118 from the body 102 and decoupling the hinge mechanism 116 from the body 102.

In FIG. 1A, the door 114 is shown in an open position such that the data interface 124 is accessible for communicating with external devices and the battery receptacle 126 is accessible for placement or replacement of a battery (not shown).

In FIG. 1B, the door 114 is shown in a closed position. In implementations in which the door 114 is in the closed position the seal 120 engages a flange (not shown) to provide an environmental seal. In implementations in which the door 114 is in the closed position the battery interface 122 engages the battery to secure the battery in the battery receptacle 126.

As shown in FIG. 1A, the image capture apparatus 100 includes the battery receptacle 126 structured to form a portion of an interior surface of the body 102. The battery receptacle 126 includes operative connections (not shown) for power transfer between the battery and the image capture apparatus 100. In some implementations, the battery receptacle 126 may be omitted. Although one battery receptacle 126 is shown in FIG. 1A, the image capture apparatus 100 may include multiple battery receptacles.

As shown in FIG. 1A, the image capture apparatus 100 includes a first microphone 128 structured on a front surface of the body 102. As shown in FIG. 1A, the image capture apparatus 100 includes a second microphone 130 structured on a top surface of the body 102. As shown in FIG. 1B, the image capture apparatus 100 includes the microphone 132 structured on a side surface of the body 102. The microphone 132, which may be referred to as a drain microphone, is located behind a drain cover 134, surrounded by a drain channel 136, and is designed to drain liquid from audio components of the image capture apparatus 100. The image capture apparatus 100 may include other microphones (not shown) on other surfaces of the body 102. The microphones 128, 130, 132 receive and record audio, such as in conjunction with capturing video or separate from capturing video. In some implementations, one or more of the microphones 128, 130, 132 may be omitted or combined with other components of the image capture apparatus 100.

As shown in FIG. 1B, the image capture apparatus 100 includes the speaker 138 structured on a bottom surface of the body 102. The speaker 138 outputs or presents audio, such as by playing back recorded audio or emitting sounds associated with notifications. Although one speaker 138 is shown in FIG. 1B, the image capture apparatus 100 may include multiple speakers structured on respective surfaces of the body 102.

As shown in FIG. 1B, the image capture apparatus 100 includes the interconnect mechanism 140 structured on a bottom surface of the body 102. The interconnect mechanism 140 removably connects the image capture apparatus 100 to an external structure, such as a handle grip, another mount, or a securing device. As shown in FIG. 1B, the interconnect mechanism 140 includes folding protrusions configured to move between a nested or collapsed position as shown in FIG. 1B and an extended or open position (not shown in FIG. 1B). The folding protrusions of the interconnect mechanism 140 shown in the collapsed position in FIG. 1B may be similar to the folding protrusions of the interconnect mechanism 214 shown in the extended or open position in FIGS. 2A-2B, except as is described herein or as is otherwise clear from context. The folding protrusions of the interconnect mechanism 140 in the extended or open position may be coupled to reciprocal protrusions of other devices such as handle grips, mounts, clips, or like devices. Although one interconnect mechanism 140 is shown in FIG. 1B, the image capture apparatus 100 may include multiple interconnect mechanisms structured on, or forming a portion of, respective surfaces of the body 102. In some implementations, the interconnect mechanism 140 may be omitted.

As shown in FIG. 1B, the image capture apparatus 100 includes the display 142 structured on, and forming a portion of, a rear surface of the body 102. The display 142 outputs, such as presents or displays, such as by emitting visible light, data, such as to show image information such as image previews, live video capture, or status information such as battery life, camera mode, elapsed time, and the like. In some implementations, the display 142 may be an interactive display, which may receive, detect, or capture input, such as user input representing user interaction with the image capture apparatus 100. Although one display 142 is shown in FIG. 1B, the image capture apparatus 100 may include multiple displays structured on respective surfaces of the body 102. In some implementations, the display 142 may be omitted or combined with another component of the image capture apparatus 100.

The image capture apparatus 100 may include features or components other than those described herein, such as other buttons or interface features. In some implementations, interchangeable lenses, cold shoes, and hot shoes, or a combination thereof, may be coupled to or combined with the image capture apparatus 100.

Although not shown in FIGS. 1A-1B, the image capture apparatus 100 may communicate with an external device, such as an external user interface device (not shown), via a wired or wireless computing communication link, such as via the data interface 124. The computing communication link may be a direct computing communication link or an indirect computing communication link, such as a link including another device or a network, such as the Internet. The image capture apparatus 100 may transmit images to the external device via the computing communication link. The external device may store, process, display, or combination thereof, the images. The external user interface device may be a computing device, such as a smartphone, a tablet computer, a phablet, a smart watch, a portable computer, personal computing device, or another device or combination of devices configured to receive user input, communicate information with the image capture apparatus 100 via the computing communication link, or receive user input and communicate information with the image capture apparatus 100 via the computing communication link. The external user interface device may implement or execute one or more applications to manage or control the image capture apparatus 100. For example, the external user interface device may include an application for controlling camera configuration, video acquisition, video display, or any other configurable or controllable aspect of the image capture apparatus 100. In some implementations, the external user interface device may generate and share, such as via a cloud-based or social media service, one or more images or video clips. In some implementations, the external user interface device may display unprocessed or minimally processed images or video captured by the image capture apparatus 100 contemporaneously with capturing the images or video by the image capture apparatus 100, such as for shot framing or live preview.

Figure 2A:
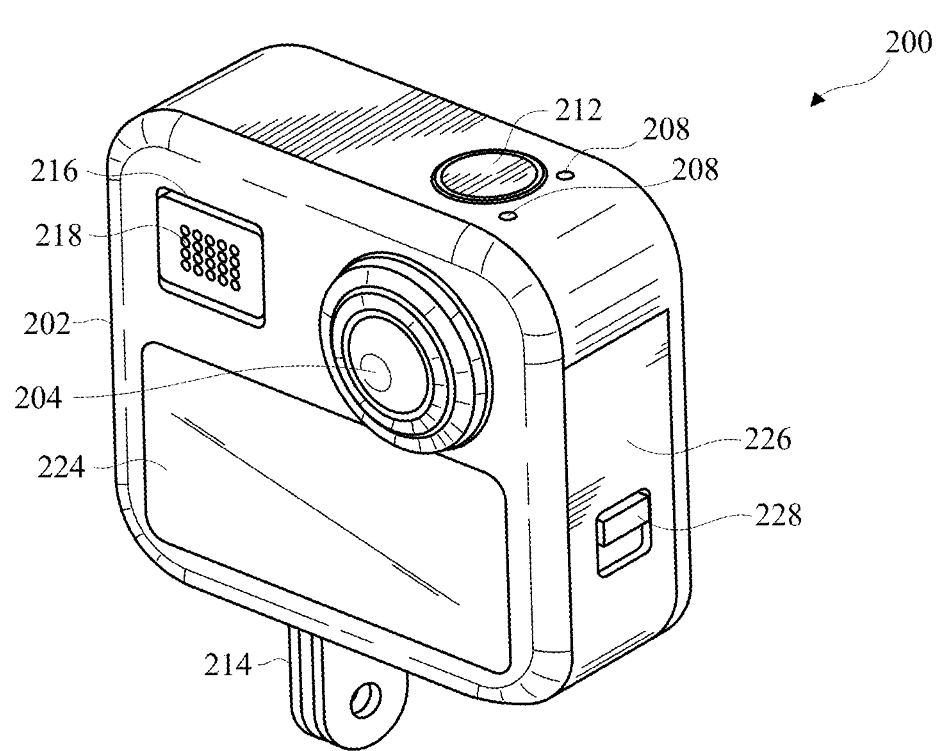
FIGS. 2A-2B are isometric views of another example of an image capture apparatus.
Figure 2B:
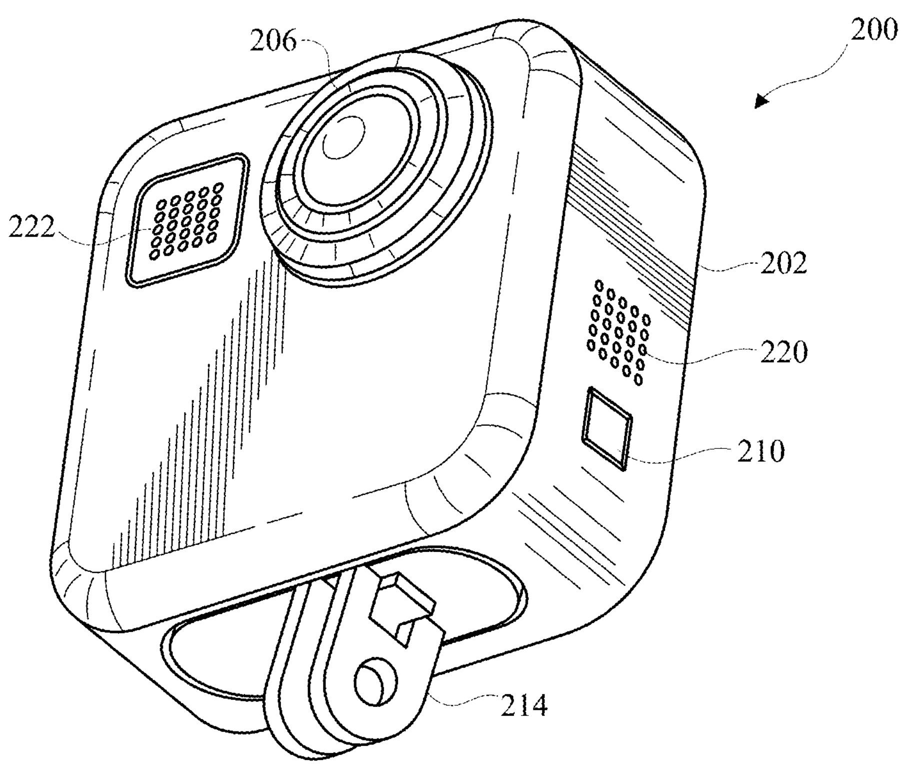

FIGS. 2A-2B illustrate another example of an image capture apparatus 200. The image capture apparatus 200 is similar to the image capture apparatus 100 shown in FIGS. 1A-B, except as is described herein or as is otherwise clear from context. The image capture apparatus 200 includes a body 202, a first image capture device 204, a second image capture device 206, indicators 208, a mode button 210, a shutter button 212, an interconnect mechanism 214, a drainage channel 216, audio components 218, 220, 222, a display 224, and a door 226 including a release mechanism 228. The arrangement of the components of the image capture apparatus 200 shown in FIGS. 2A-2B is an example, other arrangements of elements may be used, except as is described herein or as is otherwise clear from context.

The body 202 of the image capture apparatus 200 may be similar to the body 102 shown in FIGS. 1A-1B, except as is described herein or as is otherwise clear from context.

As shown in FIG. 2A, the image capture apparatus 200 includes the first image capture device 204 structured on a front surface of the body 202. The first image capture device 204 includes a first lens. The first image capture device 204 may be similar to the image capture device 104 shown in FIG. 1A, except as is described herein or as is otherwise clear from context. As shown in FIG. 2B, the image capture apparatus 200 includes the second image capture device 206 structured on a rear surface of the body 202. The second image capture device 206 includes a second lens. The second image capture device 206 may be similar to the image capture device 104 shown in FIG. 1A, except as is described herein or as is otherwise clear from context. The image capture devices 204, 206 are disposed on opposing surfaces of the body 202, for example, in a back-to-back configuration, Janus configuration, or offset Janus configuration. Although two image capture devices 204, 206 are shown in FIGS. 2A-2B, the image capture apparatus 200 may include other image capture devices structured on respective surfaces of the body 202.

As shown in FIG. 2A, the image capture apparatus 200 includes the indicators 208 structured on a top surface of the body 202. The indicators 208 may be similar to the indicator 106 shown in FIG. 1A, except as is described herein or as is otherwise clear from context. For example, one of the indicators 208 may indicate a status of the first image capture device 204 and another one of the indicators 208 may indicate a status of the second image capture device 206. Although two indicator 208 are shown in FIGS. 2A-2B, the image capture apparatus 200 may include other indictors structured on respective surfaces of the body 202.

As shown in FIGS. 2A-B, the image capture apparatus 200 includes input mechanisms including a mode button 210, structured on a side surface of the body 202, and a shutter button 212, structured on a top surface of the body 202. The mode button 210 may be similar to the mode button 110 shown in FIG. 1B, except as is described herein or as is otherwise clear from context. The shutter button 212 may be similar to the shutter button 112 shown in FIG. 1A, except as is described herein or as is otherwise clear from context.

The image capture apparatus 200 includes internal electronics (not expressly shown), such as imaging electronics, power electronics, and the like, internal to the body 202 for capturing images and performing other functions of the image capture apparatus 200. An example showing internal electronics is shown in FIG. 3.

As shown in FIGS. 2A-2B, the image capture apparatus 200 includes the interconnect mechanism 214 structured on a bottom surface of the body 202. The interconnect mechanism 214 may be similar to the interconnect mechanism 140 shown in FIG. 1B, except as is described herein or as is otherwise clear from context. For example, the interconnect mechanism 140 shown in FIG. 1B is shown in the nested or collapsed position and the interconnect mechanism 214 shown in FIGS. 2A-2B are shown in an extended or open position.

As shown in FIG. 2A, the image capture apparatus 200 includes the drainage channel 216 for draining liquid from audio components of the image capture apparatus 200.

As shown in FIGS. 2A-2B, the image capture apparatus 200 includes the audio components 218, 220, 222, respectively structured on respective surfaces of the body 202. The audio components 218, 220, 222 may be similar to the microphones 128, 130, 132 and the speaker 138 shown in FIGS. 1A-1B, except as is described herein or as is otherwise clear from context. One or more of the audio components 218, 220, 222 may be, or may include, audio sensors, such as microphones, to receive and record audio signals, such as voice commands or other audio, in conjunction with capturing images or video. One or more of the audio components 218, 220, 222 may be, or may include, an audio presentation component that may present, or play, audio, such as to provide notifications or alerts. As shown in FIG. 2A, a first audio component 218 is located on a front surface of the body 202. As shown in FIG. 2B, a second audio component 220 is located on a side surface of the body 202, and a third audio component 222 is located on a back surface of the body 202. Other numbers and configurations for the audio components may be used. For example, the audio component 218 may be a drain microphone surrounded by the drainage channel 216.

As shown in FIG. 2A, the image capture apparatus 200 includes the display 224 structured on a front surface of the body 202. The display 224 may be similar to the displays 108, 142 shown in FIGS. 1A-1B, except as is described herein or as is otherwise clear from context. The display 224 may include an I/O interface. The display 224 may receive touch inputs. The display 224 may display image information during video capture. The display 224 may provide status information to a user, such as status information indicating battery power level, memory card capacity, time elapsed for a recorded video, etc. Although one display 224 is shown in FIG. 2A, the image capture apparatus 200 may include multiple displays structured on respective surfaces of the body 202. In some implementations, the display 224 may be omitted or combined with another component of the image capture apparatus 200.

As shown in FIG. 2A, the image capture apparatus 200 includes the door 226 structured on, or forming a portion of, the side surface of the body 202. The door 226 may be similar to the door 114 shown in FIG. 1A, except as is described herein or as is otherwise clear from context. For example, the door 226 shown in FIG. 2A includes a release mechanism 228. The release mechanism 228 may include a latch, a button, or other mechanism configured to receive a user input that allows the door 226 to change position. The release mechanism 228 may be used to open the door 226 for a user to access a battery, a battery receptacle, an I/O interface, a memory card interface, etc. (not shown).

In some embodiments, the image capture apparatus 200 may include features or components other than those described herein, some features or components described herein may be omitted, or some features or components described herein may be combined. For example, the image capture apparatus 200 may include additional interfaces or different interface features, interchangeable lenses, cold shoes, or hot shoes.

Figure 2C:
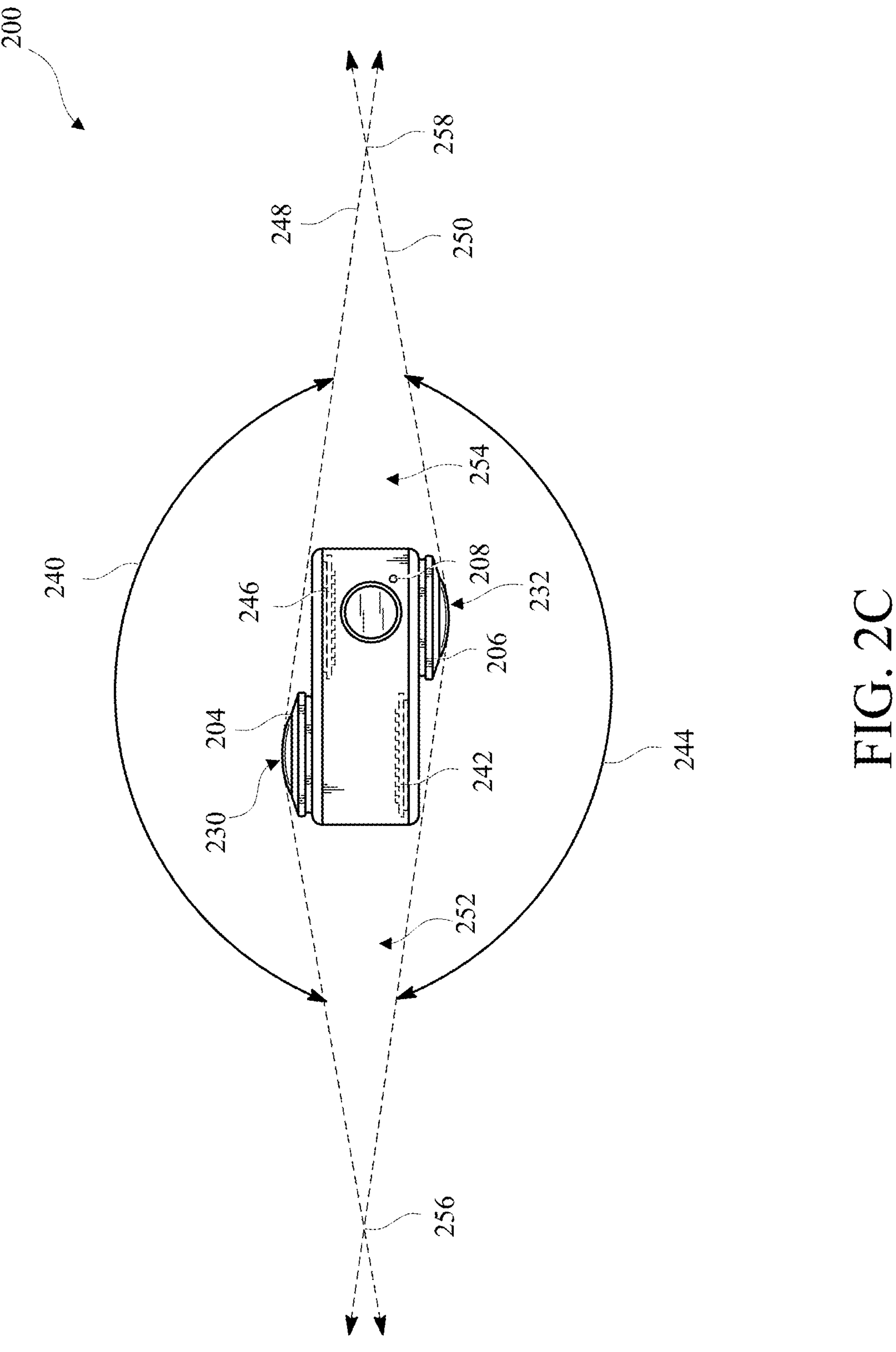
FIG. 2C is a top view of the image capture apparatus of FIGS. 2A-2B.

FIG. 2C is a top view of the image capture apparatus 200 of FIGS. 2A-2B. For simplicity, some features or components of the image capture apparatus 200 shown in FIGS. 2A-2B are omitted from FIG. 2C.

As shown in FIG. 2C, the first image capture device 204 includes a first lens 230 and the second image capture device 206 includes a second lens 232. The image capture apparatus 200 captures spherical images. For example, the first image capture device 204 may capture a first image, such as a first hemispheric, or hyper-hemispherical, image, the second image capture device 206 may capture a second image, such as a second hemispheric, or hyper-hemispherical, image, and the image capture apparatus 200 may generate a spherical image incorporating or combining the first image and the second image, which may be captured concurrently, or substantially concurrently.

The first image capture device 204 defines a first field-of-view 240 wherein the first lens 230 of the first image capture device 204 receives light. The first lens 230 directs the received light corresponding to the first field-of-view 240 onto a first image sensor 242 of the first image capture device 204. For example, the first image capture device 204 may include a first lens barrel (not expressly shown), extending from the first lens 230 to the first image sensor 242.

The second image capture device 206 defines a second field-of-view 244 wherein the second lens 232 receives light. The second lens 232 directs the received light corresponding to the second field-of-view 244 onto a second image sensor 246 of the second image capture device 206. For example, the second image capture device 206 may include a second lens barrel (not expressly shown), extending from the second lens 232 to the second image sensor 246.

A boundary 248 of the first field-of-view 240 is shown using broken directional lines. A boundary 250 of the second field-of-view 244 is shown using broken directional lines. As shown, the image capture devices 204, 206 are arranged in a back-to-back (Janus) configuration such that the lenses 230, 232 face in generally opposite directions, such that the image capture apparatus 200 may capture spherical images. The first image sensor 242 captures a first hyper-hemispherical image plane from light entering the first lens 230. The second image sensor 246 captures a second hyper-hemispherical image plane from light entering the second lens 232.

As shown in FIG. 2C, the fields-of-view 240, 244 partially overlap such that the combination of the fields-of-view 240, 244 form a spherical field-of-view, except that one or more uncaptured areas 252, 254 may be outside of the fields-of-view 240, 244 of the lenses 230, 232. Light emanating from or passing through the uncaptured areas 252, 254, which may be proximal to the image capture apparatus 200, may be obscured from the lenses 230, 232 and the corresponding image sensors 242, 246, such that content corresponding to the uncaptured areas 252, 254 may be omitted from images captured by the image capture apparatus 200. In some implementations, the image capture devices 204, 206, or the lenses 230, 232 thereof, may be configured to minimize the uncaptured areas 252, 254.

Examples of points of transition, or overlap points, from the uncaptured areas 252, 254 to the overlapping portions of the fields-of-view 240, 244 are shown at 256, 258.

Images contemporaneously captured by the respective image sensors 242, 246 may be combined to form a combined image, such as a spherical image. Generating a combined image may include correlating the overlapping regions captured by the respective image sensors 242, 246, aligning the captured fields-of-view 240, 244, and stitching the images together to form a cohesive combined image. Stitching the images together may include correlating the overlap points 256, 258 with respective locations in corresponding images captured by the image sensors 242, 246. Although a planar view of the fields-of-view 240, 244 is shown in FIG. 2C, the fields-of-view 240, 244 are hyper-hemispherical.

A change in the alignment, such as position, tilt, or a combination thereof, of the image capture devices 204, 206, such as of the lenses 230, 232, the image sensors 242, 246, or both, may change the relative positions of the respective fields-of-view 240, 244, may change the locations of the overlap points 256, 258, such as with respect to images captured by the image sensors 242, 246, and may change the uncaptured areas 252, 254, which may include changing the uncaptured areas 252, 254 unequally.

Incomplete or inaccurate information indicating the alignment of the image capture devices 204, 206, such as the locations of the overlap points 256, 258, may decrease the accuracy, efficiency, or both of generating a combined image. In some implementations, the image capture apparatus 200 may maintain information indicating the location and orientation of the image capture devices 204, 206, such as of the lenses 230, 232, the image sensors 242, 246, or both, such that the fields-of-view 240, 244, the overlap points 256, 258, or both may be accurately determined, which may improve the accuracy, efficiency, or both of generating a combined image.

The lenses 230, 232 may be aligned along an axis (not shown), laterally offset from each other, off-center from a central axis of the image capture apparatus 200, or laterally offset and off-center from the central axis. As compared to image capture devices with back-to-back lenses, such as lenses aligned along the same axis, image capture devices including laterally offset lenses may include substantially reduced thickness relative to the lengths of the lens barrels securing the lenses. For example, the overall thickness of the image capture apparatus 200 may be close to the length of a single lens barrel as opposed to twice the length of a single lens barrel as in a back-to-back lens configuration. Reducing the lateral distance between the lenses 230, 232 may improve the overlap in the fields-of-view 240, 244, such as by reducing the uncaptured areas 252, 254.

Images or frames captured by the image capture devices 204, 206 may be combined, merged, or stitched together to produce a combined image, such as a spherical or panoramic image, which may be an equirectangular planar image. In some implementations, generating a combined image may include use of techniques such as noise reduction, tone mapping, white balancing, or other image correction. In some implementations, pixels along a stitch boundary, which may correspond with the overlap points 256, 258, may be matched accurately to minimize boundary discontinuities.

FIG. 3 is a block diagram of electronic components in an image capture apparatus 300. The image capture apparatus 300 may be a single-lens image capture device, a multi-lens image capture device, or variations thereof, including an image capture apparatus with multiple capabilities such as the use of interchangeable integrated sensor lens assemblies. Components, such as electronic components, of the image capture apparatus 100 shown in FIG. 1A-B, or the image capture apparatus 200 shown in FIGS. 2A-C, may be implemented as shown in FIG. 3, except as is described herein or as is otherwise clear from context.

The image capture apparatus 300 includes a body 302. The body 302 may be similar to the body 102 shown in FIG. 1A-1B, or the body 202 shown in FIGS. 2A-B, except as is described herein or as is otherwise clear from context. The body 302 includes electronic components such as capture components 310, processing components 320, data interface components 330, spatial sensors 340, power components 350, user interface components 360, and a bus 370.

The capture components 310 include an image sensor 312 for capturing images. Although one image sensor 312 is shown in FIG. 3, the capture components 310 may include multiple image sensors. The image sensor 312 may be similar to the image sensors 242, 246 shown in FIG. 2C, except as is described herein or as is otherwise clear from context. The image sensor 312 may be, for example, a charge-coupled device (CCD) sensor, an active pixel sensor (APS), a complementary metal-oxide-semiconductor (CMOS) sensor, or an N-type metal-oxide-semiconductor (NMOS) sensor. The image sensor 312 detects light, such as within a defined spectrum, such as the visible light spectrum or the infrared spectrum, incident through a corresponding lens such as the lens 230 with respect to the image sensor 242 as shown in FIG. 2C or the lens 232 with respect to the image sensor 246 as shown in FIG. 2C. The image sensor 312 captures detected light as image data and conveys the captured image data as electrical signals (image signals or image data) to the other components of the image capture apparatus 300, such as to the processing components 320, such as via the bus 370.

The capture components 310 include a microphone 314 for capturing audio. Although one microphone 314 is shown in FIG. 3, the capture components 310 may include multiple microphones. The microphone 314 detects and captures, or records, sound, such as sound waves incident upon the microphone 314. The microphone 314 may detect, capture, or record sound in conjunction with capturing images by the image sensor 312. The microphone 314 may detect sound to receive audible commands to control the image capture apparatus 300. The microphone 314 may be similar to the microphones 128, 130, 132 shown in FIG. 1A-1B or the audio components 218, 220, 222 shown in FIGS. 2A-2B, except as is described herein or as is otherwise clear from context.

The processing components 320 perform image signal processing, such as filtering, tone mapping, or stitching, to generate, or obtain, processed images, or processed image data, based on image data obtained from the image sensor 312. The processing components 320 may include one or more processors having single or multiple processing cores. In some implementations, the processing components 320 may include, or may be, an application specific integrated circuit (ASIC) or a digital signal processor (DSP). For example, the processing components 320 may include a custom image signal processor. The processing components 320 conveys data, such as processed image data, with other components of the image capture apparatus 300 via the bus 370. In some implementations, the processing components 320 may include an encoder, such as an image or video encoder that may encode, decode, or both, the image data, such as for compression coding, transcoding, or a combination thereof.

Although not shown expressly in FIG. 3, the processing components 320 may include memory, such as a random-access memory (RAM) device, which may be non-transitory computer-readable memory. The memory of the processing components 320 may include, or have stored thereon, executable instructions and data that can be accessed by the processing components 320 to facilitate the performance of, or cause the image capture apparatus to perform, one or more of the techniques described herein, or one or more aspects thereof.

The data interface components 330 communicates with other, such as external, electronic devices, such as a remote control, a smartphone, a tablet computer, a laptop computer, a desktop computer, or an external computer storage device. For example, the data interface components 330 may receive commands to operate the image capture apparatus 300. In another example, the data interface components 330 may transmit image data to transfer the image data to other electronic devices. The data interface components 330 may be configured for wired communication, wireless communication, or both. As shown, the data interface components 330 include an I/O interface 332, a wireless data interface 334, and a storage interface 336. In some implementations, one or more of the I/O interface 332, the wireless data interface 334, or the storage interface 336 may be omitted or combined.

The I/O interface 332 may send, receive, or both, wired electronic communications signals. For example, the I/O interface 332 may be a universal serial bus (USB) interface, such as USB type-C interface, a high-definition multimedia interface (HDMI), a FireWire interface, a digital video interface link, a display port interface link, a Video Electronics Standards Associated (VESA) digital display interface link, an Ethernet link, or a Thunderbolt link. Although one I/O interface 332 is shown in FIG. 3, the data interface components 330 include multiple I/O interfaces. The I/O interface 332 may be similar to the data interface 124 shown in FIG. 1A, except as is described herein or as is otherwise clear from context.

The wireless data interface 334 may send, receive, or both, wireless electronic communications signals. The wireless data interface 334 may be a Bluetooth interface, a ZigBee interface, a Wi-Fi interface, an infrared link, a cellular link, a near field communications (NFC) link, or an Advanced Network Technology interoperability (ANT+) link. Although one wireless data interface 334 is shown in FIG. 3, the data interface components 330 include multiple wireless data interfaces. The wireless data interface 334 may be similar to the data interface 124 shown in FIG. 1A, except as is described herein or as is otherwise clear from context.

The storage interface 336 may include a memory card connector, such as a memory card receptacle, configured to receive and operatively couple to a removable storage device, such as a memory card, and to transfer, such as read, write, or both, data between the image capture apparatus 300 and the memory card, such as for storing images, recorded audio, or both captured by the image capture apparatus 300 on the memory card. Although one storage interface 336 is shown in FIG. 3, the data interface components 330 include multiple storage interfaces. The storage interface 336 may be similar to the data interface 124 shown in FIG. 1A, except as is described herein or as is otherwise clear from context.

The spatial, or spatiotemporal, sensors 340 detect the spatial position, movement, or both, of the image capture apparatus 300. As shown in FIG. 3, the spatial sensors 340 include a position sensor 342, an accelerometer 344, and a gyroscope 346. The position sensor 342, which may be a global positioning system (GPS) sensor, may determine a geospatial position of the image capture apparatus 300, which may include obtaining, such as by receiving, temporal data, such as via a GPS signal. The accelerometer 344, which may be a three-axis accelerometer, may measure linear motion, linear acceleration, or both of the image capture apparatus 300. The gyroscope 346, which may be a three-axis gyroscope, may measure rotational motion, such as a rate of rotation, of the image capture apparatus 300. In some implementations, the spatial sensors 340 may include other types of spatial sensors. In some implementations, one or more of the position sensor 342, the accelerometer 344, and the gyroscope 346 may be omitted or combined.

The power components 350 distribute electrical power to the components of the image capture apparatus 300 for operating the image capture apparatus 300. As shown in FIG. 3, the power components 350 include a battery interface 352, a battery 354, and an external power interface 356 (ext. interface). The battery interface 352 (bat. interface) operatively couples to the battery 354, such as via conductive contacts to transfer power from the battery 354 to the other electronic components of the image capture apparatus 300. The battery interface 352 may be similar to the battery receptacle 126 shown in FIG. 1A, except as is described herein or as is otherwise clear from context. The external power interface 356 obtains or receives power from an external source, such as a wall plug or external battery, and distributes the power to the components of the image capture apparatus 300, which may include distributing power to the battery 354 via battery interface 352 to charge the battery 354. Although one battery interface 352, one battery 354, and one external power interface 356 are shown in FIG. 3, any number of battery interfaces, batteries, and external power interfaces may be used. In some implementations, one or more of the battery interface 352, the battery 354, and the external power interface 356 may be omitted or combined. For example, in some implementations, the external interface 356 and the I/O interface 332 may be combined.

The user interface components 360 receive input, such as user input, from a user of the image capture apparatus 300, output, such as display or present, information to a user, or both receive input and output information, such as in accordance with user interaction with the image capture apparatus 300.

As shown in FIG. 3, the user interface components 360 include visual output components 362 to visually communicate information, such as to present captured images. As shown, the visual output components 362 include an indicator 362.2 and a display 362.4. The indicator 362.2 may be similar to the indicator 106 shown in FIG. 1A or the indicators 208 shown in FIG. 2A, except as is described herein or as is otherwise clear from context. The display 362.4 may be similar to the display 108 shown in FIG. 1A, the display 142 shown in FIG. 1B, or the display 224 shown in FIG. 2A, except as is described herein or as is otherwise clear from context. Although the visual output components 362 are shown in FIG. 3 as including one indicator 362.2, the visual output components 362 may include multiple indicators. Although the visual output components 362 are shown in FIG. 3 as including one display 362.4, the visual output components 362 may include multiple displays. In some implementations, one or more of the indicator 362.2 or the display 362.4 may be omitted or combined.

As shown in FIG. 3, the user interface components 360 include a speaker 364. The speaker 364 may be similar to the speaker 138 shown in FIG. 1B or the audio components 218, 220, 222 shown in FIGS. 2A-B, except as is described herein or as is otherwise clear from context. Although one speaker 364 is shown in FIG. 3, the user interface components 360 may include multiple speakers. In some implementations, the speaker 364 may be omitted or combined with another component of the image capture apparatus 300, such as the microphone 314.

As shown in FIG. 3, the user interface components 360 include a physical input interface 366. The physical input interface 366 may be similar to the shutter button 112 shown in FIG. 1A, the mode button 110 shown in FIG. 1B, the shutter button 212 shown in FIG. 2A, or the mode button 210 shown in FIG. 2B, except as is described herein or as is otherwise clear from context. Although one physical input interface 366 is shown in FIG. 3, the user interface components 360 may include multiple physical input interfaces. In some implementations, the physical input interface 366 may be omitted or combined with another component of the image capture apparatus 300. The physical input interface 366 may be, for example, a button, a toggle, a switch, a dial, or a slider.

As shown in FIG. 3, the user interface components 360 include a broken line border box labeled "other", to indicate that components of the image capture apparatus 300 other than the components expressly shown as included in the user interface components 360 may be user interface components. For example, the microphone 314 may receive, or capture, and process audio signals to obtain input data, such as user input data corresponding to voice commands. In another example, the image sensor 312 may receive, or capture, and process image data to obtain input data, such as user input data corresponding to visible gesture commands. In another example, one or more of the spatial sensors 340, such as a combination of the accelerometer 344 and the gyroscope 346, may receive, or capture, and process motion data to obtain input data, such as user input data corresponding to motion gesture commands.

Figure 4:
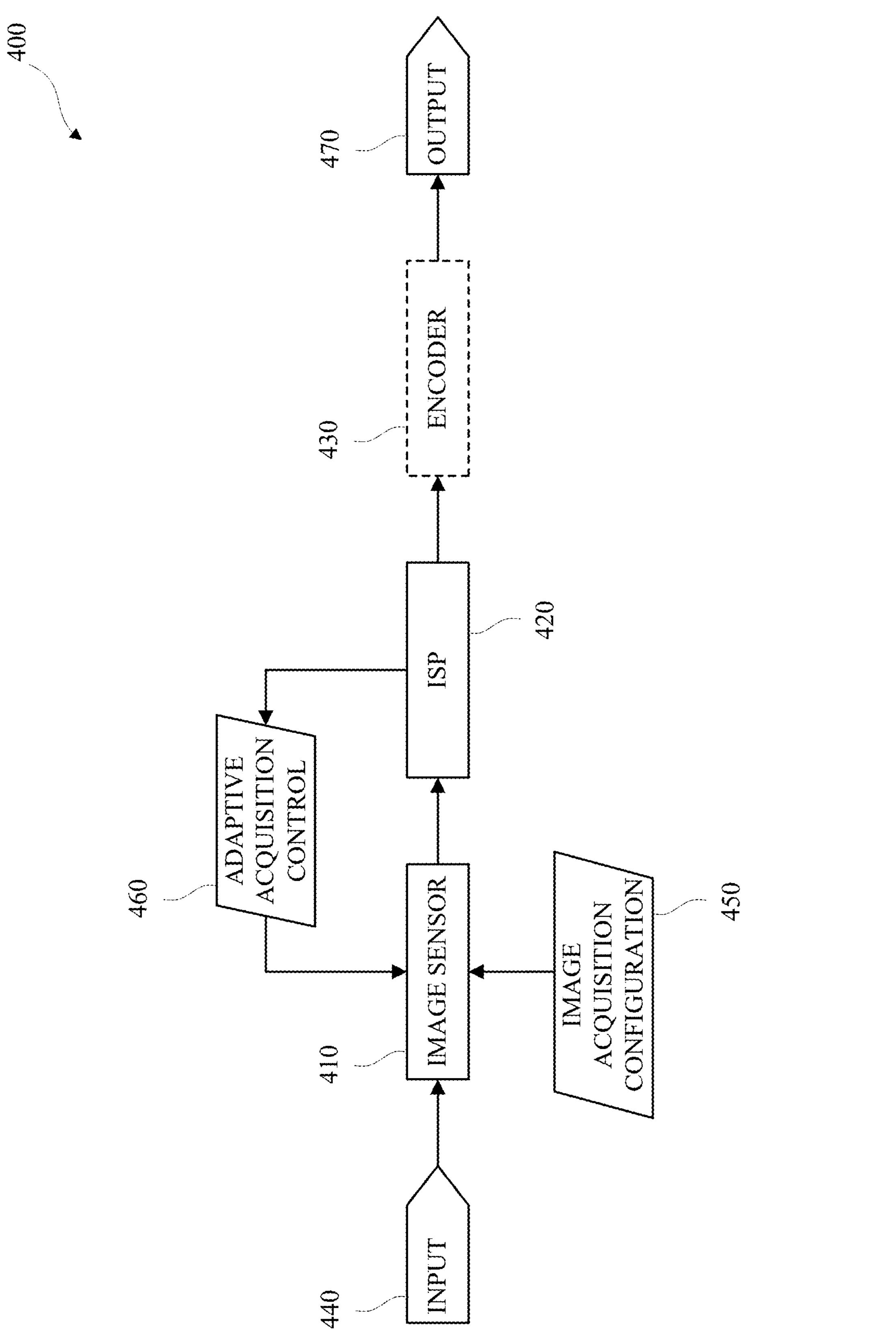
FIG. 4 is a flow diagram of an example of an image processing pipeline.

FIG. 4 is a block diagram of an example of an image processing pipeline 400. The image processing pipeline 400, or a portion thereof, is implemented in an image capture apparatus, such as the image capture apparatus 100 shown in FIGS. 1A-1B, the image capture apparatus 200 shown in FIGS. 2A-2C, the image capture apparatus 300 shown in FIG. 3, or another image capture apparatus. In some implementations, the image processing pipeline 400 may be implemented in a digital signal processor (DSP), an application-specific integrated circuit (ASIC), or a combination of a digital signal processor and an application-specific integrated circuit. One or more components of the pipeline 400 may be implemented in hardware, software, or a combination of hardware and software.

As shown in FIG. 4, the image processing pipeline 400 includes an image sensor 410, an image signal processor (ISP) 420, and an encoder 430. The encoder 430 is shown with a broken line border to indicate that the encoder may be omitted, or absent, from the image processing pipeline 400. In some implementations, the encoder 430 may be included in another device. In implementations that include the encoder 430, the image processing pipeline 400 may be an image processing and coding pipeline. The image processing pipeline 400 may include components other than the components shown in FIG. 4.

The image sensor 410 receives input 440, such as photons incident on the image sensor 410. The image sensor 410 captures image data (source image data). Capturing source image data includes measuring or sensing the input 440, which may include counting, or otherwise measuring, photons incident on the image sensor 410, such as for a defined temporal duration or period (exposure). Capturing source image data includes converting the analog input 440 to a digital source image signal in a defined format, which may be referred to herein as "a raw image signal." For example, the raw image signal may be in a format such as RGB format, which may represent individual pixels using a combination of values or components, such as a red component (R), a green component (G), and a blue component (B). In another example, the raw image signal may be in a Bayer format, wherein a respective pixel may be one of a combination of adjacent pixels, such as a combination of four adjacent pixels, of a Bayer pattern.

Although one image sensor 410 is shown in FIG. 4, the image processing pipeline 400 may include two or more image sensors. In some implementations, an image, or frame, such as an image, or frame, included in the source image signal, may be one of a sequence or series of images or frames of a video, such as a sequence, or series, of frames captured at a rate, or frame rate, which may be a number or cardinality of frames captured per defined temporal period, such as twenty-four, thirty, sixty, or one-hundred twenty frames per second.

The image sensor 410 obtains image acquisition configuration data 450. The image acquisition configuration data 450 may include image cropping parameters, binning/skipping parameters, pixel rate parameters, bitrate parameters, resolution parameters, framerate parameters, or other image acquisition configuration data or combinations of image acquisition configuration data. Obtaining the image acquisition configuration data 450 may include receiving the image acquisition configuration data 450 from a source other than a component of the image processing pipeline 400. For example, the image acquisition configuration data 450, or a portion thereof, may be received from another component, such as a user interface component, of the image capture apparatus implementing the image processing pipeline 400, such as one or more of the user interface components 360 shown in FIG. 3. The image sensor 410 obtains, outputs, or both, the source image data in accordance with the image acquisition configuration data 450. For example, the image sensor 410 may obtain the image acquisition configuration data 450 prior to capturing the source image.

The image sensor 410 receives, or otherwise obtains or accesses, adaptive acquisition control data 460, such as auto exposure (AE) data, auto white balance (AWB) data, global tone mapping (GTM) data, Auto Color Lens Shading (ACLS) data, color correction data, or other adaptive acquisition control data or combination of adaptive acquisition control data. For example, the image sensor 410 receives the adaptive acquisition control data 460 from the image signal processor 420. The image sensor 410 obtains, outputs, or both, the source image data in accordance with the adaptive acquisition control data 460.

The image sensor 410 controls, such as configures, sets, or modifies, one or more image acquisition parameters or settings, or otherwise controls the operation of the image sensor 410, in accordance with the image acquisition configuration data 450 and the adaptive acquisition control data 460. For example, the image sensor 410 may capture a first source image using, or in accordance with, the image acquisition configuration data 450, and in the absence of adaptive acquisition control data 460 or using defined values for the adaptive acquisition control data 460, output the first source image to the image signal processor 420, obtain adaptive acquisition control data 460 generated using the first source image data from the image signal processor 420, and capture a second source image using, or in accordance with, the image acquisition configuration data 450 and the adaptive acquisition control data 460 generated using the first source image. In an example, the adaptive acquisition control data 460 may include an exposure duration value and the image sensor 410 may capture an image in accordance with the exposure duration value.

The image sensor 410 outputs source image data, which may include the source image signal, image acquisition data, or a combination thereof, to the image signal processor 420.

The image signal processor 420 receives, or otherwise accesses or obtains, the source image data from the image sensor 410. The image signal processor 420 processes the source image data to obtain input image data. In some implementations, the image signal processor 420 converts the raw image signal (RGB data) to another format, such as a format expressing individual pixels using a combination of values or components, such as a luminance, or luma, value (Y), a blue chrominance, or chroma, value (U or Cb), and a red chroma value (V or Cr), such as the YUV or YCbCr formats.

Processing the source image data includes generating the adaptive acquisition control data 460. The adaptive acquisition control data 460 includes data for controlling the acquisition of a one or more images by the image sensor 410.

The image signal processor 420 includes components not expressly shown in FIG. 4 for obtaining and processing the source image data. For example, the image signal processor 420 may include one or more sensor input (SEN) components (not shown), one or more sensor readout (SRO) components (not shown), one or more image data compression components, one or more image data decompression components, one or more internal memory, or data storage, components, one or more Bayer-to-Bayer (B2B) components, one or more local motion estimation (LME) components, one or more local motion compensation (LMC) components, one or more global motion compensation (GMC) components, one or more Bayer-to-RGB (B2R) components, one or more image processing units (IPU), one or more high dynamic range (HDR) components, one or more three-dimensional noise reduction (3DNR) components, one or more sharpening components, one or more raw-to-YUV (R2Y) components, one or more Chroma Noise Reduction (CNR) components, one or more local tone mapping (LTM) components, one or more YUV-to-YUV (Y2Y) components, one or more warp and blend components, one or more stitching cost components, one or more scaler components, or a configuration controller. The image signal processor 420, or respective components thereof, may be implemented in hardware, software, or a combination of hardware and software. Although one image signal processor 420 is shown in FIG. 4, the image processing pipeline 400 may include multiple image signal processors. In implementations that include multiple image signal processors, the functionality of the image signal processor 420 may be divided or distributed among the image signal processors.

In some implementations, the image signal processor 420 may implement or include multiple parallel, or partially parallel paths for image processing. For example, for high dynamic range image processing based on two source images, the image signal processor 420 may implement a first image processing path for a first source image and a second image processing path for a second source image, wherein the image processing paths may include components that are shared among the paths, such as memory components, and may include components that are separately included in each path, such as a first sensor readout component in the first image processing path and a second sensor readout component in the second image processing path, such that image processing by the respective paths may be performed in parallel, or partially in parallel.

The image signal processor 420, or one or more components thereof, such as the sensor input components, may perform black-point removal for the image data. In some implementations, the image sensor 410 may compress the source image data, or a portion thereof, and the image signal processor 420, or one or more components thereof, such as one or more of the sensor input components or one or more of the image data decompression components, may decompress the compressed source image data to obtain the source image data.

The image signal processor 420, or one or more components thereof, such as the sensor readout components, may perform dead pixel correction for the image data. The sensor readout component may perform scaling for the image data. The sensor readout component may obtain, such as generate or determine, adaptive acquisition control data, such as auto exposure data, auto white balance data, global tone mapping data, Auto Color Lens Shading data, or other adaptive acquisition control data, based on the source image data.

The image signal processor 420, or one or more components thereof, such as the image data compression components, may obtain the image data, or a portion thereof, such as from another component of the image signal processor 420, compress the image data, and output the compressed image data, such as to another component of the image signal processor 420, such as to a memory component of the image signal processor 420.

The image signal processor 420, or one or more components thereof, such as the image data decompression, or uncompression, components (UCX), may read, receive, or otherwise access, compressed image data and may decompress, or uncompress, the compressed image data to obtain image data. In some implementations, other components of the image signal processor 420 may request, such as send a request message or signal, the image data from an uncompression component, and, in response to the request, the uncompression component may obtain corresponding compressed image data, uncompress the compressed image data to obtain the requested image data, and output, such as send or otherwise make available, the requested image data to the component that requested the image data. The image signal processor 420 may include multiple uncompression components, which may be respectively optimized for uncompression with respect to one or more defined image data formats.

The image signal processor 420, or one or more components thereof, such as the internal memory, or data storage, components. The memory components store image data, such as compressed image data internally within the image signal processor 420 and are accessible to the image signal processor 420, or to components of the image signal processor 420. In some implementations, a memory component may be accessible, such as write accessible, to a defined component of the image signal processor 420, such as an image data compression component, and the memory component may be accessible, such as read accessible, to another defined component of the image signal processor 420, such as an uncompression component of the image signal processor 420.

The image signal processor 420, or one or more components thereof, such as the Bayer-to-Bayer components, which may process image data, such as to transform or convert the image data from a first Bayer format, such as a signed 15-bit Bayer format data, to second Bayer format, such as an unsigned 14-bit Bayer format. The Bayer-to-Bayer components may obtain, such as generate or determine, high dynamic range Tone Control data based on the current image data.

Although not expressly shown in FIG. 4, in some implementations, a respective Bayer-to-Bayer component may include one or more sub-components. For example, the Bayer-to-Bayer component may include one or more gain components. In another example, the Bayer-to-Bayer component may include one or more offset map components, which may respectively apply respective offset maps to the image data. The respective offset maps may have a configurable size, which may have a maximum size, such as 129×129. The respective offset maps may have a non-uniform grid. Applying the offset map may include saturation management, which may preserve saturated areas on respective images based on R, G, and B values. The values of the offset map may be modified per-frame and double buffering may be used for the map values. A respective offset map component may, such as prior to Bayer noise removal (denoising), compensate for non-uniform black point removal, such as due to non-uniform thermal heating of the sensor or image capture device. A respective offset map component may, such as subsequent to Bayer noise removal, compensate for flare, such as flare on hemispherical lenses, and/or may perform local contrast enhancement, such a dehazing or local tone mapping.

In another example, the Bayer-to-Bayer component may include a Bayer Noise Reduction (Bayer NR) component, which may convert image data, such as from a first format, such as a signed 15-bit Bayer format, to a second format, such as an unsigned 14-bit Bayer format. In another example, the Bayer-to-Bayer component may include one or more lens shading (FSHD) component, which may, respectively, perform lens shading correction, such as luminance lens shading correction, color lens shading correction, or both. In some implementations, a respective lens shading component may perform exposure compensation between two or more sensors of a multi-sensor image capture apparatus, such as between two hemispherical lenses. In some implementations, a respective lens shading component may apply map-based gains, radial model gain, or a combination, such as a multiplicative combination, thereof. In some implementations, a respective lens shading component may perform saturation management, which may preserve saturated areas on respective images. Map and lookup table values for a respective lens shading component may be configured or modified on a per-frame basis and double buffering may be used.

In another example, the Bayer-to-Bayer component may include a PZSFT component. In another example, the Bayer-to-Bayer component may include a half-RGB (½ RGB) component. In another example, the Bayer-to-Bayer component may include a color correction (CC) component, which may obtain subsampled data for local tone mapping, which may be used, for example, for applying an unsharp mask. In another example, the Bayer-to-Bayer component may include a Tone Control (TC) component, which may obtain subsampled data for local tone mapping, which may be used, for example, for applying an unsharp mask. In another example, the Bayer-to-Bayer component may include a Gamma (GM) component, which may apply a lookup-table independently per channel for color rendering (gamma curve application). Using a lookup-table, which may be an array, may reduce resource utilization, such as processor utilization, using an array indexing operation rather than more complex computation. The gamma component may obtain subsampled data for local tone mapping, which may be used, for example, for applying an unsharp mask.

In another example, the Bayer-to-Bayer component may include an RGB binning (RGB BIN) component, which may include a configurable binning factor, such as a binning factor configurable in the range from four to sixteen, such as four, eight, or sixteen. One or more sub-components of the Bayer-to-Bayer component, such as the RGB Binning component and the half-RGB component, may operate in parallel. The RGB binning component may output image data, such as to an external memory, which may include compressing the image data. The output of the RGB binning component may be a binned image, which may include low-resolution image data or low-resolution image map data. The output of the RGB binning component may be used to extract statistics for combing images, such as combining hemispherical images. The output of the RGB binning component may be used to estimate flare on one or more lenses, such as hemispherical lenses. The RGB binning component may obtain G channel values for the binned image by averaging Gr channel values and Gb channel values. The RGB binning component may obtain one or more portions of or values for the binned image by averaging pixel values in spatial areas identified based on the binning factor. In another example, the Bayer-to-Bayer component may include, such as for spherical image processing, an RGB-to-YUV component, which may obtain tone mapping statistics, such as histogram data and thumbnail data, using a weight map, which may weight respective regions of interest prior to statistics aggregation.

The image signal processor 420, or one or more components thereof, such as the local motion estimation components, which may generate local motion estimation data for use in image signal processing and encoding, such as in correcting distortion, stitching, and/or motion compensation. For example, the local motion estimation components may partition an image into blocks, arbitrarily shaped patches, individual pixels, or a combination thereof. The local motion estimation components may compare pixel values between frames, such as successive images, to determine displacement, or movement, between frames, which may be expressed as motion vectors (local motion vectors).

The image signal processor 420, or one or more components thereof, such as the local motion compensation components, which may obtain local motion data, such as local motion vectors, and may spatially apply the local motion data to an image to obtain a local motion compensated image or frame and may output the local motion compensated image or frame to one or more other components of the image signal processor 420.

The image signal processor 420, or one or more components thereof, such as the global motion compensation components, may receive, or otherwise access, global motion data, such as global motion data from a gyroscopic unit of the image capture apparatus, such as the gyroscope 346 shown in FIG. 3, corresponding to the current frame. The global motion compensation component may apply the global motion data to a current image to obtain a global motion compensated image, which the global motion compensation component may output, or otherwise make available, to one or more other components of the image signal processor 420

The image signal processor 420, or one or more components thereof, such as the Bayer-to-RGB components, which convert the image data from Bayer format to an RGB format. The Bayer-to-RGB components may implement white balancing and demosaicing. The Bayer-to-RGB components respectively output, or otherwise make available, RGB format image data to one or more other components of the image signal processor 420.

The image signal processor 420, or one or more components thereof, such as the image processing units, which perform warping, image registration, electronic image stabilization, motion detection, object detection, or the like. The image processing units respectively output, or otherwise make available, processed, or partially processed, image data to one or more other components of the image signal processor 420.

The image signal processor 420, or one or more components thereof, such as the high dynamic range components, may, respectively, generate high dynamic range images based on the current input image, the corresponding local motion compensated frame, the corresponding global motion compensated frame, or a combination thereof. The high dynamic range components respectively output, or otherwise make available, high dynamic range images to one or more other components of the image signal processor 420.

The high dynamic range components of the image signal processor 420 may, respectively, include one or more high dynamic range core components, one or more tone control (TC) components, or one or more high dynamic range core components and one or more tone control components. For example, the image signal processor 420 may include a high dynamic range component that includes a high dynamic range core component and a tone control component. The high dynamic range core component may obtain, or generate, combined image data, such as a high dynamic range image, by merging, fusing, or combining the image data, such as unsigned 14-bit RGB format image data, for multiple, such as two, images (HDR fusion) to obtain, and output, the high dynamic range image, such as in an unsigned 23-bit RGB format (full dynamic data). The high dynamic range core component may output the combined image data to the Tone Control component, or to other components of the image signal processor 420. The Tone Control component may compress the combined image data, such as from the unsigned 23-bit RGB format data to an unsigned 17-bit RGB format (enhanced dynamic data).

The image signal processor 420, or one or more components thereof, such as the three-dimensional noise reduction components reduce image noise for a frame based on one or more previously processed frames and output, or otherwise make available, noise reduced images to one or more other components of the image signal processor 420. In some implementations, the three-dimensional noise reduction component may be omitted or may be replaced by one or more lower-dimensional noise reduction components, such as by a spatial noise reduction component. The three-dimensional noise reduction components of the image signal processor 420 may, respectively, include one or more temporal noise reduction (TNR) components, one or more raw-to-raw (R2R) components, or one or more temporal noise reduction components and one or more raw-to-raw components. For example, the image signal processor 420 may include a three-dimensional noise reduction component that includes a temporal noise reduction component and a raw-to-raw component.

The image signal processor 420, or one or more components thereof, such as the sharpening components, obtains sharpened image data based on the image data, such as based on noise reduced image data, which may recover image detail, such as detail reduced by temporal denoising or warping. The sharpening components respectively output, or otherwise make available, sharpened image data to one or more other components of the image signal processor 420.

The image signal processor 420, or one or more components thereof, such as the raw-to-YUV components, may transform, or convert, image data, such as from the raw image format to another image format, such as the YUV format, which includes a combination of a luminance (Y) component and two chrominance (UV) components. The raw-to-YUV components may, respectively, demosaic, color process, or a both, images.

Although not expressly shown in FIG. 4, in some implementations, a respective raw-to-YUV component may include one or more sub-components. For example, the raw-to-YUV component may include a white balance (WB) component, which performs white balance correction on the image data. In another example, a respective raw-to-YUV component may include one or more color correction components (CC0, CC1), which may implement linear color rendering, which may include applying a 3×3 color matrix. For example, the raw-to-YUV component may include a first color correction component (CC0) and a second color correction component (CC1). In another example, a respective raw-to-YUV component may include a three-dimensional lookup table component, such as subsequent to a first color correction component. Although not expressly shown in FIG. 4, in some implementations, a respective raw-to-YUV component may include a Multi-Axis Color Correction (MCC) component, such as subsequent to a three-dimensional lookup table component, which may implement non-linear color rendering, such as in Hue, Saturation, Value (HSV) space.

In another example, a respective raw-to-YUV component may include a black point RGB removal (BPRGB) component, which may process image data, such as low intensity values, such as values within a defined intensity threshold, such as less than or equal to, 28, to obtain histogram data wherein values exceeding a defined intensity threshold may be omitted, or excluded, from the histogram data processing. In another example, a respective raw-to-YUV component may include a Multiple Tone Control (Multi-TC) component, which may convert image data, such as unsigned 17-bit RGB image data, to another format, such as unsigned 14-bit RGB image data. The Multiple Tone Control component may apply dynamic tone mapping to the Y channel (luminance) data, which may be based on, for example, image capture conditions, such as light conditions or scene conditions. The tone mapping may include local tone mapping, global tone mapping, or a combination thereof.

In another example, a respective raw-to-YUV component may include a Gamma (GM) component, which may convert image data, such as unsigned 14-bit RGB image data, to another format, such as unsigned 10-bit RGB image data. The Gamma component may apply a lookup-table independently per channel for color rendering (gamma curve application). Using a lookup-table, which may be an array, may reduce resource utilization, such as processor utilization, using an array indexing operation rather than more complex computation. In another example, a respective raw-to-YUV component may include a three-dimensional lookup table (3DLUT) component, which may include, or may be, a three-dimensional lookup table, which may map RGB input values to RGB output values through a non-linear function for non-linear color rendering. In another example, a respective raw-to-YUV component may include a Multi-Axis Color Correction (MCC) component, which may implement non-linear color rendering. For example, the multi-axis color correction component may perform color non-linear rendering, such as in Hue, Saturation, Value (HSV) space.

The image signal processor 420, or one or more components thereof, such as the Chroma Noise Reduction (CNR) components, may perform chroma denoising, luma denoising, or both.

The image signal processor 420, or one or more components thereof, such as the local tone mapping components, may perform multi-scale local tone mapping using a single pass approach or a multi-pass approach on a frame at different scales. The as the local tone mapping components may, respectively, enhance detail and may omit introducing artifacts. For example, the Local Tone Mapping components may, respectively, apply tone mapping, which may be similar to applying an unsharp-mask. Processing an image by the local tone mapping components may include obtaining, processing, such as in response to gamma correction, tone control, or both, and using a low-resolution map for local tone mapping.

The image signal processor 420, or one or more components thereof, such as the YUV-to-YUV (Y2Y) components, may perform local tone mapping of YUV images. In some implementations, the YUV-to-YUV components may include multi-scale local tone mapping using a single pass approach or a multi-pass approach on a frame at different scales.

The image signal processor 420, or one or more components thereof, such as the warp and blend components, may warp images, blend images, or both. In some implementations, the warp and blend components may warp a corona around the equator of a respective frame to a rectangle. For example, the warp and blend components may warp a corona around the equator of a respective frame to a rectangle based on the corresponding low-resolution frame. The warp and blend components, may, respectively, apply one or more transformations to the frames, such as to correct for distortions at image edges, which may be subject to a close to identity constraint.

The image signal processor 420, or one or more components thereof, such as the stitching cost components, may generate a stitching cost map, which may be represented as a rectangle having disparity (x) and longitude (y) based on a warping. Respective values of the stitching cost map may be a cost function of a disparity (x) value for a corresponding longitude. Stitching cost maps may be generated for various scales, longitudes, and disparities.

The image signal processor 420, or one or more components thereof, such as the scaler components, may scale images, such as in patches, or blocks, of pixels, such as 16×16 blocks, 8×8 blocks, or patches or blocks of any other size or combination of sizes.

The image signal processor 420, or one or more components thereof, such as the configuration controller, may control the operation of the image signal processor 420, or the components thereof.

The image signal processor 420 outputs processed image data, such as by storing the processed image data in a memory of the image capture apparatus, such as external to the image signal processor 420, or by sending, or otherwise making available, the processed image data to another component of the image processing pipeline 400, such as the encoder 430, or to another component of the image capture apparatus.

The encoder 430 encodes or compresses the output of the image signal processor 420. In some implementations, the encoder 430 implements one or more encoding standards, which may include motion estimation. The encoder 430 outputs the encoded processed image to an output 470. In an embodiment that does not include the encoder 430, the image signal processor 420 outputs the processed image to the output 470. The output 470 may include, for example, a display, such as a display of the image capture apparatus, such as one or more of the displays 108, 142 shown in FIGS. 1A-1B, the display 224 shown in FIG. 2A-2C, or the display 362.4 shown in FIG. 3, to a storage device, or both. The output 470 is a signal, such as to an external device.

Figure 5:
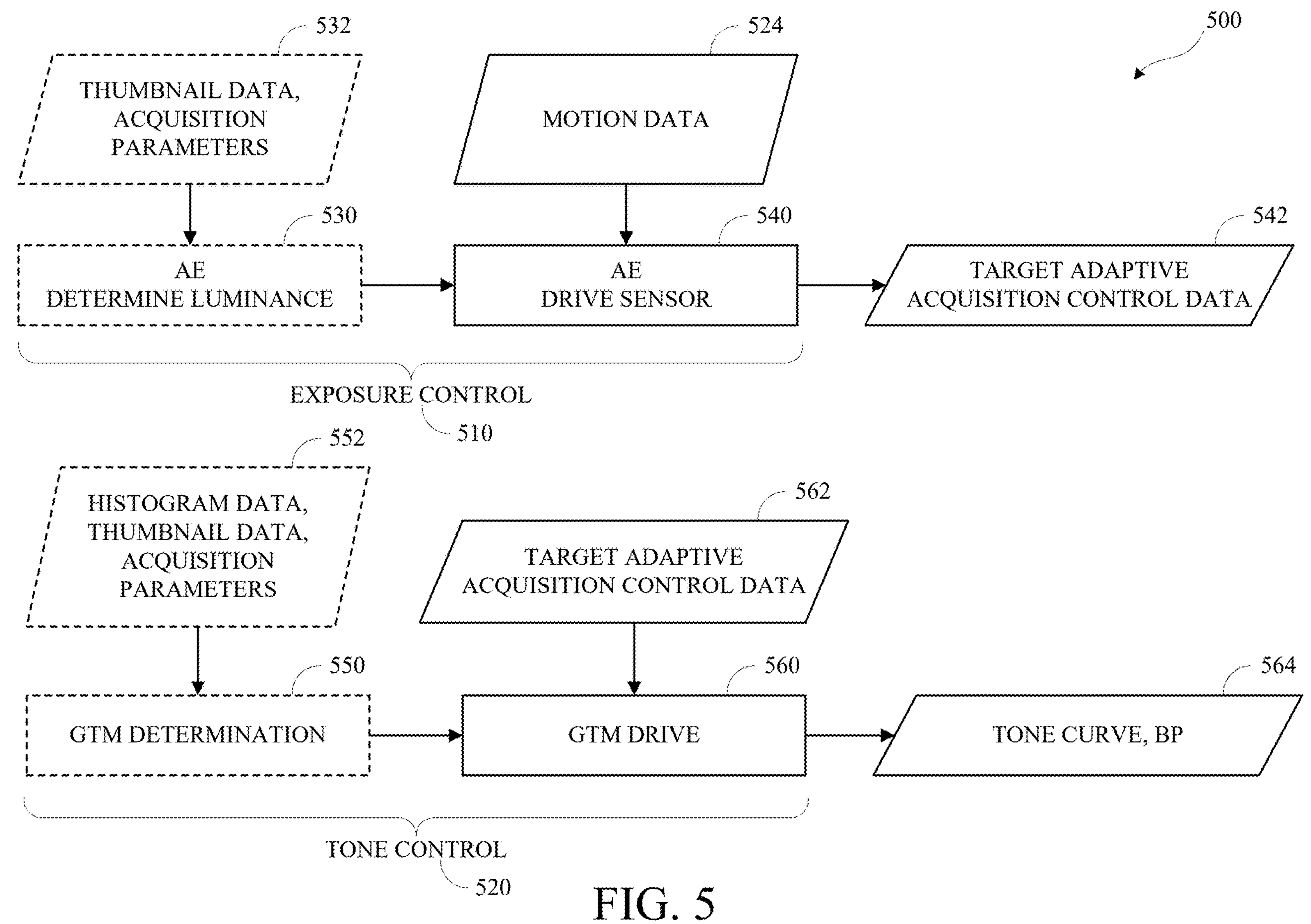
FIG. 5 is a block diagram of an example of an adaptive acquisition control component.

FIG. 5 is a block diagram of an example of an adaptive acquisition control component 500. The adaptive acquisition control component 500, or a portion thereof, is implemented in an image capture apparatus, such as the image capture apparatus 100 shown in FIGS. 1A-1B, the image capture apparatus 200 shown in FIGS. 2A-2C, the image capture apparatus 300 shown in FIG. 3, as a part, or parts, of the image processing pipeline 400, or in another image capture apparatus. In some implementations, the adaptive acquisition control component 500 may be implemented in a digital signal processor (DSP), an application-specific integrated circuit (ASIC), or a combination of a digital signal processor and an application-specific integrated circuit. One or more aspects of the adaptive acquisition control component 500 may be implemented in hardware, software, or a combination of hardware and software.

The adaptive acquisition control component 500 determines and controls the exposure for images, or frames, captured by an image capture apparatus, such as a RAW image as captured by a sensor of the image capture apparatus, and processed by the image processing pipeline thereof, that implements the adaptive acquisition control component 500, to obtain, and output, a processed, or partially processed, image, or frame.

In some implementations, the effective, or operative, sensitivity of an image sensor, such as the image sensor of the image capture device 104 shown in FIGS. 1A-1B, the first image sensor 242 of the first image capture device 204 shown in FIGS. 2A-2C, the second image sensor 246 of the second image capture device 206 shown in FIGS. 2A-2C, the image sensor 312 shown in FIG. 3, or the image sensor 410 shown in FIG. 4, is expressed, controlled, or both, as a gain value, which may be a floating point value, such as one (1.0). The gain value may be expressed or presented, such as to a user of the image capture apparatus, as an International Standards Organization (ISO) equivalence value (ISO value), which may be expressed as ISO value=gain*100. The exposure for an image, or frame, indicates the perceived luminosity or brightness of the image and may be expressed as a mean gray level of a luminance, or luma, channel or a median of the luminance, or luma, histogram thereof. Accurate exposure correlates to perceived image quality. Low, or dark, exposure and high, or bright, exposure may be perceived as low quality.

As shown in FIG. 5, the adaptive acquisition control component 500 includes an exposure control, or auto-exposure, portion, or component, 510 and a tone control portion, or component, 520. The adaptive acquisition control component 500 may include components other than the components shown in FIG. 5. For example, the image capture apparatus that implements the adaptive acquisition control component 500 may include an image sensor, such as the image sensors 242, 246 shown in FIG. 2C, the image sensor 312 shown in FIG. 3, or the image sensor 410 shown in FIG. 4, and an image signal processor, such as the image signal processor 420 shown in FIG. 4, and the adaptive acquisition control component 500 may include the image sensor, or a portion thereof, the image signal processor, or a portion thereof, or one or more portions of the image sensor and the image signal processor.

The exposure control portion 510 determines adaptive acquisition control data, such as one or more adaptive acquisition control parameters, for subsequent image capture, video capture, or both, to balance motion blur minimization and signal-to-noise ratio (SNR), or quality, maximization. As shown in FIG. 5, the exposure control portion 510 includes an auto-exposure luminance determination component 530 (AE DETERMINE LUMINANCE) and an auto-exposure sensor driver 540 (AE DRIVE SENSOR).

The auto-exposure luminance determination component 530 obtains, determines, selects, generates, calculates, produces, or identifies, a scene luminance value, a corresponding target exposure value (targetY), or both. The auto-exposure luminance determination component 530 is shown with a broken line boarder to indicate that the auto-exposure luminance determination component 530 obtains, determines, selects, generates, calculates, produces, or identifies, the scene luminance value, the corresponding target exposure value, or both, periodically, such as in accordance with a determined, or defined, adaptive acquisition control sample period, or corresponding adaptive acquisition control sample rate, which is determined, or defined, in accordance with a current, active, or operative, frame rate for video capture, such as at a fraction of the frame rate, such as one third the frame rate. For example, the operative, active, or current, frame rate may be thirty frames per second (30 fps) and the auto-exposure luminance determination component 530 may obtain, generate, calculate, or determine the scene luminance value and the corresponding target exposure value at an adaptive acquisition control sample rate of ten frames per second (10 fps), such as on a per three captured frames basis. Although described with reference to a determined, or defined, adaptive acquisition control sample period, or corresponding adaptive acquisition control sample rate, other timing control may be implemented.

The auto-exposure luminance determination component 530 accesses, such as reads, such as from a memory of the image capture apparatus, receives, or otherwise obtains, adaptive acquisition control input data 532. The adaptive acquisition control input data 532 is shown with a broken line boarder to indicate that the adaptive acquisition control input data 532 is obtained periodically, such as in accordance with the adaptive acquisition control sample rate, such as on a per-third frame basis for video captured at thirty frames per second (30 fps).

The adaptive acquisition control input data 532 includes adaptive acquisition control data (ACQUISITION PARAMETERS) used to capture an image, or frame, such as an image, or frame, captured in accordance with the adaptive acquisition control sample rate, and, representative image data (THUMBNAIL DATA) obtained from the image, or frame, captured in accordance with the adaptive acquisition control sample rate, such as a reduced image corresponding to the captured image, such as a thumbnail image generated from the captured image, which may be in RGB format (thumbnailRGB), or in another image format, such as another RAW image format, or which may be luminance, or luma, data thereof (thumbnailY), generated from the captured image.

Although not expressly shown in FIG. 5, the adaptive acquisition control input data 532 may include representative histogram data for the image, or frame, as shown, captured in accordance with the adaptive acquisition control sample rate, which may be, or include, histogram data for a raw image, for one or more channels of the image, or frame, which constructively represent the current image. For example, the histogram data may include a histogram of a luminance, or luma, channel of the image, or frame, (histogramY), respective per-channel histograms for the image, or frame, in RGB format (histogramsRGB), or a combination or collection thereof.

Although the adaptive acquisition control input data 532 is shown in FIG. 5 as including the representative image data (THUMBNAIL DATA), other image data, histogram data, or both, may be included in the adaptive acquisition control input data 532. For example, the adaptive acquisition control input data 532 may include the luma histogram (histogramY), the luma thumbnail (thumbnailY), a RAW, or RGB, format thumbnail (thumbnailRGB), per-channel RGB histograms (histogramsRGB), or a combination or collection thereof, of the image, or frame, as captured in accordance with the adaptive acquisition control sample rate.

Although described as constructively representing the current, or most recently captured, image, the representative image data may be generated from, or using, the current image, or a previously captured image captured sequentially before the current image, in accordance with the adaptive acquisition control sample rate. For example, the frame rate may be thirty frames per second (30 fps), first representative image data may be generated from, or using, the sequentially first captured image, and second representative image data may be generated from, or using, the sequentially fourth captured image. For example, the image capture apparatus, or a component thereof, such as the image sensor, may generate, as the representative image, an RGB format thumbnail image by down sampling, subsampling, such as spatially subsampling, cropping, or a combination thereof, the corresponding captured image, and the image capture apparatus, or a component thereof, may include the representative image and the adaptive acquisition control data obtained for capturing the current image in the adaptive acquisition control input data 532. In some implementations, the adaptive acquisition control data may be data output by the auto-exposure sensor driver 540 in accordance with processing a previous frame.

As used herein, the terms "current image", "current frame", "most recently captured image", "most recently captured frame", "source frame", "source image", "input frame", "input image", or variations thereof, refers to the image, or frame, temporally most recently output by the image sensor, except as is described herein or as is otherwise clear from context. For example, in some implementations, the image sensor may have latency such that the current image, or frame, or a portion thereof, may be output by the image sensor concurrently with capturing, or otherwise processing within the image sensor, a temporally subsequent image, or frame, or a portion thereof.

The auto-exposure luminance determination component 530 obtains, determines, selects, generates, calculates, produces, or identifies, the scene luminance value in accordance with the adaptive acquisition control input data 532. Obtaining the scene luminance value may include determining a mean gray level of the representative image from the adaptive acquisition control input data 532. Obtaining the scene luminance value includes determining a scene exposition value using the adaptive acquisition control data, from the adaptive acquisition control input data 532, used to capture the image from which the image capture apparatus obtained the representative, or thumbnail, image, which includes a gain value and an exposure duration used to capture the image from which the image capture apparatus obtained the representative image. The scene exposition value is obtained as a product of multiplying the gain value by the exposure duration (gain*exposureDuration). The scene luminance (sceneLuminance) is proportional to a result of dividing the mean gray value (meanGrayLevel) by the scene exposition value (gain*exposureDuration), which may be expressed as scene luminance∝meanGrayLevel/(gain*exposureDuration). The mean gray value (meanGrayLevel) may be expressed as a value, such as an integer value or a floating-point value, in a defined range, such as 0-255. The mean gray value (meanGrayLevel) may be a weighted mean gray value obtained using weighted pixel values obtained by weighting the pixel values from the representative image in accordance with a weighting map that indicates respective weights for the pixel values from the representative image. In some implementations, the adaptive acquisition control data, from the adaptive acquisition control input data 532 may include an aperture value used to capture the image from which the image capture apparatus obtained the representative, or thumbnail, image, and the scene luminance may be obtained using the aperture value, which may be expressed as the following:

$$sceneLuminance = meanGreyLevel * \text{aperture}^2 / (\text{gain} * exposureDuration). \quad \text{[Equation 1]}$$

Other techniques for obtaining the scene luminance may be used.

The auto-exposure luminance determination component 530 obtains, determines, selects, generates, calculates, produces, or identifies, an auto-exposure target exposure value (targetY) in accordance with the scene luminance value (sceneLuminance). The auto-exposure target exposure value (targetY) is obtained using a tuned, such as manually tuned, curve, which may be implemented as a lookup table, that maps target exposure values to corresponding scene luminance values. The auto-exposure target exposure value (targetY) may be expressed a value, such as an integer value or a floating-point value, in a defined range, such as 0-255.

The auto-exposure luminance determination component 530 outputs, such as stores in a memory of the image capture apparatus, or otherwise makes available, the scene luminance value (sceneLuminance), the auto-exposure target exposure value (targetY), or both. For example, the auto-exposure luminance determination component 530 may send the scene luminance value (sceneLuminance), the auto-exposure target exposure value (targetY), or both, to the auto-exposure sensor driver 540. In some implementations, the auto-exposure luminance determination component 530 may output the adaptive acquisition control input data 532, or a portion or portions thereof, such as to the auto-exposure sensor driver 540.

The auto-exposure sensor driver 540 accesses, such as reads, such as from a memory of the image capture apparatus, receives, or otherwise obtains, the target exposure value (targetY). For example, the auto-exposure sensor driver 540 may receive the target exposure value (targetY) from the auto-exposure luminance determination component 530. In some implementations, the auto-exposure sensor driver 540 may obtain the target exposure value (targetY) in accordance with the adaptive acquisition control sample rate. For frames other than frames for which auto-exposure luminance determination component 530 generates data, the auto-exposure sensor driver 540 may use a previously obtained target exposure value (targetY). Although not expressly shown in FIG. 5, in some implementations, the auto-exposure sensor driver 540 may access, such as read, such as from a memory of the image capture apparatus, receive, or otherwise obtain, the scene luminance value (sceneLuminance), a previously obtained target exposure value, such as the target exposure value obtained for the most recently processed image obtained prior to processing the current image, the adaptive acquisition control input data 532, a portion thereof, or a combination thereof.

The auto-exposure sensor driver 540 accesses, such as reads, such as from a memory of the image capture apparatus, receives, or otherwise obtains, motion data 524, such as on a per-frame basis. The motion data 524 indicates, represents, or describes motion of the image capture apparatus, captured, generated, or determined, in accordance with, such as concurrently with, capturing the current image. The motion data 524 may include angular speed data that indicates an angular component of motion velocity of the image capture apparatus in accordance with capturing the current image. For example, the angular speed data may be determined using data from a motion sensor, or combination of motion sensors, of the image capture apparatus, such as a gyroscope, such as the gyroscope 346 shown in FIG. 3, an accelerometer, such as the accelerometer 344 shown in FIG. 3, or a combination thereof. In some implementations, the auto-exposure sensor driver 540 omits obtaining and using the motion data.

Figure 6:
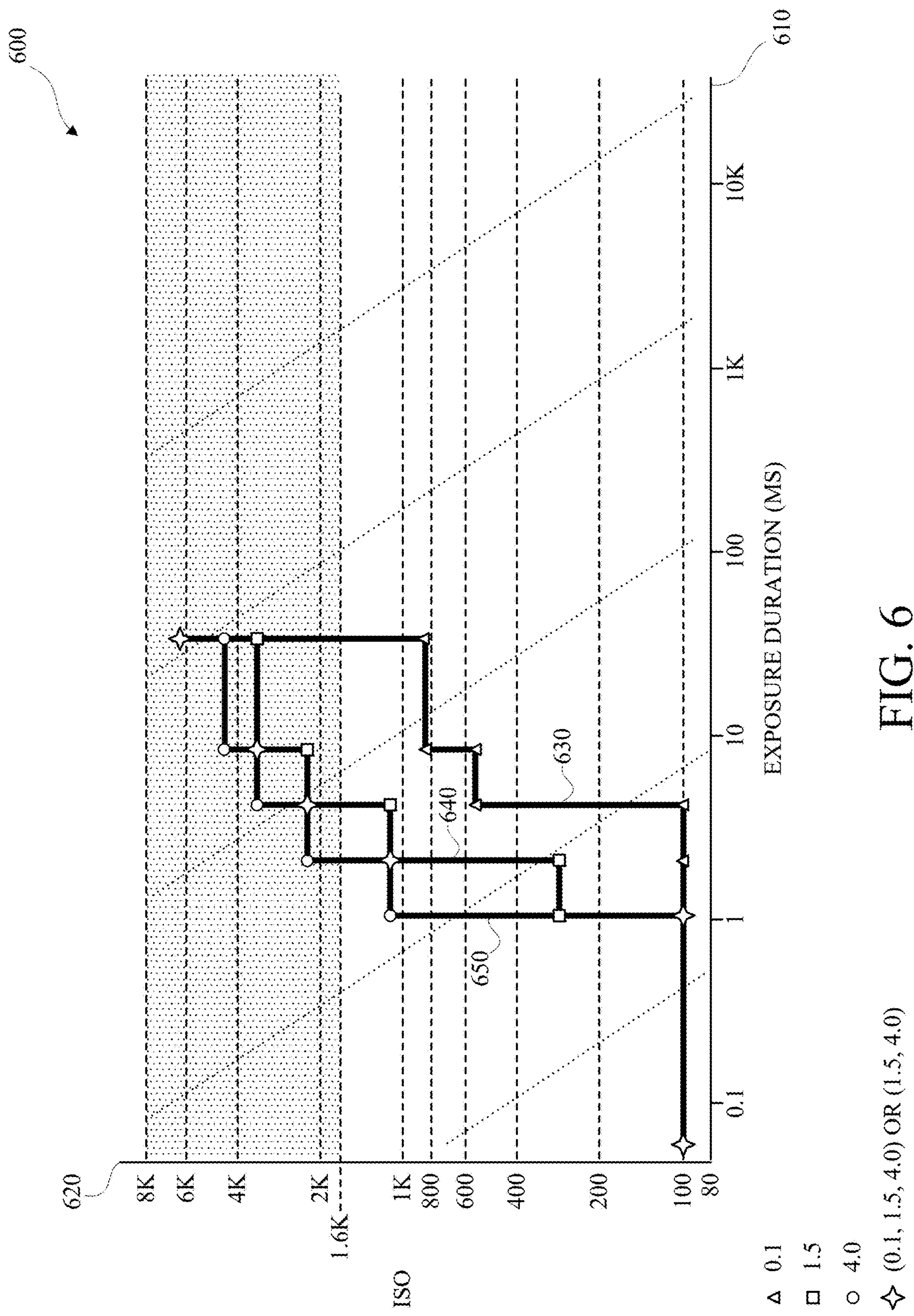
FIG. 6 is a graph of an example of defined gain-exposure duration curves.

Although not expressly shown in FIG. 5, the auto-exposure sensor driver 540 accesses, such as reads, such as from a memory of the image capture apparatus, receives, or otherwise obtains, one or more gain-exposure duration curves, such as previously, such as manually, defined, or tuned, gain-exposure duration curves, such as the gain-exposure duration curves shown in FIG. 6, or interpolated gain-exposure duration curves interpolated from the gain-exposure duration curves shown in FIG. 6. The gain-exposure duration curves may be implemented as look up tables. The gain-exposure duration curves, respectively define or describe the allocation, or mapping, of a target exposure, such as the target exposure value (targetY) obtained from the auto-exposure luminance determination component 530, to an exposure duration value, a gain value, or a combination thereof.

Based on, using, or in accordance with, the target exposure value (targetY), the gain-exposure duration curves, the motion data, or a combination thereof, the auto-exposure sensor driver 540 obtains, determines, selects, generates, calculates, produces, or identifies, target adaptive acquisition control data 542, such as the parameters of the adaptive acquisition control data 460 shown in FIG. 4, for subsequent use, such as subsequent image, or frame, capture or subsequent processing of images captured in accordance therewith. The auto-exposure sensor driver 540 includes the exposure duration value, the gain value, or both, in the target adaptive acquisition control data 542. The exposure duration value and the gain value may be expressed as a couple or tuple ([exposureDuration, gain]). In some implementations, the exposure duration value and the gain value may be expressed as an exposition parameter that is a product of multiplying the exposure duration value by the gain value.

The auto-exposure sensor driver 540 identifies a current gain-exposure duration curve from the previously defined gain-exposure duration curves or by generating a respective interpolated gain-exposure duration curve from one or more of the previously defined gain-exposure duration curves, in accordance with the motion data 524. For example, the motion data 524 may indicate little or zero motion, such as motion less than a defined minimum motion threshold, and a corresponding gain-exposure duration curve, such as the low angular speed gain-exposure duration curve 630 shown in FIG. 6, may be used. In another example, the motion data 524 may indicate high motion, such as motion greater than a defined maximum motion threshold, and a corresponding gain-exposure duration curve, such as the high angular speed gain-exposure duration curve 650 shown in FIG. 6, may be used. In another example, the motion data 524 may indicate medium or moderate motion, such as motion greater than the defined minimum motion threshold and less than the defined maximum motion threshold, and a corresponding gain-exposure duration curve, such as the medium angular speed gain-exposure duration curve 640 shown in FIG. 6, may be used. Other thresholds and metrics may be defined or determined for generating and using interpolated gain-exposure duration curves as described with respect to FIG. 6.

To identify the current gain-exposure duration curve, the auto-exposure sensor driver 540 may obtain, generate, calculate, or determine, one or more interpolated gain-exposure duration curves based on the one or more previously defined gain-exposure duration curves. For example, the auto-exposure sensor driver 540, or another component of the image capture apparatus, may obtain, generate, calculate, or determine, the one or more interpolated gain-exposure duration curves in accordance with the angular speed data, which may include generating, storing, or both, corresponding look up tables representing the respective interpolated gain-exposure duration curves. One or more of the previously defined gain-exposure duration curves may be associated with, and used for, respective angular speeds. For angular speeds other than the angular speeds associated with previously defined gain-exposure duration curves, current interpolated gain-exposure duration curves may be interpolated based on the previously defined gain-exposure duration curves.

The auto-exposure sensor driver 540 obtains, determines, selects, generates, calculates, produces, or identifies, the target exposure duration value (exposureDuration) and the target gain value (gain) for the target adaptive acquisition control data 542 using the target exposure value (targetY) and the current gain-exposure duration curve.

To obtain the target exposure duration value (exposureDuration) and the target gain value (gain) using the target exposure value (targetY) and the current gain-exposure duration curve, the auto-exposure sensor driver 540 obtains, determines, selects, generates, calculates, produces, or identifies, a maximum exposure duration threshold (expDurMax) for the current frame. The exposure duration may be limited by the framerate (fps), such that determining a maximum exposure duration threshold (expDurMax) may be expressed as expDurMax=1/fps. For example, the maximum exposure duration threshold (expDurMax) for capturing a frame in accordance with a frame rate of thirty frames per second (30 fps) is, approximately, thirty-three milliseconds (33 ms). In some implementations, obtaining the target exposure duration value (exposureDuration) and the target gain value (gain) using the target exposure value (targetY) may include determining a difference between the target exposure value (targetY) and the previously obtained target exposure value to determine whether increase or decrease the target exposure duration value (exposureDuration) and the target gain value (gain) relative to the exposure duration value and target gain value from the adaptive acquisition control input data 532. In some implementations, obtaining the target exposure duration value (exposureDuration) and the target gain value (gain) may include obtaining a difference between the exposure duration value and target gain value from the adaptive acquisition control input data 532 and the target exposure duration value (exposureDuration) and the target gain value (gain).

To obtain the target exposure duration value (exposureDuration) using the target exposure value (targetY), the current gain-exposure duration curve, and the maximum exposure duration threshold (expDurMax), the auto-exposure sensor driver 540 obtains, determines, selects, generates, calculates, produces, or identifies, a maximal exposure duration value from the current gain-exposure duration curve that is less than or equal to the maximum exposure duration threshold (expDurMax) and that, for a current gain value of one (1), corresponds with an exposition value that is less than or equal to the target exposure value (targetY), wherein the exposition value for a respective exposure duration value from the current gain-exposure duration curve is a product of multiplying the respective exposure duration value by the current gain value, and uses the maximal exposure duration value as the target exposure duration value (exposureDuration). The auto-exposure sensor driver 540 may obtain, determine, select, or identify the target exposure duration value (exposureDuration) by iterating through exposure duration values available from the current gain-exposure duration curve that are less than or equal to the maximum exposure duration threshold (expDurMax) in increasing order.

The exposition value corresponding to the target exposure duration value (exposureDuration) and the current gain value of one (1) may be equal to, or match, the target exposure value (targetY), and the current gain value of one (1) may be used as the target gain value (gain).

The exposition value corresponding to the target exposure duration value (exposureDuration) and the current gain value of one (1) may be less than the target exposure value (targetY), and the auto-exposure sensor driver 540 may obtain, determine, select, or identify the target gain value (gain) using the target exposure value (targetY), the current gain-exposure duration curve, and the target exposure duration value (exposureDuration). To obtain, determine, select, or identify the target gain value (gain) using the target exposure value (targetY), the current gain-exposure duration curve, and the target exposure duration value (exposureDuration), the auto-exposure sensor driver 540 obtains, determines, selects, generates, calculates, produces, or identifies, a maximal gain value from the current gain-exposure duration curve that, for the target exposure duration value (exposureDuration), corresponds with an exposition value that is less than or equal to the target exposure value (targetY), wherein the exposition value for a respective exposure duration value from the current gain-exposure duration curve is a product of multiplying the respective gain value by the target exposure duration value (exposureDuration), and uses the maximal gain value as the target gain value (gain). The auto-exposure sensor driver 540 may obtain, determine, select, or identify the target gain value (gain) by iterating through gain values available from the current gain-exposure duration curve in increasing order.

The auto-exposure sensor driver 540 outputs, such as stores in a memory of the image capture apparatus, sends, or otherwise makes accessible, the target adaptive acquisition control data 542 including the target exposure duration value (exposureDuration) and the target gain value (gain), which may be expressed as a couple, or tuple, ([exposureDuration, gain]). For example, the auto-exposure sensor driver 540 may output the target adaptive acquisition control data 542 to an image sensor, such as the image sensor 410 shown in FIG. 4, of the image capture apparatus, to control the capture of a subsequent, such as immediately subsequent, image or frame. The target adaptive acquisition control data 542 is shown with a solid line border to indicate that the target adaptive acquisition control data 542 is output on a per-frame basis.

The auto-exposure sensor driver 540 is shown with a solid line border to indicate that the auto-exposure sensor driver 540 operates, such as obtains motion data 524, outputs the target adaptive acquisition control data 542, or both, on a per-frame basis. The auto-exposure sensor driver 540 may omit obtaining, processing, or modifying the current image, or frame.

As indicated above, the exposure control portion 510 determines and outputs the target adaptive acquisition control data 542, which may include target exposure duration value (exposureDuration), target gain value (gain), which may be expressed as a couple, or tuple, ([exposureDuration, gain]), such as on a per-frame basis. The target gain value (gain) may be interpreted, or used, such as by the image sensor, as a combination of an analog gain value and a digital gain value, such as a product of multiplying the analog gain by the digital gain. The analog gain is applied electrically on the sensor prior to analog-to-digital conversion, or capture, of the input signal (photons) to obtain an image, or frame. The digital gain is applied to the captured, or RAW, image, or frame, such as by the image sensor, the image signal processor, or by a combination of the image sensor and the image signal processor. The product of multiplying the analog gain by the digital gain may be referred to as the sensor gain. The sensor gain may be applied, such as globally, to the pixels of an image, or frame.

Although not shown in FIG. 5, the image sensor may obtain the adaptive acquisition control data, or a portion thereof, from the exposure control portion 510 and may capture one or more images, or frames, in accordance therewith. Adaptive acquisition control data indicating relatively high exposure values may correspond with an oversaturated image, wherein image detail is lost in bright areas and is unavailable for image processing. Adaptive acquisition control data indicating relatively low exposure values may correspond with an undersaturated image, wherein image detail is dark areas is subject to sensor noise such that applying a digital gain greater than one may increase the sensor noise. Determining adaptive acquisition control data, such as the determination of the target adaptive acquisition control data 542 shown in FIG. 5, may include balancing sensor gain and exposure duration to obtain an image (processed image), or frame, having a target exposure, maximizing the information available in the image, and limiting or eliminating image saturation, motion blur, or both.

The tone control portion 520 obtains a global tone mapping tone curve, which may be a dynamically, or adaptively, generated tone curve, for an image, such as an input, or RAW image, such as the current image, for use in processing the current image to obtain a processed, or partially processed, image. A tone curve, such as the global tone mapping tone curve, may be used to implement, or apply, a digital gain to an image, such as in accordance with respective pixel values from the image, and may be adaptive to the image content. The global tone mapping tone curve may be implemented as a look up table (LUT), that maps input luminance values from pixels in an input image, in a respective defined range, to a corresponding output luminance value that is included for the respective pixels in an output image, which is the processed, or partially processed, image.

The tone control portion 520 obtains a global tone mapping black point value, which may be or include per-channel values, for the image, to obtain the processed, or partially processed image. The global tone mapping black point value corresponds to a determined black point for the respective image, such as on a per-channel basis, which is subtracted from the respective image, such as on a per-channel and per-pixel basis, and is adaptive to the image content. The black point value is used to apply a shift on the pixel values of the image to maximize the accuracy of dark, such as black or near black, pixels. Subtracting the black point value from the pixel values, such as per-channel, may preserve the relative pixel values and adjust the pixel values so that the mean of dark pixels in the image after subtracting the black point value is zero (0) or approximately zero. Subtracting the global tone mapping black point from the pixel values may preserve the relative pixel values and adjust the pixel values so that the mean of dark pixels in the image, after subtracting the black point value, is zero (0) or approximately zero.

As shown in FIG. 5, the tone control portion 520 includes a global tone mapping determination component 550 (GTM DETERMINATION) and a global tone mapping driver 560 (GTM DRIVE).

The global tone mapping determination component 550 accesses, such as reads, such as from a memory of the image capture apparatus, receives, or otherwise obtains, global tone mapping input data 552. The global tone mapping input data 552 is shown with a broken line boarder to indicate that the global tone mapping input data 552 is obtained periodically, such as in accordance with the adaptive acquisition control sample rate.

The global tone mapping input data 552 includes the adaptive acquisition control data (ACQUISITION PARAMETERS), the representative image data (THUMBNAIL DATA), representative histogram data (HISTOGRAM DATA) for the image, or frame, as shown, as captured in accordance with the adaptive acquisition control sample rate, which may be histogram data for a raw image, for one or more channels of the image, or frame, which constructively represent the current image. For example, the histogram data may include a histogram of a luminance, or luma, channel of the image, or frame, (histogramY), respective per-channel histograms for the image, or frame, in RGB format (histogramsRGB), or a combination or collection thereof.

Although the global tone mapping input data 552 is shown in FIG. 5 as including the representative image data (THUMBNAIL DATA) and the representative histogram data (HISTOGRAM DATA), other image data, other histogram data, or both, may be included in the global tone mapping input data 552. For example, the global tone mapping input data 552 may include the luma histogram (histogramY), the luma thumbnail (thumbnailY), a RAW, or RGB, format thumbnail (thumbnailRGB), per-channel RGB histograms (histogramsRGB), or a combination or collection thereof, of the image, or frame, as captured in accordance with the adaptive acquisition control sample rate. In some implementations, the representative image data included in the global tone mapping input data 552 may differ from the representative image data included in the acquisition control input data 532. For example, the acquisition control input data 532 may include the RGB thumbnail (thumbnailRGB) and the global tone mapping input data 552 may include the luma thumbnail (thumbnailY). In some implementations, the representative histogram data included in the global tone mapping input data 552 may differ from the representative histogram data included in the acquisition control input data 532. For example, the acquisition control input data 532 may include the per-channel RGB histograms (histogramsRGB) and the global tone mapping input data 552 may include luma histogram (histogramY).

Although described as constructively representing the current, or most recently captured, image, the representative image data, the representative histogram data, or both, may be generated from, or using, the current image, or a previously captured image captured sequentially before the current image, in accordance with the adaptive acquisition control sample rate. Although not shown expressly in FIG. 5, the acquisition parameters of the global tone mapping input data 552, may be, or may include, data output by the exposure control portion 510 in accordance with capturing a previous frame captured in accordance with the adaptive acquisition control sample rate, which may correspond with the captured frame associated with the adaptive acquisition control input data 532. For example, the target adaptive acquisition control data 542, or a portion thereof, output for capturing a frame in accordance with the adaptive acquisition control sample rate, may be included in the global tone mapping input data 552 subsequent to capturing the frame in accordance with the adaptive acquisition control sample rate.

The global tone mapping determination component 550 obtains, determines, selects, generates, calculates, produces, or identifies, the global tone mapping tone curve (toneCurve). The global tone mapping determination component 550 is shown with a broken line boarder to indicate that the global tone mapping determination component 550 obtains, determines, selects, generates, calculates, produces, or identifies, the global tone mapping tone curve (toneCurve) periodically, such as in accordance with the adaptive acquisition control sample period, or corresponding adaptive acquisition control sample rate, such as on a per three captured frames basis for video captured at thirty frames per second (30 fps).

The global tone mapping determination component 550 obtains, determines, selects, generates, calculates, produces, or identifies, the global tone mapping tone curve (toneCurve) from, based on, using, or in accordance with, the global tone mapping input data 552. The global tone mapping tone curve (toneCurve) is generated such that a histogram of a processed, or partially processed, image (post-GTM image) that is a result of applying the global tone mapping tone curve (toneCurve) to the current image matches a defined, or tuned, such as manually, global tone mapping target histogram, which is scene and image content independent. Although the post-global tone mapping image is described as having a histogram that matches the global tone mapping target histogram, the histogram of the post-global tone mapping image may differ from the global tone mapping target histogram, such as within defined minimal similarity parameters. One or more similarity parameters, metrics, or thresholds, or a combination thereof, may be used. For example, a difference in the respective means of the histograms may be less than twenty percent. In another example, a difference between a number, or cardinality, of pixels in a defined low value range, such as from zero to thirty-three percent of the dynamic range, may be less than ten percent. In another example, a difference between a number, or cardinality, of pixels in a defined medium value range, such as from thirty-three percent to sixty-six percent of the dynamic range, may be less than ten percent. In another example, a difference between a number, or cardinality, of pixels in a defined high value range, such as from sixty-six percent to ninety-nine percent of the dynamic range, may be less than ten percent.

For example, the global tone mapping tone curve (toneCurve) may be obtained, determined, selected, generated, calculated, produced, or identified, in accordance with a difference, such as in a difference of exposure mean, between the representative histogram and the global tone mapping target histogram, such that the processed, or partially processed, image that results from, or is output by, applying the global tone mapping tone curve (toneCurve) to the current image has the exposure mean of the global tone mapping target histogram. Although not expressly shown in FIG. 5, the global tone mapping determination component 550 may access, such as read, such as from a memory of the image capture apparatus, receive, or otherwise obtain, the global tone mapping target histogram.

The global tone mapping determination component 550 obtains, determines, selects, generates, calculates, produces, or identifies, a global tone mapping black point. The global tone mapping determination component 550 is shown with a broken line boarder to indicate that the global tone mapping determination component 550 obtains, determines, selects, generates, calculates, produces, or identifies, the global tone mapping black point periodically, such as in accordance with the adaptive acquisition control sample period, or corresponding adaptive acquisition control sample rate, such as on a per three captured frames basis for video captured at thirty frames per second (30 fps).

The global tone mapping determination component 550 obtains, determines, selects, generates, calculates, produces, or identifies, the global tone mapping black point, or global tone mapping black point value, (blackPoint), such that a defined, or tuned, such as manually, black point target percentage (blackPointTarget), such as two percent (2%), of pixels in the processed, or partially processed, image output by the tone control portion 520 are zero value pixels. To obtain the global tone mapping black point (blackPoint), the tone control portion 520 obtains, identifies, calculates, or determines the cardinality, count, or number, of pixels in the image (pixelCount), and determines the cardinality, count, or number, of pixels corresponding to the defined black point target percentage (blackPointTarget) of the pixels in the image (darkPixelCount, or dark pixel count), which may be expressed as darkPixelCount=pixelCount*blackPointTarget. Other ranges may be used for identifying the dark pixels.

To obtain the global tone mapping black point (blackPoint), the global tone mapping determination component 550 obtains, determines, selects, generates, calculates, produces, or identifies, the dark pixel count (darkPixelCount) darkest pixels (dark pixel values) from the representative histogram data, such as on a per-channel basis from the per-channel histograms (histogramsRGB) corresponding to the image. To obtain the global tone mapping black point (blackPoint), the global tone mapping determination component 550 obtains, determines, selects, generates, calculates, produces, or identifies, a mean, or another average, of the dark pixel values as the global tone mapping black point (blackPoint).

To obtain the global tone mapping black point (blackPoint), the global tone mapping determination component 550 may obtain, determine, select, generate, calculate, produce, or identify, a global tone mapping normalized black point value (blackPointNormalized) and may use the global tone mapping normalized black point value (blackPointNormalized) as the global tone mapping black point (blackPoint). To obtain the global tone mapping normalized black point value (blackPointNormalized), the global tone mapping determination component 550 may obtain, as the global tone mapping normalized black point value (blackPointNormalized), a result of dividing the global tone mapping black point (blackPoint) by a product of multiplying the exposure duration value (exposureDuration) corresponding to the representative image by the gain value (gain) corresponding to the representative image, which may be expressed as blackPointNormalized=blackPoint/(exposureDuration*gain).

The global tone mapping determination component 550 outputs, such as stores in a memory of the image capture apparatus, sends, transmits, or otherwise makes accessible, the global tone mapping tone curve (toneCurve), the global tone mapping black point (blackPoint), or both. For example, the global tone mapping determination component 550 may send the global tone mapping tone curve (toneCurve), the global tone mapping black point (blackPoint), or both, to the global tone mapping driver 560. In some implementations, the global tone mapping determination component 550 may output the global tone mapping input data 552, or a portion or portions thereof. The global tone mapping determination component 550 may omit obtaining, processing, or modifying the current image, or frame.

The global tone mapping driver 560 accesses, such as reads, such as from a memory of the image capture apparatus, receives, or otherwise obtains, the global tone mapping tone curve (toneCurve), the global tone mapping black point (blackPoint), the global tone mapping input data 552, or a combination thereof. For example, the global tone mapping driver 560 may receive the global tone mapping tone curve (toneCurve) and the global tone mapping black point (blackPoint) from the global tone mapping determination component 550, such as in accordance with the adaptive acquisition control sample rate. The global tone mapping driver 560 is shown with a solid line border to indicate that the global tone mapping driver 560 operates on a per-frame basis.

The global tone mapping driver 560 accesses, such as reads, such as from a memory of the image capture apparatus, receives, or otherwise obtains, target adaptive acquisition control data 562, such as the target adaptive acquisition control data 542, or a portion thereof, previously output by the auto-exposure sensor driver 540 for capturing the current image. The target adaptive acquisition control data 562 is shown with a solid line border to indicate that the target adaptive acquisition control data 562 is obtained on a per-frame basis.

The global tone mapping driver 560 obtains, determines, selects, generates, calculates, produces, or identifies, a temporally smoothed global tone mapping tone curve (toneCurveSmoothed), a temporally smoothed global tone mapping black point value (blackPointSmoothed), or both, which are temporally smoothed to avoid frame to frame oscillations.

Although not shown separately in FIG. 5, the global tone mapping driver 560 accesses, such as reads, such as from a memory of the image capture apparatus, receives, or otherwise obtains, a previous global tone mapping tone curve (toneCurvePrevious), such as the temporally smoothed global tone mapping tone curve output by the global tone mapping driver 560 in accordance with processing a previously captured image, such as the frame captured immediately prior to capturing the current image.

The global tone mapping driver 560 obtains, determines, selects, generates, calculates, produces, or identifies, the temporally smoothed global tone mapping tone curve (toneCurveSmoothed) by interpolating between the previous global tone mapping tone curve (toneCurvePrevious) and the global tone mapping tone curve (toneCurve) received from the global tone mapping determination component 550 and in accordance with a smoothing function ($f(\,)$) and a smoothing coefficient (a), which may be a tuned, such as manually, defined smoothing coefficient for smoothing the global tone mapping tone curve, which may be expressed as the following:

$$toneCurveSmoothed = f(a, toneCurvePrevious, toneCurve).$$

Although the same term, smoothing coefficient, and symbol, (a), is used with respect to smoothing other values, the smoothing coefficient (a) used for obtaining the temporally smoothed global tone mapping tone curve (toneCurveSmoothed) may be defined, or tuned, such as manually, for obtaining the temporally smoothed global tone mapping tone curve (toneCurveSmoothed), which may be referred to as a global tone mapping tone curve smoothing coefficient.

The global tone mapping driver 560 may use the temporally smoothed global tone mapping tone curve (toneCurveSmoothed) as the global tone mapping tone curve (toneCurve).

Although not shown separately in FIG. 5, the global tone mapping driver 560 accesses, such as reads, such as from a memory of the image capture apparatus, receives, or otherwise obtains, a previous global tone mapping black point value (blackPointPrevious), such as the temporally smoothed global tone mapping black point value, previously output, such as stored, by the global tone mapping driver 560 in accordance with processing a previously captured image, such as the frame captured immediately prior to capturing the current image.

The global tone mapping driver 560 obtains, determines, selects, generates, calculates, produces, or identifies, the temporally smoothed global tone mapping black point (blackPointSmoothed) by interpolating between the previous global tone mapping black point (blackPointPrevious) and the global tone mapping black point (blackPoint) output by the global tone mapping determination component 550, in accordance with a smoothing coefficient (a), which may be a tuned, such as manually, defined smoothing coefficient, and multiplying the interpolated value by the scene exposition value (gain*exposureDuration) used to capture the current frame, obtained from the target adaptive acquisition control data 562, which may be expressed as the following:

$$blackPointSmoothed = ((1-a)*blackPointPrevious + a*blackPoint)*(\text{gain}*exposureDuration).$$

Although the term 'smoothing coefficient' and symbol (a) are used with respect to smoothing other values, the smoothing coefficient (a) used for obtaining the temporally smoothed global tone mapping black point (blackPointSmoothed) may be defined, or tuned, such as manually, for obtaining the temporally smoothed global tone mapping black point (blackPointSmoothed), which may be referred to as a global tone mapping black point smoothing coefficient.

In some implementations, to obtain the global tone mapping black point value (blackPoint), the global tone mapping driver 560 obtains, as the global tone mapping black point value (blackPoint), a product of multiplying the temporally smoothed global tone mapping black point (blackPointSmoothed) by a product of multiplying the exposure duration value from the adaptive acquisition control parameters used to capture the current image from the target adaptive acquisition control data 562 by the gain value from the adaptive acquisition control parameters used to capture the current image target adaptive acquisition control data 562.

The global tone mapping driver 560 includes the global tone mapping tone curve (toneCurve), which may be the temporally smoothed global tone mapping tone curve (toneCurve Smoothed), the global tone mapping black point value (blackPoint), which may be the temporally smoothed global tone mapping black point (blackPointSmoothed), or both, in global tone mapping driver output data 564.

The global tone mapping driver 560 outputs, such as stores in a memory of the image capture apparatus, sends, transmits, or otherwise makes accessible, the global tone mapping driver output data 564. The global tone mapping driver output data 564 is shown with a solid line border to indicate that the global tone mapping driver output data 564 is output on a per-frame basis. The global tone mapping driver 560 may omit obtaining, processing, or modifying the current image, or frame.

FIG. 6 is a graph of an example of previously defined gain-exposure duration curves 600. The previously defined gain-exposure duration curves 600, or a portion thereof, may be implemented in an image capture apparatus, such as the image capture apparatus 100 shown in FIGS. 1A-1B, the image capture apparatus 200 shown in FIGS. 2A-2C, the image capture apparatus 300 shown in FIG. 3, as a part, or parts, of the image processing pipeline 400, or in another image capture apparatus. For example, the adaptive acquisition control component 500 shown in FIG. 5, or a portion or portions thereof, may implement the previously defined gain-exposure duration curves 600.

The example of previously defined gain-exposure duration curves 600 shown in FIG. 6 includes a horizontal axis 610 representing exposure duration, expressed in milliseconds. The example of previously defined gain-exposure duration curves 600 shown in FIG. 6 includes a vertical axis 620 representing ISO value, corresponding to gain multiplied by 100.

The example of previously defined gain-exposure duration curves 600 shown in FIG. 6 includes a previously defined low angular speed gain-exposure duration curve 630, on which points are represented as triangles, corresponding to an angular speed of 0.1 radians per second (0.1 rad/s), which is a relatively low angular speed. Curves corresponding to low angular speed, such as the previously defined low angular speed gain-exposure duration curve 630, indicate the use of relatively high, or long, exposure duration and relatively low gain, which may maximize signal-to-noise ratio.

The example of previously defined gain-exposure duration curves 600 shown in FIG. 6 includes a previously defined medium angular speed gain-exposure duration curve 640, on which points are represented as squares, corresponding to an angular speed of 1.5 radians per second (1.5 rad/s), which is a relatively medium angular speed.

The example of previously defined gain-exposure duration curves 600 shown in FIG. 6 includes a previously defined high angular speed gain-exposure duration curve 650, on which points are represented as circles, corresponding to an angular speed of 4.0 radians per second (4.0 rad/s), which is a relatively high angular speed. Curves corresponding to high angular speed, such as the previously defined high angular speed gain-exposure duration curve 650, indicate use of relatively low, or short, exposure duration and relatively high gain, which may minimize motion blur.

For simplicity, stars are shown to represent locations where multiple points are overlapping or concurrent, such as a point of the previously defined high angular speed gain-exposure duration curve 650 that is concurrent with a point of the previously defined medium angular speed gain-exposure duration curve 640 and a point of the previously defined low angular speed gain-exposure duration curve 630 (0.1, 1.5, 4.0), or a point of the previously defined high angular speed gain-exposure duration curve 650 that is concurrent with a point of the previously defined medium angular speed gain-exposure duration curve 640 (1.5, 4.0).

The product of multiplying a gain corresponding to a first point along a diagonal dotted line as shown by an exposure duration corresponding to the first point is equal to the product of multiplying a gain corresponding to a second point along the diagonal dotted line by an exposure duration corresponding to the second point. Defined gain-exposure duration curves other than the gain-exposure duration curves 630, 640, 650 may be used. Although FIG. 6 shows defined, or tuned, values for the defined gain-exposure duration curves 630, 640, 650 up to an ISO of 6400, a maximum ISO value (or corresponding maximum gain value), such as a maximum ISO value of 1600 (1.6K), corresponding to a maximum gain of 1.6, may be used such that the curves are clipped to ISO 1600 as indicated by the stippled background portion.

Figure 7:
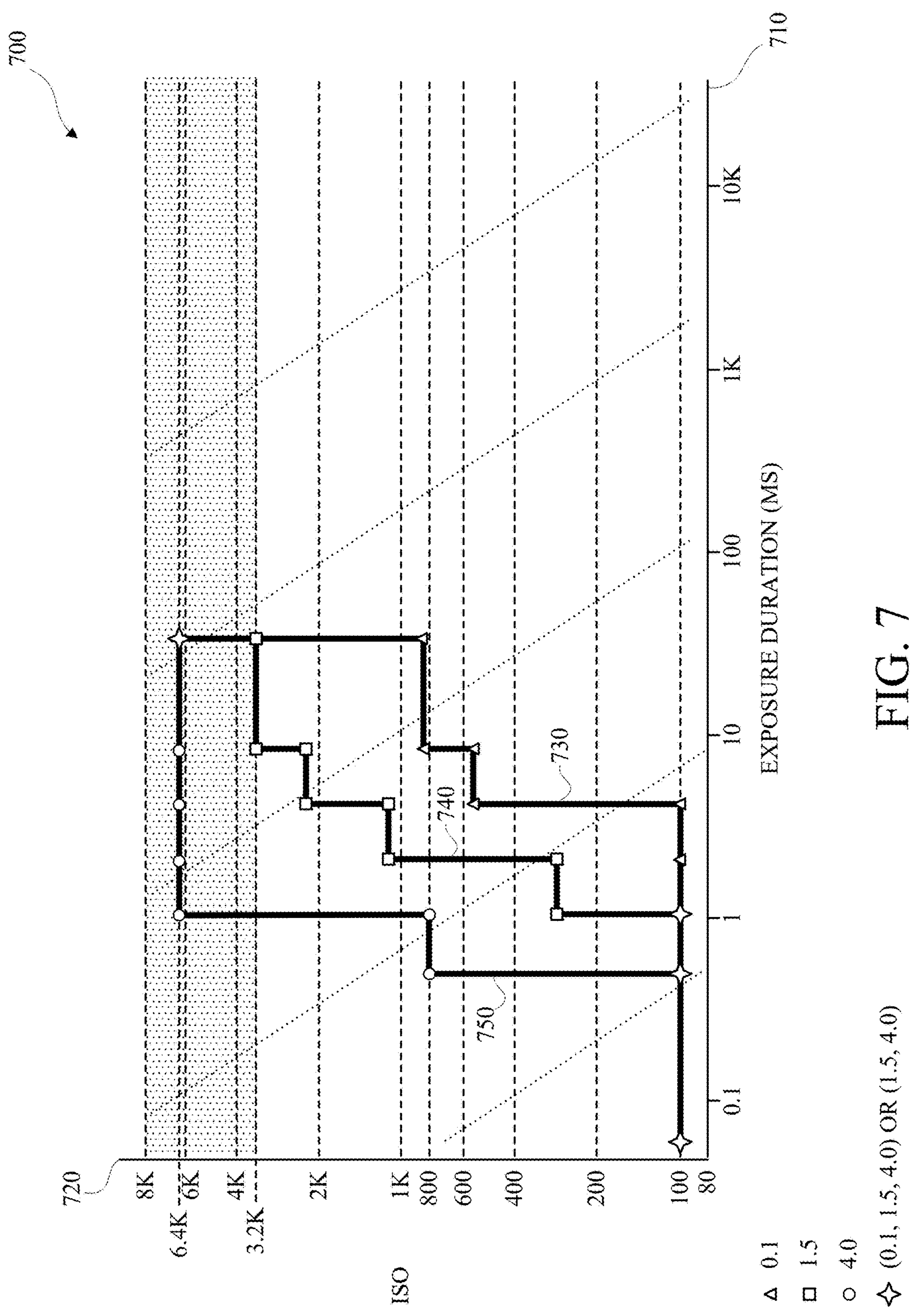
FIG. 7 is a graph of another example of defined gain-exposure duration curves.

FIG. 7 is a graph of an example of previously defined gain-exposure duration curves 700 for use with exposure and tone mapping control as described herein. The previously defined gain-exposure duration curves 700, or a portion thereof, may be implemented in an image capture apparatus, such as the image capture apparatus 100 shown in FIGS. 1A-1B, the image capture apparatus 200 shown in FIGS. 2A-2C, the image capture apparatus 300 shown in FIG. 3, as a part, or parts, of the image processing pipeline 400, or in another image capture apparatus. For example, the adaptive acquisition control component 800 shown in FIG. 8, or a portion or portions thereof, may implement the previously defined gain-exposure duration curves 700.

The example of previously defined gain-exposure duration curves 700 shown in FIG. 7 includes a horizontal axis 710 representing to exposure duration, expressed in milliseconds. The example of previously defined gain-exposure duration curves 700 shown in FIG. 7 includes a vertical axis 720 representing to ISO value, corresponding to gain multiplied by 100.

The example of previously defined gain-exposure duration curves 700 shown in FIG. 7 includes a previously defined low angular speed gain-exposure duration curve 730, on which points are represented as triangles, corresponding to an angular speed of 0.1 radians per second (0.1 rad/s), which is a relatively low angular speed. Curves corresponding to low angular speed, such as the previously defined low angular speed gain-exposure duration curve 730, indicate use of relatively high, or long, exposure duration and relatively low gain, which may maximize signal-to-noise ratio.

The example of previously defined gain-exposure duration curves 700 shown in FIG. 7 includes a previously defined medium angular speed gain-exposure duration curve 740, on which points are represented as squares, corresponding to an angular speed of 1.5 radians per second (1.5 rad/s), which is a relatively medium angular speed.

The example of previously defined gain-exposure duration curves 700 shown in FIG. 7 includes a previously defined high angular speed gain-exposure duration curve 750, on which points are represented as circles, corresponding to an angular speed of 4.0 radians per second (4.0 rad/s), which is a relatively high angular speed. Curves corresponding to high angular speed, such as the previously defined high angular speed gain-exposure duration curve 750, indicate use of relatively low, or short, exposure duration and relatively high gain, which may minimize motion blur.

For simplicity, stars are shown to represent locations where multiple points are overlapping or concurrent, such as a point of the previously defined high angular speed gain-exposure duration curve 750 that is concurrent with a point of the previously defined medium angular speed gain-exposure duration curve 740 and a point of the previously defined low angular speed gain-exposure duration curve 730 (0.1, 1.5, 4.0), or a point of the previously defined high angular speed gain-exposure duration curve 750 that is concurrent with a point of the previously defined medium angular speed gain-exposure duration curve 740 (1.5, 4.0).

The product of multiplying a gain corresponding to a first point along a diagonal dotted line as shown by an exposure duration corresponding to the first point is equal to the product of multiplying a gain corresponding to a second point along the diagonal dotted line by an exposure duration corresponding to the second point. Defined gain-exposure duration curves other than the gain-exposure duration curves 730, 740, 750 may be used. Although FIG. 7 shows defined, or tuned, values for the defined gain-exposure duration curves 730, 740, 750 up to a maximum ISO of 6400, a maximum ISO value (or corresponding maximum gain value), such as a maximum ISO value of 3200 (3.2K), corresponding to a maximum gain of 3.2, may be used such that the curves are clipped to ISO 3200 as indicated by the stippled background portion.

For an angular speed other than the angular speeds corresponding to the defined gain-exposure duration curves 730, 740, 750 (e.g., 0.1, 1.5, 4.0) a corresponding gain-exposure duration curve is obtained by interpolation from one or more of the defined gain-exposure duration curves 730, 740, 750.

The defined gain-exposure duration curves 730, 740, 750 shown in FIG. 7 are similar to, but differ from, the defined gain-exposure duration curves 630, 640, 650 shown in FIG. 6. For example, in the previously defined high angular speed gain-exposure duration curve 650 shown in FIG. 6 the ISO is 100 between exposure duration of 0.1 ms and 1 ms, in the previously defined high angular speed gain-exposure duration curve 750 shown in FIG. 7 the ISO is 100 (1.0 gain) between exposure duration of 0.1 ms and 0.5 ms and increases to 800 (8.0 gain) from 0.5 ms exposure duration to 1 ms exposure duration. The reduction in motion blur is proportional to the reduction in exposure duration for a respective gain.

Figure 8:
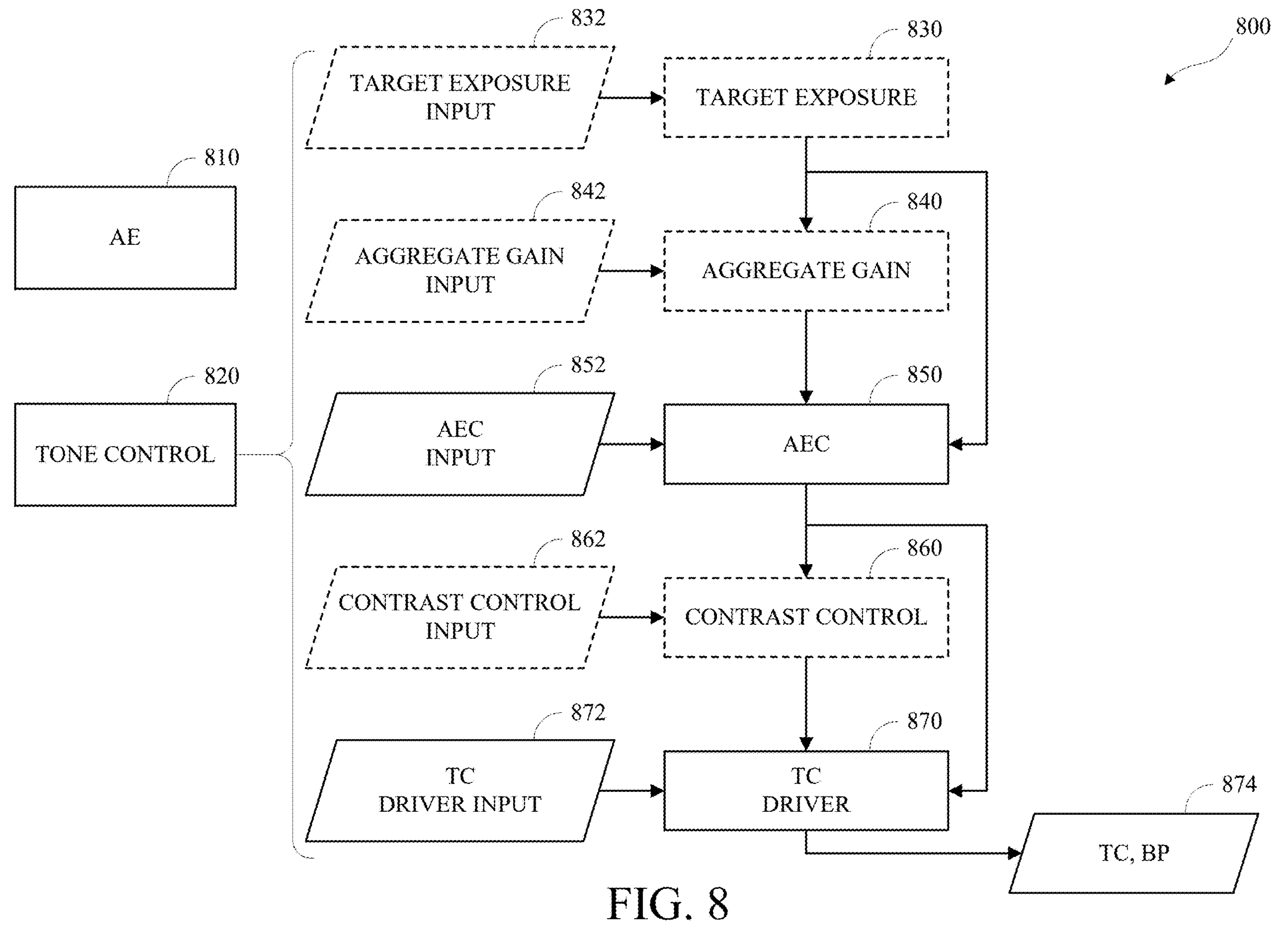
FIG. 8 is a block diagram of another example of an adaptive acquisition control component.

FIG. 8 is a block diagram of another example of an adaptive acquisition control component 800. The adaptive acquisition control component 800, or a portion thereof, is implemented in an image capture apparatus, such as the image capture apparatus 100 shown in FIGS. 1A-1B, the image capture apparatus 200 shown in FIGS. 2A-2C, the image capture apparatus 300 shown in FIG. 3, as a part of the image processing pipeline 400 shown in FIG. 4, or in another image capture apparatus. In some implementations, the adaptive acquisition control component 800 may be implemented in a digital signal processor (DSP), an application-specific integrated circuit (ASIC), or a combination of a digital signal processor and an application-specific integrated circuit. One or more components of the adaptive acquisition control component 800 may be implemented in hardware, software, or a combination of hardware and software. The adaptive acquisition control component 800 may be similar to the adaptive acquisition control component 500 shown in FIG. 5, except as is described herein or as is otherwise clear from context. The adaptive acquisition control component 800 determines and controls the exposure for images, or frames, such as a current, or input, image, or frame, captured by an image capture apparatus, such as a RAW image as captured by a sensor of the image capture apparatus, and processed by the image processing pipeline thereof that implements the adaptive acquisition control component 800 to obtain, and output, a processed image or frame.

As shown in FIG. 8, the adaptive acquisition control component 800 includes an exposure control component, or portion, 810 (AE) and a tone control portion, or component, 820. The adaptive acquisition control component 800 may include components other than the components shown in FIG. 8. For example, the image capture apparatus that implements the adaptive acquisition control component 800 may include an image sensor, such as the image sensors 242, 246 shown in FIG. 2C, the image sensor 312 shown in FIG. 3, or the image sensor 410 shown in FIG. 4, and an image signal processor, such as the image signal processor 420 shown in FIG. 4, and the adaptive acquisition control component 800 may include the image sensor, or a portion thereof, the image signal processor, or a portion thereof, or one or more portions of the image sensor and the image signal processor.

The exposure control portion 810 determines adaptive acquisition control data, such as one or more adaptive acquisition control parameters, for subsequent image, or video, capture, to balance motion blur minimization and signal-to-noise ratio, or quality, maximization. The exposure control portion 810 may be similar to the exposure control portion 510 shown in FIG. 5, except as is described herein or as is otherwise clear from context. For example, the exposure control portion 810 may include an auto-exposure luminance determination component (not expressly shown in FIG. 8) and an auto-exposure sensor driver (not expressly shown in FIG. 8). The auto-exposure luminance determination component may be similar to the auto-exposure luminance determination component 530 shown in FIG. 5, except as is described herein or as is otherwise clear from context. The auto-exposure sensor driver may be similar to the auto-exposure sensor driver 540 shown in FIG. 5, except as is described herein or as is otherwise clear from context.

For example, the target exposure obtained by the exposure control portion 810 may be lower for bright scenes than the target exposure obtained by the exposure control portion 510 for comparable scenes, which will lower the mean of the RAW image and avoid saturated images relative to the exposure control portion 510. In another example, the exposure control portion 510 shown in FIG. 5 may use the previously defined gain-exposure duration curves 600 shown in FIG. 6 and the exposure control portion 810 shown in FIG. 8 may use the previously defined gain-exposure duration curves 700 shown in FIG. 7. The components of the exposure control portion 810 are not expressly shown in FIG. 8 for simplicity.

The exposure control portion 810, or a component thereof, obtains, determines, selects, generates, calculates, produces, or identifies, target adaptive acquisition control data, such as a target exposure duration value (exposureDuration), a target gain value (gain), both, or a combination thereof, such as on a per-frame basis. The exposure duration value and the gain value may be expressed as a couple or tuple ([exposureDuration, gain]). In some implementations, the exposure duration value and the gain value may be expressed as an exposition parameter that is a product of multiplying the target exposure duration value (exposureDuration) by the target gain value (gain).

The target exposure duration value (exposureDuration), the target gain value (gain), both, or a combination thereof, may be used to control the image sensor of the image capture apparatus to capture a subsequent frame, or frames, to maximize the information in the captured images, or frames, as captured (e.g., RAW images). The information is maximized by balancing between signal-to-noise ratio, pixel saturation, and motion blur. The exposure control portion 810 may implement saturation management control, which may include using a representative histogram data, such as the representative luma histogram (histogramY), to adjust the target exposure duration value (exposureDuration), the target gain value (gain), or both, to limit or eliminate saturation. For example, the last bin of the representative luma histogram (histogramY) may indicate a number, or cardinality, of saturated pixels which may be compared with a defined threshold number, or cardinality, of saturated pixels, such that for images wherein the number, or cardinality, of saturated pixels exceeds, such as is greater than, the defined threshold number, or cardinality, of saturated pixels, the target exposure duration value (exposureDuration), a target gain value (gain), both, may be lowered.

The exposure control portion 810 may omit expressly controlling the brightness of processed images output by the image capture apparatus. The exposure control portion 810 may omit obtaining, processing, or modifying the current image, or frame.

The exposure control portion 810 outputs, such as stores in a memory of the image capture apparatus, sends, transmits, or otherwise makes accessible, the target adaptive acquisition control data, including the target exposure duration value (exposureDuration), the target gain value (gain), both, or a combination thereof, such as on a per-frame basis. For example, the exposure control portion 810 may output the target adaptive acquisition control data, or a portion thereof, to the image sensor, the tone control portion 820, or both.

The tone control portion 820 obtains a tone control tone curve, which may be a dynamically, or adaptively, generated tone curve, for an image, such as an input, or RAW image, such as the current image, or frame, which may be the frame most recently captured by the image sensor of the image capture apparatus, for use in processing the current image, or frame, to obtain a processed, or partially processed, image, or frame. The tone control tone curve is similar to the global tone mapping tone curve obtained by the tone control portion 520 shown in FIG. 5, except as is described herein or as is otherwise clear from context. The tone control tone curve may be implemented as a look up table (lut), that maps input luminance values from pixels in an input image, in a respective defined range, to a respective corresponding output luminance value that is included for the respective pixels in an output image, which is the processed, or partially processed, image. The tone control tone curve is adaptive to the image content.

The tone control portion 820 obtains a tone control black point value, which may be or include per-channel values, which may be applied to obtain the processed, or partially processed image. The tone control black point value corresponds to a determined black point for the respective image, such as on a per-channel basis, which is subtracted from the respective image, such as on a per-channel and per-pixel basis, and is adaptive to the image content. The tone control black point value is used to apply a shift on the pixel values of the image to maximize the accuracy of dark, such as black or near black, pixels. Subtracting the tone control black point value from the pixel values may preserve the relative pixel values and adjust the pixel values so that the mean of dark pixels in the image after subtracting the black point value is zero (0), or approximately zero.

The tone control portion 820 may be similar to the tone control portion 520 shown in FIG. 5, except as is described herein or as is otherwise clear from context.

As shown in FIG. 8, the tone control portion 820 includes a target exposure component 830 (TARGET EXPOSURE), an aggregate gain component 840 (AGGREGATE GAIN), an auto-exposure compensation component 850 (AEC), a contrast control component 860 (CONTRAST CONTROL), and a tone control driver 870 (TC DRIVER). The adaptive acquisition control component 800 may include components other than the components shown in FIG. 8.

The target exposure component 830 accesses, such as reads, such as from a memory of the image capture apparatus, receives, or otherwise obtains, target exposure input data 832. The target exposure input data 832 is shown with a broken line boarder to indicate that the target exposure input data 832 is obtained periodically, such as in accordance with the adaptive acquisition control sample rate, such as on a per-third frame basis.

The target exposure input data 832 includes representative adaptive acquisition control data (acquisition parameters), representative image data, representative histogram data, or a combination thereof.

Although not shown expressly in FIG. 8, the representative adaptive acquisition control data of the target exposure input data 832, may be, or may include, data output by the exposure control portion 810, such as the target exposure duration value, the target gain value, or both, for capturing a previous frame captured in accordance with the adaptive acquisition control sample rate. For simplicity, the target exposure duration value output by the exposure control portion 810 for capturing the previous frame captured in accordance with the adaptive acquisition control sample rate, is referred to as the exposure duration value (exposureDuration) as obtained by tone control portion 820, or components thereof, in accordance with the adaptive acquisition control sample rate, and the target gain value output by the exposure control portion 810 for capturing the previous frame captured in accordance with the adaptive acquisition control sample rate, is referred to as the gain value (gain) as obtained by tone control portion 820, or components thereof, in accordance with the adaptive acquisition control sample rate.

For example, the target adaptive acquisition control data, or a portion thereof, output for capturing the previous frame in accordance with the adaptive acquisition control sample rate may be included in the target exposure input data 832 subsequent to capturing the previous frame in accordance with the adaptive acquisition control sample rate. The representative adaptive acquisition control data of the target exposure input data 832 constructively represents the adaptive acquisition control data used to capture the current image and may differ from the adaptive acquisition control data used to capture the current image.

The representative image data (representative image) may be image data obtained from the image, or frame, captured in accordance with the adaptive acquisition control sample rate, a reduced image corresponding to the captured image, such as a thumbnail image, which may be a RAW image, or luminance, or luma, data thereof, generated from the captured image. For example, the image capture apparatus, or one or more components thereof, may generate the luminance (Y) component of the thumbnail image by down sampling the luminance (Y) component of the previously captured image. The representative image data of the target exposure input data 832 constructively represents the current image and may differ from the current image.

The representative histogram data may be histogram data obtained for the image, or frame, captured in accordance with the adaptive acquisition control sample rate, which may be histogram data for a raw image, or the luminance, or luma, channel of the image, or frame, (histogramY), RGB, format thumbnail (thumbnailRGB), per-channel RGB histograms (histogramsRGB), or a combination or collection thereof. The representative histogram data of the target exposure input data 832 constructively represents a histogram of the current image and may differ from the histogram of the current image.

Although described as constructively representing the current, or most recently captured, image, the representative image data, the representative histogram data, or both, may be generated from, or using, the current image, or a previously captured image captured sequentially before the current image, in accordance with the adaptive acquisition control sample rate, such as using the representative adaptive acquisition control data.

In some implementations, the target exposure input data 832 includes scene classification data corresponding to the previous frame captured in accordance with the adaptive acquisition control sample rate.

In some implementations, the target exposure input data 832 includes motion data, such as motion data describing motion of the image capture apparatus, captured, generated, or determined, in accordance with capturing the previous frame captured in accordance with the adaptive acquisition control sample rate. The motion data may include angular speed data that indicates the angular component of motion velocity of the image capture apparatus in accordance with capturing the previous frame captured in accordance with the adaptive acquisition control sample rate. For example, the angular speed data may be determined using data from a motion sensor, such as a gyroscope, of the image capture apparatus, such as the gyroscope 346 shown in FIG. 3. The motion data of the target exposure input data 832 constructively represents the motion of the image capture apparatus corresponding to capturing the current frame and may differ from motion data indicating the motion of the image capture apparatus corresponding to capturing the current frame.

The target exposure component 830 obtains, determines, selects, generates, calculates, produces, or identifies, a target exposure, or target exposure value, (targetExposure). The target exposure component 830 is shown with a broken line boarder to indicate that the target exposure component 830 obtains, determines, selects, generates, calculates, produces, or identifies, the target exposure (targetExposure) periodically, such as in accordance with the adaptive acquisition control sample period, or the corresponding adaptive acquisition control sample rate, such as on a per third captured frames basis for video captured at thirty frames per second (30 fps). Obtaining the target exposure (targetExposure) by the target exposure component 830 may be similar to obtaining a target exposure value by the auto-exposure luminance determination component 530 shown in FIG. 5, or a portion thereof, except as is described herein or as is otherwise clear from context.

The target exposure component 830 obtains, determines, selects, generates, calculates, produces, or identifies, the target exposure (targetExposure) based on, using, or in accordance with, the target exposure input data 832, or a portion thereof. The target exposure (targetExposure) indicates an optimized, target, mean gray level, such as for the luma, or luminance, channel for the processed image, such as subsequent to gamma correction. Although not expressly shown in FIG. 8, gamma correction may be applied to the processed, or partially processed, image output by the adaptive acquisition control component 800.

The target exposure (targetExposure) is adapted in accordance with the scene luminance (sceneLuminance) of the representative image. The target exposure (targetExposure) is distinct from, such as generated separately from, the target exposure value (targetY) obtained by the exposure control portion 810.

The target exposure component 830 obtains, determines, selects, generates, calculates, produces, or identifies, the scene luminance value (sceneLuminance) in accordance with the target exposure input data 832. Obtaining the scene luminance value (sceneLuminance) includes determining a mean gray level, or value, (meanGrayLevel) of the representative image from the target exposure input data 832. Obtaining the scene luminance value (sceneLuminance) may include determining a scene exposition value (sceneExposition) using the adaptive acquisition control data from the target exposure input data 832. The scene exposition value (sceneExposition) is obtained as a product of multiplying the gain value (gain) by the exposure duration value (exposureDuration)
(sceneExposition=gain*exposureDuration).

Obtaining the scene luminance value (sceneLuminance) by the target exposure component 830 may be similar to obtaining a scene luminance value by the auto-exposure luminance determination component 530 shown in FIG. 5, or a portion thereof, except as is described herein or as is otherwise clear from context.

The scene luminance (sceneLuminance) is proportional to a result of dividing the mean gray value (meanGrayLevel) by the scene exposition value (gain*exposureDuration), which may be expressed as the following:

$$sceneLuminance \propto meanGreyLevel/(\text{gain} * exposureDuration).$$

The mean gray value (meanGrayLevel) may be expressed as a value, such as an integer value or a floating-point value, in a defined range, such as 0-255. The mean gray value (meanGrayLevel) may be a weighted mean gray value obtained using weighted pixel values obtained by weighting the pixel values from the representative image in accordance with a weighting map that indicates respective weights for the pixel values from the representative image.

The target exposure component 830 obtains, determines, selects, generates, calculates, produces, or identifies, the mean gray value (meanGrayLevel). The mean gray value (meanGrayLevel) is distinct from, such as generated separately from, the mean gray value obtained by the exposure control portion 810. In some implementations, the mean gray value (meanGrayLevel) may be determined in accordance with region of interest (ROI) data. Other techniques for obtaining the scene luminance may be used.

In some implementations, the adaptive acquisition control data, from the target exposure input data 832, may include an aperture value used to capture the image from which the image capture apparatus obtained the representative, or thumbnail, image, and the scene luminance value (sceneLuminance) may be obtained using the aperture value, which may be expressed as shown in Equation 1.

The target exposure (targetExposure) is adaptive to a defined, such as manually tuned, target exposure tone curve (targetExposureCurve), which may be implemented as a lookup table (lut), that maps exposure values, such as target exposure values, to corresponding scene luminance values. Although not expressly shown in FIG. 8, the target exposure component 830 may access, such as read, such as from a memory of the image capture apparatus, receive, or otherwise obtain, the target exposure tone curve (targetExposureCurve).

For example, the target exposure component 830 may obtain the target exposure (targetExposure) adaptive to, or as a function ($f(\,)$) of, the scene luminance (sceneLuminance) and the target exposure tone curve (targetExposureCurve), which may be expressed as the following:

$$targetExposure = f(sceneLuminance, targetExposureCurve).$$

For example, the scene luminance (sceneLuminance) may be used as an abscissa to obtain the target exposure (targetExposure) from the lookup table corresponding to the target exposure tone curve (targetExposureCurve), which may be expressed as targetExposure=targetExposureCurve (scene Luminance).

In some implementations, the target exposure is adaptive to the scene classification data included in the target exposure input data 832. Although not expressly shown in FIG. 8, the target exposure component 830 may access, such as read, such as from a memory of the image capture apparatus, receive, or otherwise obtain, one or more scene-classification-specific target exposure tone curves, or the target exposure tone curve may map exposure values, such as target exposure values, to corresponding scene luminance values for respective scene classifications.

For example, the target exposure component 830 may obtain the target exposure (targetExposure) adaptive to, or as a function (ƒ( )) of, the scene luminance (sceneLuminance), the target exposure tone curve (targetExposureCurve), and the scene classification (sceneClassification), which may be expressed as the following:

$$targetExposure = f(sceneLuminance, targetExposureCurve, sceneClassification).$$

For example, the function (ƒ( )) may include using the scene classification (sceneClassification) to determine a bias value, such that obtaining the target exposure (targetExposure) may be expressed as targetExposure=bias*targetExposureCurve (sceneLuminance).

The target exposure component 830 temporally smooths the target exposure, such as to avoid large temporal variation, to obtain a temporally smoothed target exposure, or temporally smoothed target exposure value, (targetExposureSmoothed). The target exposure component 830 may use the temporally smoothed target exposure value (targetExposureSmoothed) as the target exposure (targetExposure).

Although not shown separately in FIG. 8, the target exposure component 830 accesses, such as reads, such as from a memory of the image capture apparatus, receives, or otherwise obtains, a previous target exposure, or previous target exposure value, (targetExposurePrevious), such as a temporally smoothed target exposure previously output, such as stored, by the target exposure component 830 in accordance with processing a previously captured image.

The temporally smoothed target exposure (targetExposureSmoothed) may be obtained as a linear combination of the target exposure (targetExposure) and the previous target exposure (targetExposurePrevious), and in accordance with a smoothing coefficient (a), which may be a tuned, such as manually, defined smoothing coefficient, which may be expressed as the following:

$$targetExposureSmoothed = (1 - a) * targetExposurePrevious + a * targetExposure.$$

Although the term 'smoothing coefficient' and the symbol (a) are used with respect to smoothing other values, the smoothing coefficient (a) used for obtaining the temporally smoothed target exposure (targetExposureSmoothed) may be defined, or tuned, such as manually, for obtaining the temporally smoothed target exposure (targetExposureSmoothed), which may be referred to as a target exposure smoothing coefficient or defined target exposure smoothing coefficient. Although described herein with respect to the temporally smoothed target exposure (targetExposureSmoothed), temporal smoothing may be omitted, and the target exposure (targetExposure) may be used.

The target exposure component 830 outputs, such as stores in a memory of the image capture apparatus, sends, transmits, or otherwise makes accessible, target exposure output data including the target exposure (targetExposure), which may be the temporally smoothed target exposure value (targetExposureSmoothed). For example, the target exposure component 830 may output the target exposure data to the aggregate gain component 840 and the auto-exposure compensation component 850.

The aggregate gain component 840 obtains, determines, selects, generates, calculates, produces, or identifies, a target aggregate gain, or target aggregate gain value, (targetAggregateGain) to apply to the current image, or frame, to obtain the processed image, or frame, having the target exposure (targetExposure), which may be the temporally smoothed target exposure value (targetExposureSmoothed). The aggregate gain component 840 is shown with a broken line boarder to indicate that the aggregate gain component 840 obtains, determines, selects, generates, calculates, produces, or identifies, the target aggregate gain (targetAggregateGain) periodically, such as in accordance with the adaptive acquisition control sample period, or the corresponding adaptive acquisition control sample rate, such as on a per third captured frames basis for video captured at thirty frames per second (30 fps).

The aggregate gain component 840 accesses, such as reads, such as from a memory of the image capture apparatus, receives, or otherwise obtains, aggregate gain input data 842. The aggregate gain input data 842 is shown with a broken line boarder to indicate that the aggregate gain input data 842 is obtained periodically, such as in accordance with the adaptive acquisition control sample rate, such as on a per-third frame basis.

The aggregate gain input data 842 is similar to the target exposure input data 832, except as is described herein or as is otherwise clear from context. For example, the aggregate gain input data 842 may omit scene classification data.

The aggregate gain component 840 obtains, such as reads or receives, the target exposure output data including the target exposure (targetExposure), which may be the temporally smoothed target exposure value (targetExposureSmoothed), or a portion thereof, output by the target exposure component 830, such as in accordance with the adaptive acquisition control sample rate.

The target aggregate gain (targetAggregateGain) is an aggregated sum of gain applied to the current image, or frame, as captured (e.g., measured or detected photons) to obtain the processed, or partially processed, image, or frame, having the target exposure (targetExposure), which may be the temporally smoothed target exposure value (targetExposure Smoothed). For example, the target aggregate gain (targetAggregateGain) may be eighteen percent (18%) of the dynamic, or bit depth, wherein bit depth indicates the number or cardinality of bits available for storing a respective pixel value, of the current image. For example, a compressed image format may have a bit depth of eight bits, whereas the current image, which may be uncompressed, may have a higher bit depth, such as fourteen bits or seventeen bits.

The aggregate gain component 840 obtains, determines, selects, generates, calculates, produces, or identifies, the exposure of the representative frame (representativeExposure or representative exposure value), such as using the representative histogram data, such as the luma, or luminance, channel, or component, histogram (histogramY), from the aggregate gain input data 842. The exposure of the representative frame (representativeExposure) represents the exposure of the current frame and may differ from the exposure of the current frame. The exposure of the representative frame (representativeExposure) may be defined or described as the mean gray level of the luma histogram (histogramY) from the aggregate gain input data 842. Obtaining the exposure of the representative frame (representativeExposure) may be expressed as the following:

$$representativeExposure = \text{mean}(histogramY).$$

In another example, the exposure of the representative frame (representativeExposure) may be defined or described as the mean gray level of the representative image (thumbnailY) from the aggregate gain input data 842. Obtaining the exposure of the representative frame (representativeExposure) may be expressed as the following:

$$representativeExposure = \text{mean}(thumbnailY).$$

In some implementations, the aggregate gain input data 842 includes region of interest data, such as manually defined region of interest data, automatically determined region of interest data, such as face detection region of interest data, stabilization region of interest data, or a combination thereof. In some implementations, respective weighting data may be associated with the region of interest data, such that pixels in a region of interest are weighted more than other pixels, and obtaining the exposure of the representative frame (representativeExposure) may include obtaining the exposure of the representative frame (representative Exposure) in accordance with the weighting data and the corresponding region of interest data. For example, the weighting may be applied to the representative image (thumbnailY), wherein region of interest pixels have a high weight relative to other pixels, such that the mean of the weighted representative image is used. In another example, a histogram of the weighted representative image may be obtained and a mean of the histogram of the weighted representative image may be used.

The current frame, as captured, has gain applied, or used, by the image sensor in accordance with capturing the current frame (sensor gain or sensorGain). The exposure of the current frame may differ from the target exposure (targetExposure), which may be the temporally smoothed target exposure value (targetExposureSmoothed) for the current gain. To obtain the processed, or partially processed, image, or frame, corresponding to the current frame, the aggregate gain component 840 determines a remaining gain, or remaining digital gain, (gainRemaining) to be applied to the current frame to obtain the processed, or partially processed, image, or frame, corresponding to the current frame the aggregate gain component 840 having the target exposure (targetExposure), which may be the temporally smoothed target exposure value (targetExposureSmoothed), such that the aggregate gain of the processed, or partially processed, image, or frame, is a sum of the sensor gain and the remaining gain.

The target aggregate gain (targetAggregateGain) is a combination of the exposure duration (exposureDuration), previously output by the exposure control portion 810, used to capture the representative image, the sensor gain (sensorGain), previously output by the exposure control portion 810, of the representative frame as captured, and a remaining gain (gainRemaining) determined by the aggregate gain component 840, which may be expressed as the following:

$$targetAggregateGain = exposureDuration * sensorGain * gainRemaining.$$

The aggregate gain component 840 obtains, determines, selects, generates, calculates, produces, or identifies, the remaining gain (gainRemaining) for obtaining the processed, or partially processed, image having the target exposure (targetExposure), which may be the temporally smoothed target exposure value (targetExposureSmoothed).

The aggregate gain component 840 obtains the remaining gain (gainRemaining) adaptive to, or as a function ($f(\,)$) of, the target exposure (targetExposure), which may be the temporally smoothed target exposure value (targetExposureSmoothed), obtained from the target exposure component 830 and the exposure of the representative frame (representativeExposure), which may be expressed as the following:

$$gainRemaining = f(representativeExposure, targetExposure).$$

For example, the remaining gain (gainRemaining) may be a result of dividing the temporally smoothed target exposure (targetExposureSmoothed) by the exposure of the representative frame (representativeExposure), which may be expressed as the following:

$$gainRemaining = targetExposureSmoothed / representativeExposure.$$

The remaining gain (gainRemaining) may be applied to the current image as captured to compensate for, such as reduce or eliminate, differences, such as luminance variations, of the current image as captured with respect to previously captured, such as immediately previously captured, images corresponding to differences, such as greater than thirty percent (30%), in the respective adaptive acquisition control parameters used for capturing the respective images. The output or result of applying the remaining gain (gainRemaining) to the current image may include differences from the previously captured, such as immediately previously captured, images corresponding to changes of the captured scene, or scene modification, such as a change from a relatively dark lighting condition to a relatively bright lighting condition.

The aggregate gain component 840 obtains, determines, selects, generates, calculates, produces, or identifies, a temporally smoothed target aggregate gain, or temporally smoothed target aggregate gain value, (targetAggregateGainSmoothed) to compensate for, such as reduce or eliminate, differences, including differences corresponding to scene modification and differences corresponding to the respective adaptive acquisition control parameters used for capturing the respective images, by applying temporal smoothing. The aggregate gain component 840 may use the temporally smoothed target aggregate gain value (targetAggregateGainSmoothed) as the target aggregate gain value (targetAggregateGain).

The aggregate gain component 840 obtains, determines, selects, generates, calculates, produces, or identifies, the temporally smoothed target aggregate gain (targetAggregateGainSmoothed) by temporally smoothing the target aggregate gain (targetAggregateGain). A temporally smoothed target aggregate gain (targetAggregateGainSmoothed) greater than one (1) corresponds with a processed image that is bright relative to the captured image. A temporally smoothed target aggregate gain (targetAggregateGainSmoothed) less than one (1) corresponds with a processed image that is dark relative to the captured image.

Although not shown separately in FIG. 8, to obtain the temporally smoothed target aggregate gain (targetAggregateGainSmoothed), the aggregate gain component 840 accesses, such as reads, such as from a memory of the image capture apparatus, receives, or otherwise obtains, a previous target aggregate gain, such as a previous temporally smoothed target aggregate gain, or previous temporally smoothed target aggregate gain value, (targetAggregateGainSmoothedPrevious), such as a target aggregate gain previously output by the aggregate gain component 840, such as for the previous processed frame.

The temporally smoothed target aggregate gain (targetAggregateGainSmoothed) may be obtained by interpolating between, such as obtaining a linear combination of, the target aggregate gain (targetAggregateGain) and the previous target aggregate gain, which may be the previous temporally smoothed target aggregate gain (targetAggregateGainSmoothedPrevious), and in accordance with a smoothing coefficient (a), which may be a tuned, such as manually, defined smoothing coefficient, which may be expressed as the following:

$$targetAggregateGainSmoothed = (1-a)*targetAggregateGainSmoothedPrevious + a*targetAggregateGain.$$

Although the term 'smoothing coefficient' and the symbol (a) are used with respect to smoothing other values, the smoothing coefficient (a) used for obtaining the temporally smoothed target aggregate gain (targetAggregateGainSmoothed) may be defined, or tuned, such as manually, for obtaining the temporally smoothed target aggregate gain (targetAggregateGainSmoothed), which may be referred to as a defined target aggregate gain smoothing coefficient. Although described herein with respect to the temporally smoothed target aggregate gain (targetAggregateGainSmoothed), temporal smoothing may be omitted.

The aggregate gain component 840 outputs, such as stores in a memory of the image capture apparatus, sends, transmits, or otherwise makes accessible, aggregate gain output data including the target aggregate gain value (targetAggregateGain), which may be the temporally smoothed target aggregate gain (targetAggregateGainSmoothed). For example, the aggregate gain component 840 may output the aggregate gain output data including the target aggregate gain (targetAggregateGain) to the auto-exposure compensation component 850. The aggregate gain component 840 may omit obtaining, processing, or modifying the current image, or frame.

The auto-exposure compensation component 850 obtains, determines, selects, generates, calculates, produces, or identifies, an auto-exposure compensation tone curve, which may be expressed as an auto-exposure compensation lookup table (lutAEC), that defines or describes a per-pixel value gain to apply the current image to obtain the processed, or partially processed, image having the target aggregate gain value (targetAggregateGain), which may be the temporally smoothed target aggregate gain (targetAggregateGainSmoothed), corresponding to applying the remaining gain (gainRemaining). The auto-exposure compensation component 850 is shown with a solid line border to indicate that the auto-exposure compensation component 850 obtains the auto-exposure compensation lookup table (lutAEC) on a per-frame basis.

The auto-exposure compensation component 850 accesses, such as reads, such as from a memory of the image capture apparatus, receives, or otherwise obtains, auto-exposure compensation input data 852 (AEC INPUT). The auto-exposure compensation input data 852 is shown with a solid line border to indicate that the auto-exposure compensation input data 852 is obtained on a per-frame basis.

The auto-exposure compensation input data 852 includes the target adaptive acquisition control data previously output by the exposure control portion 810 as adaptive acquisition control parameters for capturing the current image, or frame, such as current exposition data, such as exposure duration (exposureDuration) data and sensor gain (sensorGain) data previously output by the exposure control portion 810, used to capture the current frame.

The auto-exposure compensation input data 852 includes a manually defined, such as user defined, exposure bias (EB), such as 0.5 or 1.0 (positive values) to obtain brighter images, or −0.5 or −1.0 (negative values) to obtain darker images. In some implementations, the defined exposure bias, or defined exposure bias value, (EB) may be omitted or a value of one may be used.

The auto-exposure compensation component 850 obtains, such as reads or receives, the aggregate gain output data including the target aggregate gain value (targetAggregateGain), which may be the temporally smoothed target aggregate gain (targetAggregateGainSmoothed), output by the aggregate gain component 840, such as in accordance with the adaptive acquisition control sample rate.

The auto-exposure compensation component 850 obtains, such as reads or receives, the target exposure output data, or a portion thereof, target exposure output data including the target exposure (targetExposure), which may be the temporally smoothed target exposure value (targetExposureSmoothed), output by the target exposure component 830, such as in accordance with the adaptive acquisition control sample rate.

Relative to linear gain, the per-pixel value gain defined or described by the auto-exposure compensation tone curve reduces or eliminates saturation for bright pixels by applying relatively low gain and reduces or eliminates noise in dark pixels by applying relatively high gain, such as in relatively bright, highlight, scenes, and applying relatively moderate gain, such as in dark, lowlight, scenes.

To obtain the auto-exposure compensation lookup table (lutAEC), corresponding to the auto-exposure compensation tone curve, the auto-exposure compensation component 850 obtains, determines, selects, generates, calculates, produces, or identifies, a compliant aggregate gain, or compliant aggregate gain value, (compliantAggregateGain) based on the target aggregate gain value (targetAggregateGain), which may be the temporally smoothed target aggregate gain (targetAggregateGainSmoothed), obtained from the aggregate gain component 840, the exposure bias (EB), one or more sensor exposure constraints, or a combination thereof. A respective sensor exposure constraint defines or describes a range of exposure values, or corresponding gain values, such as from a defined minimum aggregate gain, or defined minimum aggregate gain value, (minAggregateGain) to a maximum aggregate gain, or maximum aggregate gain value, (maxAggregateGain), in accordance with sensor capacity, or capability, and corresponding defined, such as user defined, configuration values. Obtaining the compliant aggregate gain (compliantAggregateGain) may be expressed as the following:

$$compliantAggregateGain = \max(\min(targetAggregateGain * 2^{EB}, maxAggregateGain), minAggregateGain).$$

For example, the sensor gain may be a value in a defined range, such as from a minimum sensor gain (minSensorGain) of one (1.0) to a maximum sensor gain (maxSensorGain) of thirty-two (32.0), the exposure duration may be a value in a defined range, such as from a minimum exposure duration (minExposureDuration) of 0.0006 seconds to a maximum exposure duration (maxExposureDuration) of 0.33 seconds, such that obtaining the minimum aggregate gain value (minAggregateGain) may be expressed as minAggregateGain=minSensorGain*minExposureDuration, or minAggregateGain=1*0.0006, and obtaining the maximum aggregate gain value (maxAggregateGain) may be expressed as maxAggregateGain=maxSensorGain*maxExposure Duration, or maxAggregateGain=32*0.33. Other ranges, which may correspond with respective frame rates and sensor capabilities, may be used.

The auto-exposure compensation component 850 obtains, determines, selects, generates, calculates, produces, or identifies, an auto-exposure compensation gain value (gainAEC) by dividing the compliant aggregate gain (compliantAggregateGain) by a product of multiplying the exposure duration (exposureDuration), previously output by the exposure control portion 810, used to capture the current frame, and the sensor gain (sensorGain), previously output by the exposure control portion 810, used to capture the current frame, which may be expressed as the following:

$$gainAEC = compliantAggregateGain/(sensorGain * exposureDuration).$$

The auto-exposure compensation component 850 obtains, determines, selects, generates, calculates, produces, or identifies, the auto-exposure compensation lookup table (lutAEC) as a non-linear curve for applying the auto-exposure compensation gain (gainAEC), which avoids saturating bright portions of the processed image, such as using Bézier curves. Obtaining the auto-exposure compensation lookup table (lutAEC) as non-linear curve adaptive to, or as a function ($f(\ )$) of, the auto-exposure compensation gain (gainAEC) and the target exposure (targetExposure), which may be the temporally smoothed target exposure value (targetExposureSmoothed), may be expressed as the following:

$$lutAEC = f(gainAEC, targetExposure).$$

The slope of the curve of the auto-exposure compensation lookup table (lutAEC) at origin is equal to the auto-exposure compensation gain (gainAEC). The slope of the curve of the auto-exposure compensation lookup table (lutAEC) becomes zero, or null, in the brightest part of the dynamic. The curve includes a linear slope from zero (0) to the point corresponding to a result of dividing the target exposure (targetExposure), which may be the temporally smoothed target exposure value (targetExposureSmoothed), by the auto-exposure compensation gain (gainAEC), with a slope of the auto-exposure compensation gain (gainAEC), such that for a point (x) on the horizontal axis, the value of the corresponding point (y) on the vertical axis is a product of multiplying the auto-exposure compensation gain (gainAEC) by x, and a Bézier curve until the point [1,1] with three control points, wherein the Bézier curve is a parametric curve with N control points, including a control point corresponding to the origin [0,0], a control point corresponding to the end [1,1], and one or more intermediate control points, which may be non-intersecting with the curve. For example, the Bézier curve may be defined, or described, with three control points and may be a quadratic curve.

Figure 9:
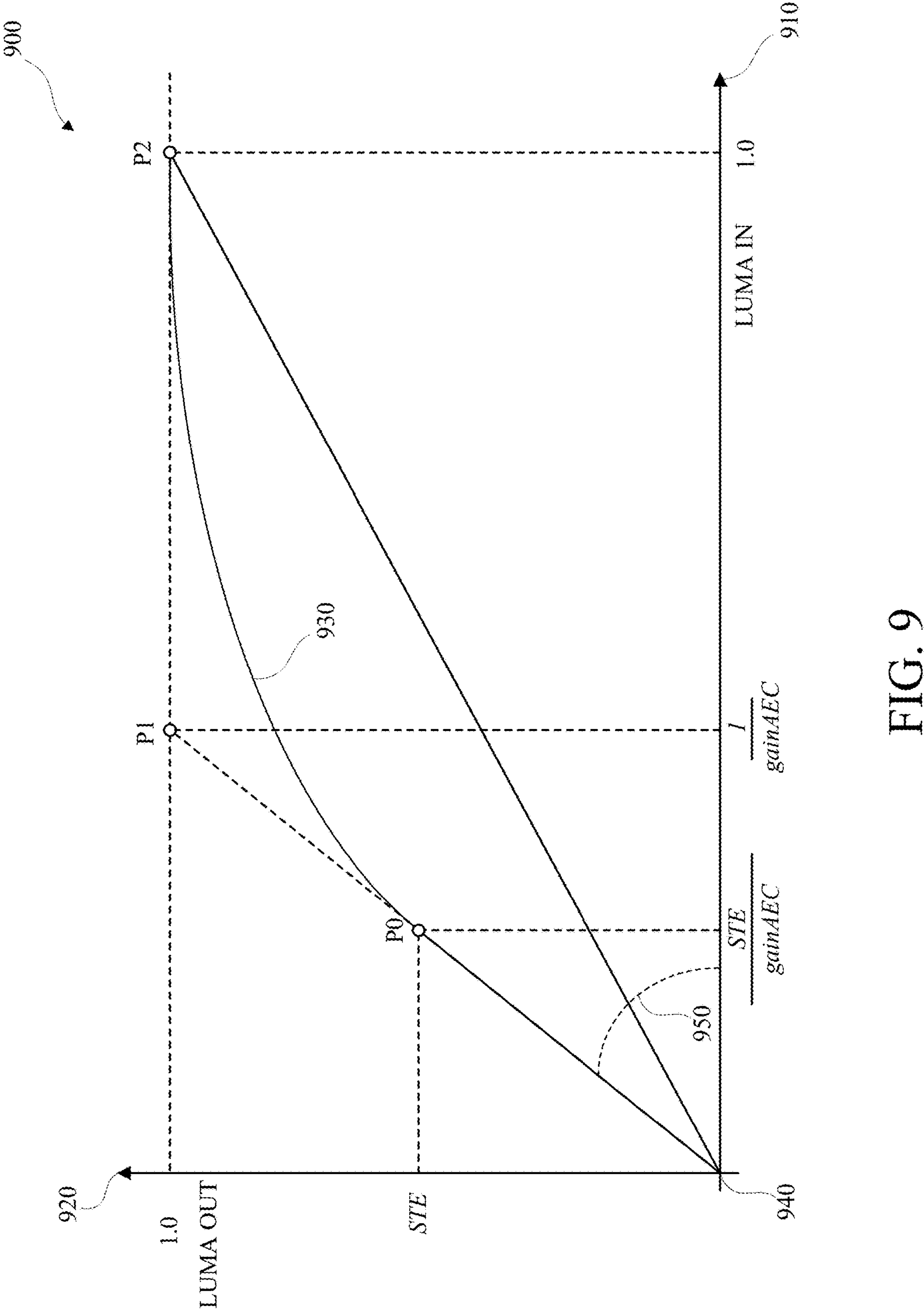
FIG. 9 is a graph of an example of a diagram of an auto-exposure compensation tone curve.

A diagram of an example of an auto-exposure compensation tone curve is shown in FIG. 9.

The auto-exposure compensation component 850 outputs, such as stores in a memory of the image capture apparatus, sends, transmits, or otherwise makes accessible, auto-exposure compensation output data including the auto-exposure compensation lookup table (lutAEC), the auto-exposure compensation gain (gainAEC), or both. For example, the auto-exposure compensation component 850 may output the auto-exposure compensation output data including the auto-exposure compensation lookup table (lutAEC), the auto-exposure compensation gain (gainAEC), or both, to the contrast control component 860, the tone control driver 870, or both.

The contrast control component 860 determines a per gray level gain to apply to the current image, or frame, to obtain the processed, or partially processed, image. The contrast control component 860 is shown with a broken line boarder to indicate that the contrast control component 860 obtains, determines, selects, generates, calculates, produces, or identifies, the per gray level gain to apply to the current image, or frame, periodically, such as in accordance with the adaptive acquisition control sample period, or the corresponding adaptive acquisition control sample rate, such as on a per third captured frames basis for video captured at thirty frames per second (30 fps).

The contrast control component 860 accesses, such as reads, such as from a memory of the image capture apparatus, receives, or otherwise obtains, contrast control input data 862. The contrast control input data 862 is shown with a broken line boarder to indicate that the contrast control input data 862 is obtained periodically, such as in accordance with the adaptive acquisition control sample rate, such as on a per-third frame basis.

The contrast control input data 862 is similar to the target exposure input data 832, except as is described herein or as is otherwise clear from context. For example, the contrast control input data 862 includes the representative histogram data, such as histograms of the captured image corresponding to the representative image, such as histograms of the RGB format image (histogramsRGB), which may include a red channel (R) histogram, a blue channel (B) histogram, and a green channel (G) histogram. In some implementations, the contrast control input data 862 may omit scene classification data.

The contrast control component 860 accesses, such as reads, such as from a memory of the image capture apparatus, receives, or otherwise obtains, the auto-exposure compensation output data including the auto-exposure compensation lookup table (lutAEC), the auto-exposure compensation gain (gainAEC), or both, output by the auto-exposure compensation component 850, such as in accordance with the adaptive acquisition control sample rate.

To determine the per gray level gain to apply to the current image, or frame, to obtain the processed, or partially processed, image, the contrast control component 860 obtains, determines, selects, generates, calculates, produces, or identifies, a contrast control tone curve (CCTC), or a corresponding contrast control lookup table (lutCC), for optimizing perceived contrast in the processed, or partially processed, image.

To obtain the contrast control tone curve (CCTC), or the corresponding contrast control lookup table (lutCC), the contrast control component 860 obtains, determines, selects, generates, calculates, produces, or identifies, a post auto-exposure compensation histogram (postAECHistogram) by applying the auto-exposure compensation gain (gainAEC) to the representative histogram obtained for the image, or frame, captured in accordance with the adaptive acquisition control sample rate, which may be histogram data for a raw image, or the luminance, or luma, channel of the image, or frame, (histogramY), which constructively represents the current image, or the histogram thereof. Applying a lookup table to a histogram includes shifting the positions of respective bins of the histogram in accordance with the lookup table applied to the input positions.

For example, the input histogram (H) may have a number, or cardinality, (N) of bins. A respective bin has a corresponding value, such that obtaining the value of a bin (x) of the input histogram (H) may be expressed as H(x). The input lookup table (f) may have the number, or cardinality, (N) of value, which may be in the range from zero (0) to one less than the number, or cardinality, (N), which may be expressed as (0, N−1). The value (x) of the input lookup table (f) may be expressed as f(x). The input lookup table (f) may have integer indexes and values, such that x and f(x) are integers in the range from zero (0) to one less than the number, or cardinality, (N) (0, N−1). An output histogram (G) may have the number, or cardinality, (N) bins. A respective bin may have a respective value, such that the bin x of G has the value G(x). For example, obtaining the output histogram (G) may include using an empty histogram wherein the bins have the value zero (0). Applying the input lookup table (f) to the input histogram (H) may include iteration. For a respective value (x), which is an integer index ranging from zero (0) to N−1, G(f(x)) is the value of bin f(x), and G(f(x)) is incremented by the value H(x).

Although not shown separately in FIG. 8, the contrast control component 860 may access, such as read, such as from a memory of the image capture apparatus, receive, or otherwise obtain, a defined histogram tuning value, such as a histogram shape parameter, (targetHistogramTuning), which may be Gaussian. Other shapes, such as flat or parabola may be used. The histogram shape parameter (targetHistogramTuning) may be defined, or tuned, such as manually.

The contrast control component 860 obtains, determines, selects, generates, calculates, produces, or identifies, a contrast control target histogram, or contrast control target histogram data, (targetHistogram) using the post automatic exposure control histogram (postAECHistogram). The contrast control target histogram (targetHistogram) may be adapted to, or a function ($f(\ )$) of, the post automatic exposure control histogram (postAECHistogram), and the histogram shape parameter (targetHistogramTuning). Obtaining the contrast control target histogram (targetHistogram) may be expressed as the following:

$$targetHistogram = f(postAECHistogram,\ targetHistogramTuning).$$

For example, obtaining the contrast control target histogram (targetHistogram) as a function ($f(\ )$) of, the post automatic exposure control histogram (postAECHistogram), and the histogram shape parameter (targetHistogramTuning), may include using a Gaussian function that includes an expected value parameter for adjusting the center of the Gaussian curve and a standard deviation parameter for adjusting the stretch, or the width of the 'bell' wherein the Gaussian curve is similar to a bell curve, of the Gaussian curve. The mean, such as the mean luminosity, of the post automatic exposure control histogram (postAECHistogram) is used as the expected value parameter, which may preserve the global exposure of the image. Although not shown separately in FIG. 8, the contrast control component 860 may access, such as read, such as from a memory of the image capture apparatus, receive, or otherwise obtain, defined, or tuned, such as manually, such as based on training data, value for the standard deviation, which may correspond with an image capture mode of the image capture apparatus. The contrast of the image corresponds to the standard deviation relative to the center of the curve. For example, a standard deviation that is relatively close to the center of the curve corresponds to a relatively low curve spread and relatively high image contrast. In another example, a standard deviation that is relatively far to the center of the curve corresponds to a relatively high curve spread and relatively low image contrast.

In some implementations, the contrast control input data 862 may include scene classification data, which may indicate a scene classification, such as underwater, daylight, or nighttime, and the contrast control target histogram (targetHistogram) may be adapted to, or a function ($f(\ )$) of, the scene classification (sceneClassification), the post automatic exposure control histogram (postAECHistogram), and the histogram shape parameter (targetHistogramTuning). Obtaining the contrast control target histogram (targetHistogram) may be expressed as the following:

$$targetHistogram = f(postAECHistogram,\ targetHistogramTuning,\ sceneClassification).$$

The contrast control component 860 obtains, determines, selects, generates, calculates, produces, or identifies, the contrast control lookup table (lutCC), implementing the contrast control tone curve (CCTC), via optimization, subject to one or more defined contrast control constraints, such as to avoid quantification, noise enhancement, contrast enhancement of uniform scenes, flat tones, or the like, such that the contrast control lookup table (lutCC) is adapted to, or a function ($f(\ )$) of, the post automatic exposure control histogram (postAECHistogram), the contrast control target histogram (targetHistogram), constraint data (lutCCConstraints) defining, or describing, the defined constraints, and the representative image (thumbnailY), such that applying the contrast control tone curve (CCTC) to the current image results in the processed, or partially processed, image, or frame, having the contrast control target histogram (targetHistogram), which may be expressed as the following:

$$lutCC = f(postAECHistogram, targetHistogram, lutCCConstraints, thumbnailY).$$

The contrast control component 860 obtains, determines, selects, generates, calculates, produces, or identifies, a temporally smoothed contrast control lookup table (lutCCSmoothed), or a corresponding temporally smoothed contrast control tone curve (CCTCSmoothed), which may prevent, or minimize, abrupt contrast variation between frames, by temporally smoothing the contrast control lookup table (lutCC). The contrast control component 860 may use the temporally smoothed contrast control lookup table (lutCCSmoothed), or the corresponding temporally smoothed contrast control tone curve (CCTCSmoothed), as the contrast control lookup table (lutCC), or the contrast control tone curve (CCTC).

Although not shown separately in FIG. 8, the contrast control component 860 accesses, such as reads, such as from a memory of the image capture apparatus, receives, or otherwise obtains, a previous contrast control lookup table (lutCCPrevious), which may be a previous temporally smoothed contrast control lookup table (lutCCSmoothedPrevious), such as the contrast control lookup table previously output by the contrast control component 860, such as for the previous processed frame.

The temporally smoothed contrast control lookup table (lutCCSmoothed) may be obtained by interpolating between, such as by obtaining a linear combination of, the contrast control lookup table (lutCC) and the previous contrast control lookup table (lutCCPrevious), which may be the previous temporally smoothed contrast control lookup table (lutCCSmoothedPrevious), and in accordance with a smoothing coefficient (a), which may be a tuned, such as manually, defined smoothing coefficient, which may be expressed as the following:

$$lutCCSmoothed = (1-a) * lutCCPrevious + a * lutCC.$$

Although the term 'smoothing coefficient' and the symbol (a) are used with respect to smoothing other values, the smoothing coefficient (a) used for obtaining the temporally smoothed contrast control lookup table (lutCCSmoothed) may be a defined, or tuned, such as manually, value for obtaining the temporally smoothed contrast control lookup table (lutCCSmoothed), which may be referred to as a contrast control lookup table smoothing coefficient, or as a defined contrast control tone curve smoothing coefficient. Although described herein with respect to the temporally smoothed contrast control lookup table (lutCCSmoothed), temporal smoothing may be omitted, and the contrast control lookup table (lutCC) may be used.

The contrast control component 860 obtains, determines, selects, generates, calculates, produces, or identifies, a contrast control black point value (ccBlackPoint), which may be or include per-channel values. For example, the contrast control component 860 may obtain a first contrast control black point value for a red color channel (ccBlackPointR), a second contrast control black point value for a green color channel (ccBlackPointG), and a third contrast control black point value for a blue color channel (ccBlackPointB). Obtaining the contrast control black point value (ccBlackPoint) is similar to obtaining the global tone mapping black point (blackPoint) by the global tone mapping driver 560 shown in FIG. 5, except as is described herein or as is otherwise clear from context.

The contrast control component 860 obtains, determines, selects, generates, calculates, produces, or identifies, a normalized contrast control black point value (ccBlackPointNormalized). To obtain the normalized contrast control black point value (ccBlackPointNormalized), the contrast control component 860 may obtain, as the normalized contrast control black point value (ccBlackPointNormalized), a result of dividing the contrast control black point value (ccBlackPoint) by a product of multiplying the exposure duration value (exposureDuration) corresponding to the representative image by the gain value (gain) corresponding to the representative image, which may be expressed as ccBlackPointNormalized=ccBlackPoint/(exposureDuration*gain). The contrast control component 860 may use the normalized contrast control black point value (ccBlackPointNormalized) as the contrast control black point value (ccBlackPoint).

The contrast control component 860 outputs, such as stores in a memory of the image capture apparatus, sends, transmits, or otherwise makes accessible, contrast control output data including the contrast control black point value (ccBlackPoint), the contrast control lookup table (lutCC), which may be the temporally smoothed contrast control lookup table (lutCCSmoothed), or both. For example, the contrast control component 860 may output the contrast control output data including the contrast control black point value (ccBlackPoint), the contrast control lookup table (lutCC), which may be the temporally smoothed contrast control lookup table (lutCCSmoothed), or both to the tone control driver 870.

The tone control driver 870 obtains the tone control tone curve, the tone control black point value, or both. The tone control driver 870 is shown with a solid line border to indicate that the tone control driver 870 obtains the tone control tone curve, the tone control black point value, or both, on a per-frame basis.

The tone control driver 870 accesses, such as reads, such as from a memory of the image capture apparatus, receives, or otherwise obtains, tone control driver input data 872. The tone control driver input data 872 includes the adaptive acquisition control parameters used to capture the current image, such as the current exposition data. The tone control driver input data 872 is shown with a solid line border to indicate that the tone control driver input data 872 is obtained on a per-frame basis.

The tone control driver 870 accesses, such as reads, such as from a memory of the image capture apparatus, receives, or otherwise obtains, the auto-exposure compensation output data including the auto-exposure compensation lookup table (lutAEC), the auto-exposure compensation gain (gainAEC), or both, output by the auto-exposure compensation component 850, such as in accordance with the adaptive acquisition control sample rate.

The tone control driver 870 accesses, such as reads, such as from a memory of the image capture apparatus, receives, or otherwise obtains, the contrast control output data including the contrast control black point value (ccBlackPoint), the contrast control lookup table (lutCC), which may be the temporally smoothed contrast control lookup table (lutCCSmoothed), or both, output by the contrast control component 860, such as in accordance with the adaptive acquisition control sample rate. In some implementations, the contrast control output data may include the contrast control black point value (ccBlackPoint), the contrast control lookup table (lutCC), or both.

The tone control driver 870 obtains, determines, selects, generates, calculates, produces, or identifies, the tone control tone curve, or the corresponding tone control look up table (lutTC), adaptive to, or as a function ($f(\ )$) of, such as by combining or merging, the auto-exposure compensation lookup table (lutAEC) and the contrast control lookup table (lutCC), which may be the temporally smoothed contrast control lookup table (lutCCSmoothed), and in accordance with the input luminance (x), where (x) is a value of an index of the tone control look up table (lutTC), which may be expressed as the following:

$$lutTC(x) = f(lutCC, lutAEC)(x) = lutAEC\ (x) * lutCC\ (lutAEC(x)).$$

For example, tone control tone curve, or the corresponding tone control look up table (lutTC), adaptive to, or as a function ($f(\ )$) of, such as by combining or merging, the auto-exposure compensation lookup table (lutAEC) and the contrast control lookup table (lutCC), which may be the temporally smoothed contrast control lookup table (lutCCSmoothed), and in accordance with the input luminance (x), where (x) is a value of an index of the tone control look up table (lutTC), may include obtaining an auto-exposure compensation value from the auto-exposure compensation tone curve, or auto-exposure compensation lookup table (lutAEC), for an input luminance value (x), obtaining a contrast control value from the contrast control tone curve, or the temporally smoothed contrast control lookup table (lutCCSmoothed), for the auto-exposure compensation value, and obtaining, as the tone control tone curve, or the corresponding tone control look up table (lutTC), a result of multiplying the auto-exposure compensation value by the contrast control value.

The tone control driver 870 may obtain a tone control black point, or tone control black point value, (tcBlackPoint). To obtain the tone control black point (tcBlackPoint), the tone control driver 870 may obtain a temporally smoothed tone control black point value (tcBlackPointSmoothed) and may use the temporally smoothed tone control black point value (tcBlackPointSmoothed) as the tone control black point, or tone control black point value, (tcBlackPoint).

Although not shown separately in FIG. 8, the tone control driver 870 accesses, such as reads, such as from a memory of the image capture apparatus, receives, or otherwise obtains, a previous tone control black point value (tcBlackPointPrevious), such as a tone control black point value, or a normalized previous tone control black point value (tcBlackPointPreviousNormalized), previously output by the tone control driver 870, such as for the previous processed frame.

The tone control driver 870 may obtain a temporally smoothed tone control black point value (tcBlackPointSmoothed) by interpolating between, such as by obtaining a linear combination of, the contrast control black point value (ccBlackPoint), which may be the normalized contrast control black point value (ccBlackPointNormalized), and the previous tone control black point value (tcBlackPointPrevious), which may be the normalized previous tone control black point value (tcBlackPointPreviousNormalized), and in accordance with a smoothing coefficient (a), which may be a tuned, such as manually, defined smoothing coefficient, which may be expressed as the following:

$$tcBlackPointSmoothed = (1-a) * tcBlackPointPrevious + a * ccBlackPoint.$$

Although the term 'smoothing coefficient' and the symbol (a) are used with respect to smoothing other values, the smoothing coefficient (a) used for obtaining the temporally smoothed tone control black point value (tcBlackPointSmoothed) may be a defined, or tuned, such as manually, value for obtaining the temporally smoothed tone control black point value (tcBlackPointSmoothed), which may be referred to as a tone control black point value smoothing coefficient. Although described herein with respect to the temporally smoothed tone control black point value (tcBlackPointSmoothed), temporal smoothing may be omitted.

The tone control driver 870 may obtain, as the tone control black point (tcBlackPoint), a product of multiplying the temporally smoothed tone control black point value (tcBlackPointSmoothed) by a product of multiplying the exposure duration value from the adaptive acquisition control parameters used to capture the current image by the gain value from the adaptive acquisition control parameters used to capture the current image.

The tone control driver 870 outputs, such as stores in a memory of the image capture apparatus, sends, transmits, or otherwise makes accessible, tone control driver output data 874. The tone control driver output data 874 includes the tone control look up table (lutTC), the tone control black point value (tcBlackPoint), or both. The tone control driver output data 874 is shown with a solid line border to indicate that the tone control driver output data 874 is output on a per-frame basis.

Although not expressly shown in FIG. 8, a processed, or partially processed, image, or frame, may be obtained, generated, calculated, produced, or determined, by applying the tone control driver output data 874, such as the tone control look up table (lutTC), the tone control black point value, or both, to the current, input, or source, image, or frame, such as by another component of the image capture apparatus.

FIG. 9 is a graph of an example of a diagram of an auto-exposure compensation tone curve 900 for use with exposure and tone mapping control as described herein with an auto-exposure compensation gain (gainAEC) greater than one (1) (gainAEC>1). The diagram of the auto-exposure compensation tone curve 900 includes a horizontal axis 910 representing input luminance (LUMA IN) and a vertical axis 920 representing output luminance (LUMA OUT). The diagram of the auto-exposure compensation tone curve 900 includes the non-linear auto-exposure compensation tone curve 930.

An origin 940, corresponding to a zero (0) value for output luminance and a zero value (0) ([0,0]) for input luminance is shown.

A first control point (P0) is shown having a vertical component corresponding to the smoothed target exposure (targetExposureSmoothed, or STE for brevity) and a horizontal component corresponding to a result of dividing the smoothed target exposure (targetExposureSmoothed) by the auto-exposure compensation gain (gainAEC) (targetExposureSmoothed/gainAEC or STE/gainAEC for brevity) ([targetExposure Smoothed, targetExposureSmoothed/gainAEC]).

A second control point (P1) is shown having a vertical component corresponding to one (1) and a horizontal component corresponding to a result of dividing one (1) by the auto-exposure compensation gain (gainAEC) (1/gainAEC) ([1, 1/gainAEC]).

A third control point (P2) is shown having a vertical component corresponding to one (1) and a horizontal component corresponding to corresponding to one (1) ([1,1]).

The auto-exposure compensation tone curve 930 includes a linear portion from the origin 940 to the first control point (P0) that has a linear slope. The origin 940 is the start of the linear portion of the auto-exposure compensation tone curve 930 and the first control point (P0) is the end of the linear portion of the auto-exposure compensation tone curve 930.

The auto-exposure compensation tone curve 930 includes a non-linear, or Bézier, portion between the first control point (P0) and the third control point (P2). The first control point (P0) is a first control point of the Bézier curve and is the start of the Bézier curve portion of the auto-exposure compensation tone curve 930.

The second control point (P1) is a second control point of the Bézier curve. P0P1 indicates the slope of the tangent to the Bézier curve at the first control point (P0).

The third control point (P2) is a third control point of the Bézier curve, corresponding to the end of the Bézier curve portion of the auto-exposure compensation tone curve 930. P1P2 indicates the slope of the tangent to the Bézier curve at the third control point (P2).

The auto-exposure compensation gain (gainAEC) is shown as a broken line arc 950.

The strait line from the origin 940 to the third control point (P2) indicates an identity curve.

Figure 10:
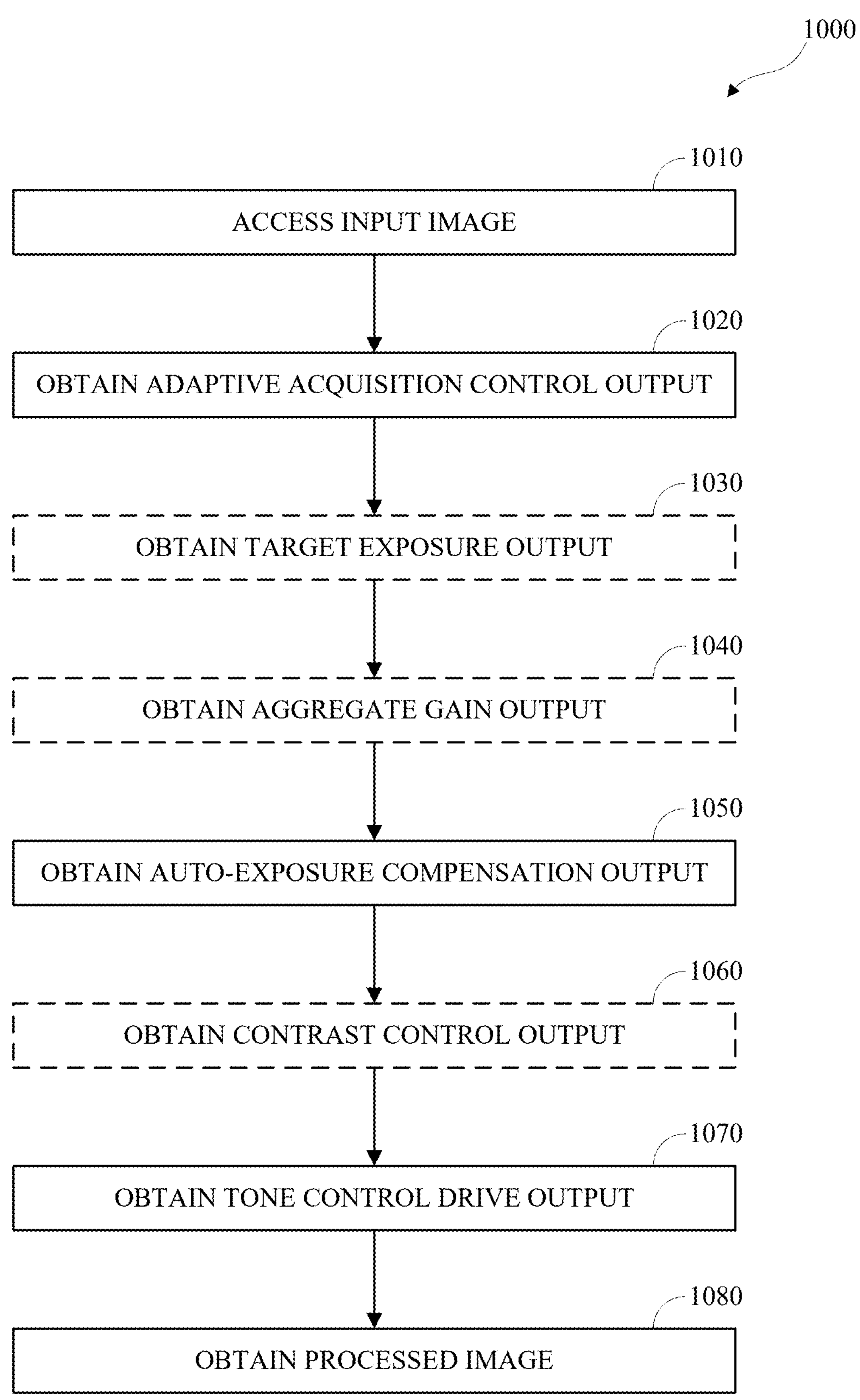
FIG. 10 is a flow diagram of an example of adaptive acquisition control for video capture.

FIG. 10 is a flow diagram of an example of adaptive acquisition control 1000 for video capture. Adaptive acquisition control 1000, or a portion thereof, is implemented in an image capture apparatus, such as the image capture apparatus 100 shown in FIGS. 1A-1B, the image capture apparatus 200 shown in FIGS. 2A-2C, the image capture apparatus 300 shown in FIG. 3, as a part of the image processing pipeline 400, or in another image capture apparatus. For example, an adaptive acquisition control component, such as the adaptive acquisition control component 800 shown in FIG. 8, may implement adaptive acquisition control 1000, or one or more portions thereof. In some implementations, adaptive acquisition control 1000, or one or more portions thereof, may be implemented in a digital signal processor (DSP), an application-specific integrated circuit (ASIC), or a combination of a digital signal processor and an application-specific integrated circuit. One or more aspects of adaptive acquisition control 1000 may be implemented in hardware, software, or a combination of hardware and software. The adaptive acquisition control component 800 may be similar to the adaptive acquisition control component 500 shown in FIG. 5, except as is described herein or as is otherwise clear from context. In some implementations, other aspects of image acquisition and processing not expressly shown in FIG. 10 may be used. FIG. 10 shows adaptive acquisition control 1000 for a frame, or image, of a sequence of frames, or images, such as a sequence of frames of a video.

Adaptive acquisition control 1000 for video capture includes accessing an input image 1010, obtaining adaptive acquisition control output data 1020, obtaining target exposure output data 1030, obtaining aggregate gain output data 1040, obtaining auto-exposure compensation output data 1050, obtaining contrast control output data 1060, obtaining tone control drive output data 1070, and obtaining output image data (a processed image) 1080.

Adaptive acquisition control 1000 for video capture includes accessing an input image 1010. For example, the input, or current, image, or frame, may be a frame of a sequence of frames of a video captured by the image capture apparatus in accordance with a defined frame rate, such as thirty frames per second (30 fps). The input, or current, image, or frame, may be accessed, such as read, such as from a memory of the image capture apparatus, received, or otherwise accessed, such as from a sensor, such as an image sensor, of the image capture apparatus. For example, the image capture apparatus that implements adaptive acquisition control 1000 may include an image sensor, such as the image sensors 242, 246 shown in FIG. 2C, the image sensor 312 shown in FIG. 3, or the image sensor 410 shown in FIG. 4, and an image signal processor, such as the image signal processor 420 shown in FIG. 4, and the image signal processor, or a portion or component thereof, may access the input image from the image sensor. Although accessing the input image 1010 is shown prior to obtaining adaptive acquisition control output data 1020, obtaining target exposure output data 1030, obtaining aggregate gain output data 1040, obtaining auto-exposure compensation output data 1050, obtaining contrast control output data 1060, and obtaining tone control drive output data 1070, obtaining adaptive acquisition control output data 1020, obtaining target exposure output data 1030, obtaining aggregate gain output data 1040, obtaining auto-exposure compensation output data 1050, obtaining contrast control output data 1060, and obtaining tone control drive output data 1070, or a portion thereof may be performed prior to or concurrent with capturing, accessing, or both, the current image.

Adaptive acquisition control 1000 for video capture includes obtaining adaptive acquisition control output data 1020. For example, obtaining adaptive acquisition control output data 1020 may be implemented by an exposure control component of the image capture apparatus, such as the exposure control portion 810 shown in FIG. 8. Obtaining adaptive acquisition control output data 1020 may be similar to obtaining target adaptive acquisition control data by the exposure control portion 810 shown in FIG. 8. For example, obtaining adaptive acquisition control output data 1020 may include obtaining a target exposure duration value and a target gain value, such as on a per-frame basis. Although not expressly shown in FIG. 10, obtaining adaptive acquisition control output data 1020 may include outputting the adaptive acquisition control output data, such as to the image sensor of the image capture apparatus.

Adaptive acquisition control 1000 for video capture includes obtaining target exposure output data 1030. For example, the target exposure output data may be obtained by a target exposure component of the image capture apparatus, such as the target exposure component 830 shown in FIG. 8. Obtaining target exposure output data 1030 may be similar to obtaining target exposure output data by the target exposure component 830 shown in FIG. 8.

Obtaining target exposure output data 1030 is shown with a broken line boarder to indicate that the target exposure output data is obtained periodically, such as in accordance with a determined, or defined, adaptive acquisition control sample period, or corresponding adaptive acquisition control sample rate, which is determined, or defined, in accordance with a current, active, or operative, frame rate for video capture, such as at a defined fraction of the defined frame rate, such as one third the frame rate. For example, the operative, active, or current, frame rate may be thirty frames per second (30 fps) and the target exposure output data obtained may be obtained, determined, selected, generated, calculated, produced, or identified, at an adaptive acquisition control sample rate of ten frames per second (10 fps), such as on a per third captured frame basis.

Obtaining target exposure output data 1030 includes accessing, such as reading, such as from a memory of the image capture apparatus, receiving, or otherwise obtaining, target exposure input data, such as the target exposure input data 832 shown in FIG. 8. The target exposure input data includes representative adaptive acquisition control data (acquisition parameters), representative image data, representative histogram data, or a combination thereof.

The representative adaptive acquisition control data may be, or may include, a target exposure duration value, a target gain value, or both, for capturing a previous frame captured in accordance with the adaptive acquisition control sample rate. The representative adaptive acquisition control data constructively represents the adaptive acquisition control data used to capture the current image and may differ from the adaptive acquisition control data used to capture the current image. The representative image data (representative image) may be image data obtained from the image, or frame, captured in accordance with the adaptive acquisition control sample rate, a reduced image corresponding to the captured image, such as a thumbnail image, which may be a RAW image, or luminance, or luma, data thereof, generated from the captured image. Although described as constructively representing the current, or most recently captured, image, the representative image data, the representative histogram data, or both, may be generated from, or using, the current image, or a previously captured image captured sequentially before the current image, in accordance with the adaptive acquisition control sample rate, such as using the representative adaptive acquisition control data.

In some implementations, the target exposure input data includes scene classification data corresponding to the previous frame captured in accordance with the adaptive acquisition control sample rate. In some implementations, the target exposure input data includes motion data, such as motion data describing motion of the image capture apparatus, captured, generated, or determined, in accordance with capturing the previous frame captured in accordance with the adaptive acquisition control sample rate.

Obtaining target exposure output data 1030 includes obtaining, generating, calculating, producing, selecting, identifying, or determining, a target exposure, or target exposure value, such as based on, using, or in accordance with, the target exposure input data, or a portion thereof. The target exposure indicates an optimized, target, mean gray level, such as for the luma, or luminance, channel for the processed image, such as subsequent to gamma correction. Obtaining the target exposure value is similar to obtaining a target exposure value by the target exposure component 830 shown in FIG. 8.

Obtaining target exposure output data 1030 includes obtaining, generating, calculating, producing, selecting, identifying, or determining, a scene luminance value in accordance with the target exposure input data. Obtaining the scene luminance value includes determining a mean gray level, or value, of the representative image from the target exposure input data. Obtaining the scene luminance value is similar to obtaining a scene luminance value by the target exposure component 830 shown in FIG. 8.

Obtaining target exposure output data 1030 includes accessing, such as reading, such as from a memory of the image capture apparatus, receiving, or otherwise obtaining, a defined, such as manually tuned, target exposure tone curve, which may be implemented as a lookup table, that maps exposure values, such as target exposure values, to corresponding scene luminance values. Accessing the target exposure tone curve is similar to accessing a target exposure tone curve by the target exposure component 830 shown in FIG. 8.

Obtaining target exposure output data 1030 may include obtaining, generating, calculating, producing, selecting, identifying, or determining, a temporally smoothed target exposure, or temporally smoothed target exposure value. Obtaining the temporally smoothed target exposure is similar to obtaining a temporally smoothed target exposure by the target exposure component 830 shown in FIG. 8.

The target exposure output data is output, such as stored in a memory of the image capture apparatus, or otherwise made accessible, to one or more other components of the image capture apparatus. For example, the target exposure component may output the target exposure data to an aggregate gain component of the image capture apparatus, to an auto-exposure compensation component of the image capture apparatus, or to both. Outputting the target exposure output data is similar to outputting target exposure output data by the target exposure component 830 shown in FIG. 8.

Adaptive acquisition control 1000 for video capture includes obtaining aggregate gain output data 1040. For example, the aggregate gain output data may be obtained by an aggregate gain component of the image capture apparatus, such as the aggregate gain component 840 shown in FIG. 8. Obtaining aggregate gain output data 1040 may be similar to obtaining aggregate gain output data by the aggregate gain component 840 shown in FIG. 8. Obtaining aggregate gain output data 1040 is shown with a broken line boarder to indicate that the aggregate gain output data is obtained periodically, such as in accordance with the adaptive acquisition control sample period.

Obtaining aggregate gain output data 1040 includes obtaining, generating, calculating, producing, selecting, identifying, or determining, a target aggregate gain, or target aggregate gain value, to apply to the current image, or frame, to obtain the processed image, or frame, having the temporally smoothed target exposure. Obtaining the target aggregate gain is similar to obtaining a target aggregate gain by the aggregate gain component 840 shown in FIG. 8.

Obtaining aggregate gain output data 1040 includes accessing, such as reading, such as from a memory of the image capture apparatus, receiving, or otherwise obtaining, aggregate gain input data, such as the aggregate gain input data 842 shown in FIG. 8.

The target aggregate gain is an aggregated sum of gain applied to the current image, or frame, as captured (e.g., measured or detected photons) to obtain the processed, or partially processed, image, or frame, having the target exposure, or the temporally smoothed target exposure.

Obtaining aggregate gain output data 1040 includes obtaining, generating, calculating, producing, selecting, identifying, or determining, the exposure of the representative frame, such as using the histogram of the luma, or luminance, channel, or component, from the aggregate gain input data. The exposure of the representative frame represents the exposure of the current frame and may differ from the exposure of the current frame.

Obtaining aggregate gain output data 1040 includes obtaining, generating, calculating, producing, selecting, identifying, or determining, a remaining gain value for obtaining the processed, or partially processed, image having the target exposure, or the temporally smoothed target exposure.

Obtaining aggregate gain output data 1040 may include obtaining, generating, calculating, producing, selecting, identifying, or determining, a temporally smoothed target aggregate gain to compensate for, such as reduce or eliminate, differences, including differences corresponding to scene modification and differences corresponding to the respective adaptive acquisition control parameters used for capturing the respective images, by applying temporal smoothing. Obtaining the temporally smoothed target aggregate gain is similar to obtaining a temporally smoothed target aggregate gain by the aggregate gain component 840 shown in FIG. 8.

The aggregate gain output data is output, such as stored in a memory of the image capture apparatus, or otherwise made accessible, such as to the auto-exposure compensation component. Outputting the aggregate gain output data is similar to outputting aggregate gain output data by the aggregate gain component 840 shown in FIG. 8.

Adaptive acquisition control 1000 for video capture includes obtaining auto-exposure compensation output data 1050, such as on a per-frame basis. For example, the auto-exposure compensation output data may be obtained by an auto-exposure compensation component of the image capture apparatus, such as the auto-exposure compensation component 850 shown in FIG. 8. Obtaining auto-exposure compensation output data 1050 may be similar to obtaining auto-exposure compensation output data by the auto-exposure compensation component 850 shown in FIG. 8.

Obtaining auto-exposure compensation output data 1050 includes obtaining, generating, calculating, producing, selecting, identifying, or determining, an auto-exposure compensation tone curve, or a corresponding auto-exposure compensation look up table, which may be expressed as an auto-exposure compensation lookup table, that defines or describes a per-pixel value gain to apply the current image to obtain the processed, or partially processed, image having the target aggregate gain, or the temporally smoothed target aggregate gain, corresponding to applying the remaining gain. Obtaining the auto-exposure compensation tone curve is similar to obtaining an auto-exposure compensation tone curve by the auto-exposure compensation component 850 shown in FIG. 8.

Obtaining auto-exposure compensation output data 1050 includes accessing, such as reading, such as from a memory of the image capture apparatus, receiving, or otherwise obtaining, auto-exposure compensation input data, such as the auto-exposure compensation input data 852 shown in FIG. 8.

Obtaining auto-exposure compensation output data 1050 includes obtaining, generating, calculating, producing, selecting, identifying, or determining, a compliant aggregate gain, or compliant aggregate gain value, based on the aggregate gain value, or the temporally smoothed aggregate gain value, an exposure bias, one or more sensor exposure constraints, or a combination thereof. Obtaining the compliant aggregate gain value is similar to obtaining a compliant aggregate gain value by the auto-exposure compensation component 850 shown in FIG. 8.

Obtaining auto-exposure compensation output data 1050 includes obtaining, generating, calculating, producing, selecting, identifying, or determining, an auto-exposure compensation gain value. Obtaining the auto-exposure compensation gain value is similar to obtaining an auto-exposure compensation gain value by the auto-exposure compensation component 850 shown in FIG. 8.

The auto-exposure compensation output data is output, such as stored in a memory of the image capture apparatus, or otherwise made accessible. Outputting the auto-exposure compensation output data is similar to outputting auto-exposure compensation output data by the auto-exposure compensation component 850 shown in FIG. 8. For example, the auto-exposure compensation output data may be output to another component of the image capture apparatus, such to a contrast control component of the image capture apparatus, such as the contrast control component 860 shown in FIG. 8, a tone control driver of the image capture apparatus, such as the tone control driver 870 shown in FIG. 8, or both.

Adaptive acquisition control 1000 for video capture includes obtaining contrast control output data 1060. For example, the contrast control output data may be obtained by a contrast control component of the image capture apparatus, such as the contrast control component 860 shown in FIG. 8. Obtaining contrast control output data 1060 may be similar to obtaining contrast control output data by the contrast control component 860 shown in FIG. 8. Obtaining contrast control output data 1060 is shown with a broken line boarder to indicate that the contrast control output data is obtained periodically, such as in accordance with the adaptive acquisition control sample period.

Obtaining contrast control output data 1060 includes obtaining, generating, calculating, producing, selecting, identifying, or determining, a per gray level gain to apply to the current image, or frame, to obtain the processed, or partially processed, image.

Obtaining contrast control output data 1060 includes accessing, such as reading, such as from a memory of the image capture apparatus, receiving, or otherwise obtaining, contrast control input data, such as the contrast control input data 862 shown in FIG. 8.

Obtaining contrast control output data 1060 includes obtaining, generating, calculating, producing, selecting, identifying, or determining, a contrast control tone curve, or a corresponding contrast control lookup table, for optimizing perceived contrast in the processed, or partially processed, image. Obtaining the contrast control tone curve is similar to obtaining a contrast control tone curve by the contrast control component 860 shown in FIG. 8.

Obtaining contrast control output data 1060 includes obtaining, generating, calculating, producing, selecting, identifying, or determining, a post auto-exposure compensation histogram by applying the auto-exposure compensation gain to the representative histogram obtained for the image, or frame, captured in accordance with the adaptive acquisition control sample rate, which may be a histogram data for a raw image, or the luminance, or luma, channel of the image, or frame, which constructively represents the current image, or the histogram thereof.

Obtaining contrast control output data 1060 may include accessing, such as reading, such as from a memory of the image capture apparatus, receiving, or otherwise obtaining, a defined histogram tuning value, such as a histogram shape parameter. Accessing the defined histogram tuning value is similar to accessing a defined histogram tuning value by the contrast control component 860 shown in FIG. 8.

Obtaining contrast control output data 1060 includes obtaining, generating, calculating, producing, selecting, identifying, or determining, a contrast control target histogram using the post automatic exposure control histogram. Obtaining the contrast control target histogram is similar to obtaining a contrast control target histogram by the contrast control component 860 shown in FIG. 8.

Obtaining contrast control output data 1060 may include obtaining, generating, calculating, producing, selecting, identifying, or determining, a temporally smoothed contrast control lookup table, which may prevent, or minimize, abrupt contrast variation between frames, by temporally smoothing the contrast control lookup table. Obtaining the temporally smoothed contrast control lookup table is similar to obtaining a temporally smoothed contrast control lookup table by the contrast control component 860 shown in FIG. 8.

Obtaining contrast control output data 1060 includes obtaining, generating, calculating, producing, selecting, identifying, or determining, a contrast control black point value, which may be or include per-channel values. Obtaining the contrast control black point value is similar to obtaining a contrast control black point value by the contrast control component 860 shown in FIG. 8.

Obtaining contrast control output data 1060 may include obtaining, generating, calculating, producing, selecting, identifying, or determining, a contrast control black point value. Obtaining the contrast control black point value is similar to obtaining a contrast control black point value by the contrast control component 860 shown in FIG. 8.

The contrast control output data is output, such as stored in a memory of the image capture apparatus, or otherwise made accessible. Outputting the contrast control output data is similar to outputting contrast control output data by the contrast control component 860 shown in FIG. 8. For example, the contrast control output data may be output to another component of the image capture apparatus, such to a tone control driver of the image capture apparatus, such as the tone control driver 870 shown in FIG. 8.

Adaptive acquisition control 1000 for video capture includes obtaining tone control drive output data 1070, such as on a per-frame basis. For example, the tone control drive output data may be obtained by a tone control driver of the image capture apparatus, such as the tone control driver 870 shown in FIG. 8. Obtaining tone control drive output data 1070 may be similar to obtaining tone control drive output data by the tone control driver 870 shown in FIG. 8.

Obtaining tone control drive output data 1070 includes obtaining, generating, calculating, producing, selecting, identifying, or determining, the tone control tone curve, the tone control black point value, or both.

Obtaining tone control drive output data 1070 includes accessing, such as reading, such as from a memory of the image capture apparatus, receiving, or otherwise obtaining, tone control driver input data, such as the tone control driver input data 872 shown in FIG. 8.

The tone control drive output data is output, such as stored in a memory of the image capture apparatus, or otherwise made accessible. Outputting the tone control drive output data is similar to outputting tone control drive output data by the tone control driver 870 shown in FIG. 8. For example, the tone control drive output data may be output to another component of the image capture apparatus.

Adaptive acquisition control 1000 for video capture includes obtaining output image data 1080, such as including a processed, or partially processed, image, or frame, processed in accordance with the tone control drive output data. Obtaining output image data 1080 includes obtaining, generating, calculating, producing, selecting, identifying, or determining, the processed, or partially processed, image, or frame by applying the tone control look up table, the tone control black point value, or both, to the current, input, or source, image, or frame.

In some implementations, exposure control, such as implemented by the exposure control portion 810 shown in FIG. 8, may use previously defined gain-exposure duration curves, such as the previously defined gain-exposure duration curves 700 shown in FIG. 7, to obtain, determine, select, generate, calculate, produce, or identify, target adaptive acquisition control data, such as a target exposure duration value (exposureDuration), a target gain value (gain), both, or a combination thereof, such as on a per-frame basis. In some implementations, a gain-exposure duration curve for determining exposure duration and gain for image or video capture may be determined in accordance with the current angular speed of the image capture apparatus. For some angular speeds a previously, such as manually, defined, or tuned, gain-exposure duration curve may be used. For angular speeds other than the angular speeds associated with a previously, such as manually, defined, or tuned, gain-exposure duration curve, a gain-exposure duration curve may be interpolated based on one or more of the previously, such as manually, defined, or tuned, gain-exposure duration curves.

Figure 11:
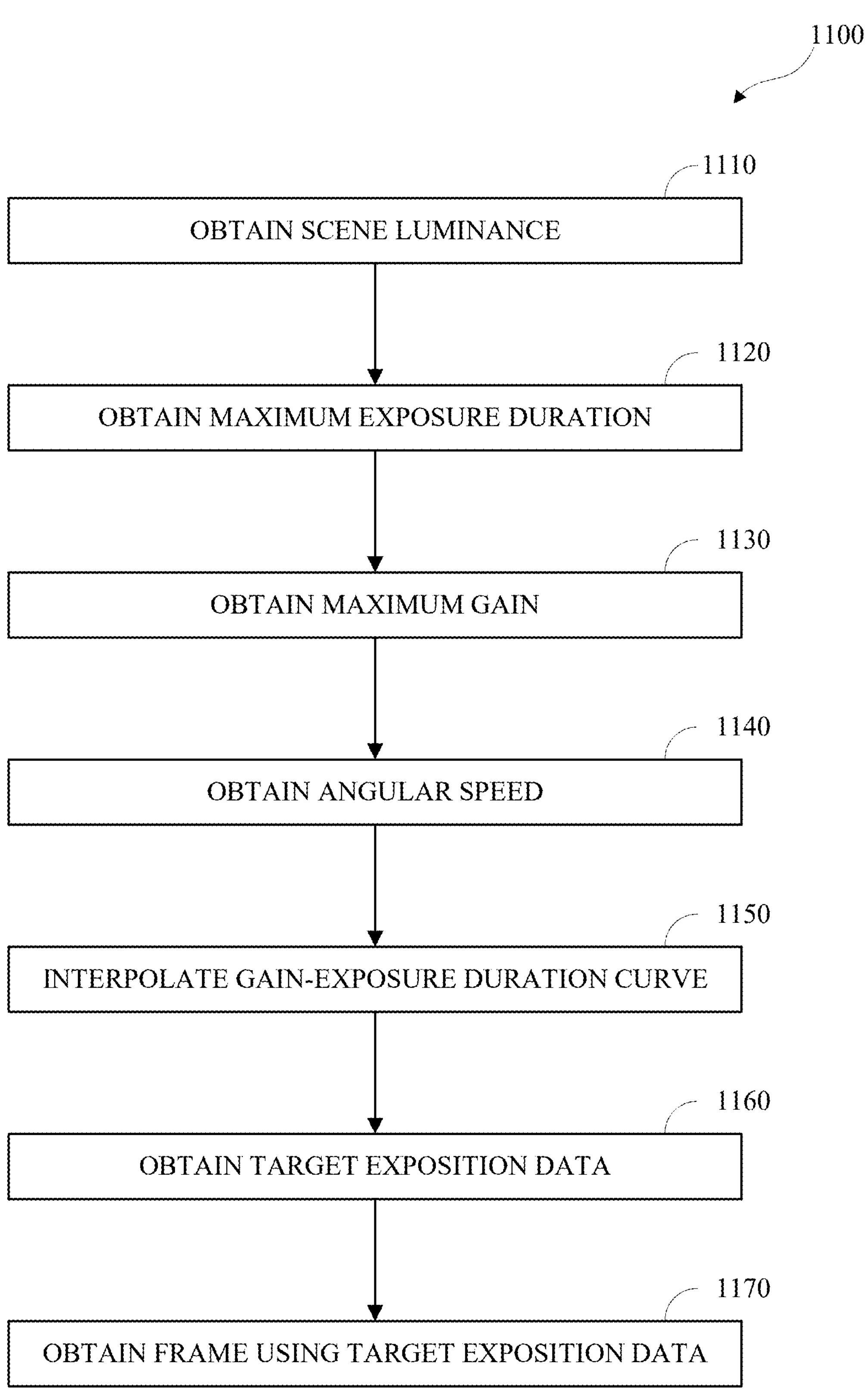
FIG. 11 is a flow diagram of an example of adaptive acquisition control including limited luminance motion blur reduction for image and video acquisition and processing.

FIG. 11 is a flow diagram of an example of adaptive acquisition control including limited luminance motion blur reduction 1100 for image and video acquisition and processing. Adaptive acquisition control including limited luminance motion blur reduction 1100, or a portion thereof, is implemented in an image capture apparatus, such as the image capture apparatus 100 shown in FIGS. 1A-1B, the image capture apparatus 200 shown in FIGS. 2A-2C, the image capture apparatus 300 shown in FIG. 3, as a part of the image processing pipeline 400 shown in FIG. 4, or in another image capture apparatus. In some implementations, the adaptive acquisition control including limited luminance motion blur reduction 1100 may be implemented in a digital signal processor (DSP), an application-specific integrated circuit (ASIC), or a combination of a digital signal processor and an application-specific integrated circuit. One or more components of the adaptive acquisition control including limited luminance motion blur reduction 1100 may be implemented in hardware, software, or a combination of hardware and software. The adaptive acquisition control including limited luminance motion blur reduction 1100 may be similar to the adaptive acquisition control 1000 shown in FIG. 10, except as is described herein or as is otherwise clear from context. For example, an adaptive acquisition control component, which may be similar to the adaptive acquisition control component 800 shown in FIG. 8, except as is described herein or as is otherwise clear from context, may implement adaptive acquisition control including limited luminance motion blur reduction 1100.

Adaptive acquisition control including limited luminance motion blur reduction 1100 includes obtaining a current scene luminance 1110, obtaining a current maximum exposure duration 1120, obtaining a current maximum gain 1130, obtaining a current angular speed 1140, interpolating a current gain-exposure duration curve 1150, obtaining target scene exposition data 1160, and obtaining a frame using the target scene exposition data 1170.

Obtaining the current scene luminance 1110 may be similar to obtaining the scene luminance value (sceneLuminance) by the target exposure component 830 shown in FIG. 8, except as is described herein or as is otherwise clear from context.

Obtaining the current maximum exposure duration 1120 may be similar to obtaining the maximum exposure duration threshold (expDurMax) for the current frame by the auto-exposure sensor driver 540 shown in FIG. 5 or obtaining the maximum exposure duration (maxExposureDuration) by the auto-exposure compensation component 850 shown in FIG. 8, except as is described herein or as is otherwise clear from context.

Obtaining the current maximum gain 1130 includes obtaining the current maximum gain (maxSensorGain) using the current scene luminance value (sceneLuminance).

Obtaining the current maximum gain (maxSensorGain) using the current scene luminance value (sceneLuminance) includes determining whether the current scene luminance value (sceneLuminance) is less than, equal to, or greater than a first defined luminance (L1) threshold, which may be expressed as luminous flux per unit area (lux), such as L1=200 lux.

Obtaining the current maximum gain (maxSensorGain) using the current scene luminance value (sceneLuminance) includes determining whether the current scene luminance value (sceneLuminance) is less than, equal to, or greater than a second defined luminance (L2) threshold, such as L2=400 lux.

The image capture apparatus, or a component thereof, such as the target exposure component 830 shown in FIG. 8, may determine that the current scene luminance value (sceneLuminance) is less than or equal to the first defined luminance (L1) threshold (sceneLuminance <=L1) and a first defined maximum gain value, such as 16.0, corresponding to 1600 ISO, may be used as the current maximum gain (maxSensorGain=16.0). In some implementations, the image capture apparatus, or the component thereof, may determine that the current scene luminance value (sceneLuminance) is less than or equal to the first defined luminance (L1) threshold and determining whether the current scene luminance value (sceneLuminance) is less than, equal to, or greater than a second defined luminance (L2) threshold may be omitted.

The image capture apparatus, or a component thereof, may determine that the current scene luminance value (sceneLuminance) is equal to or greater than the second defined luminance (L2) threshold (sceneLuminance >=L2) and a second defined maximum gain value, such as 32.0, corresponding to 3200 ISO, may be used as the current maximum gain (maxSensorGain=32.0). In some implementations, the image capture apparatus, or the component thereof, may determine that the current scene luminance value (sceneLuminance) is equal to or greater than a second defined luminance (L2) threshold and determining whether the current scene luminance value (sceneLuminance) is less than, equal to, or greater than the first defined luminance (L1) threshold may be omitted.

The image capture apparatus, or a component thereof, may determine that the current scene luminance value (sceneLuminance) is greater than the first defined luminance (L1) threshold (sceneLuminance >L1), or, equivalently, the first defined luminance (L1) threshold is less than the current scene luminance value (sceneLuminance) (L1<sceneLuminance), and is less than the second defined luminance (L2) threshold (sceneLuminance <L2), which may be expressed as L1<sceneLuminance <L2, and the current maximum gain may be interpolated, such as using linear interpolation, between the first defined maximum gain value and the second defined maximum gain value, such as between 16.0 and 32.0, in accordance with the current scene luminance value (sceneLuminance) relative to the first defined luminance (L1) threshold and the second defined luminance (L2) threshold.

Although two defined luminance thresholds (L1, L2) are described, another number, or cardinality, of defined luminance thresholds may be used. For example, one defined luminance threshold may be used wherein the first defined maximum gain value is used for current scene luminance values less than, or less than or equal to, the one defined luminance threshold and the second defined maximum gain value is used for current scene luminance values greater than, or greater than or equal to, the one defined luminance threshold. In another example, three defined luminance thresholds (L1, L2, L3) may be used, wherein the first defined maximum gain value is used for current scene luminance values less than, or less than or equal to, the first defined luminance threshold (L1), an interpolated value between the first defined maximum gain value and the second defined maximum gain value is used for current scene luminance values between the first defined luminance threshold (L1) and the second defined luminance threshold (L2), the second defined maximum gain value is used for current scene luminance values that are equal to, or match, the second defined luminance threshold (L2), an interpolated value between the second defined maximum gain value and a third defined maximum gain value, such as 64.0, is used for current scene luminance values between the second defined luminance threshold (L2) and the third defined luminance threshold (L3), and the third defined maximum gain value is used for current scene luminance values that are equal to or greater than the third defined luminance threshold (L3).

Although not shown separately in FIG. 11, in some implementations, the image capture apparatus, or a component thereof, such as an auto-exposure component, determines whether the current defined frame rate (CFR) differs from a defined reference frame rate (RFR), such as thirty frames per second (30 fps). The image capture apparatus, or the component thereof, may determine that the current defined frame rate (CFR) differs from the reference frame rate (RFR), obtain normalized luminance thresholds (L1, L2), and use the normalized luminance thresholds (L1, L2) as the defined luminance thresholds (L1, L2). The normalized luminance thresholds (L1, L2) may be obtained using the reference frame rate (RFR), which may be expressed as L1'=L1*(RFR/CFR) and L2'=L2*(RFR/CFR), respectively, wherein "/" indicates division.

Although not shown in FIG. 11, in some implementations, the image capture apparatus, or a component thereof, may determine that a manually configured maximum gain, or maximum ISO, is configured for the image capture apparatus, and obtaining the current maximum gain as described herein may be omitted, except that the current maximum gain may be obtained and used other than as described herein.

Obtaining the current angular speed 1140 includes obtaining the current angular speed, or current angular speed data, from a sensor of the image capture apparatus, such as the gyroscope 346 shown in FIG. 3. Obtaining the current angular speed 1140 may be similar to obtaining angular speed data from the motion data 524 shown in FIG. 5 or the target exposure input data 832 shown in FIG. 8, except as is described herein or as is otherwise clear from context.

Obtaining the current interpolated gain-exposure duration curve 1150 includes obtaining the current interpolated gain-exposure duration curve based on at least one of a first previously defined gain-exposure duration curve, such as the first previously defined gain-exposure duration curve 730 shown in FIG. 7, a second previously defined gain-exposure duration curve, such as the second previously defined gain-exposure duration curve 740 shown in FIG. 7, or a third previously defined gain-exposure duration curve, such as the third previously defined gain-exposure duration curve 750 shown in FIG. 7.

Obtaining the current interpolated gain-exposure duration curve includes obtaining the current interpolated gain-exposure duration curve using the current angular speed value.

Obtaining the current interpolated gain-exposure duration curve using the current angular speed value includes determining whether the current angular speed value is less than or equal to a defined low angular speed threshold, such as an angular speed of 0.1 radians per second (0.1 rad/s). For example, the image capture apparatus, or a component thereof, may determine that the current angular speed value is less than or equal to the defined low angular speed threshold. In response to determining that the current angular speed value is less than or equal to the defined low angular speed threshold, the first previously defined gain-exposure duration curve is used as the current interpolated gain-exposure duration curve.

Obtaining the current interpolated gain-exposure duration curve using the current angular speed value includes determining whether the current angular speed value is equal to a defined medium angular speed threshold, such as an angular speed of 1.5 radians per second (1.5 rad/s). For example, the image capture apparatus, or a component thereof, may determine that the current angular speed value is equal to the defined medium angular speed threshold. In response to determining that the current angular speed value is equal to the defined medium angular speed threshold, the second previously defined gain-exposure duration curve is used as the current interpolated gain-exposure duration curve.

Obtaining the current interpolated gain-exposure duration curve using the current angular speed value includes determining whether the current angular speed value is equal to or greater than a defined high angular speed threshold, such as an angular speed of 4.0 radians per second (4.0 rad/s). For example, the image capture apparatus, or a component thereof, may determine that the current angular speed value is equal to or greater than the defined high angular speed threshold. In response to determining that the current angular speed value is equal to or greater than the defined high angular speed threshold, the third previously defined gain-exposure duration curve is used as the current interpolated gain-exposure duration curve.

Obtaining the current interpolated gain-exposure duration curve using the current angular speed value includes determining whether the current angular speed value is greater than the defined low angular speed threshold and less than the defined medium angular speed threshold. For example, the image capture apparatus, or a component thereof, may determine that the current angular speed value is greater than the defined low angular speed threshold and less than the defined medium angular speed threshold. In response to determining that the current angular speed value is greater than the defined low angular speed threshold and less than the defined medium angular speed threshold, the current interpolated gain-exposure duration curve is obtained by interpolating between the first previously defined gain-exposure duration curve and the second previously defined gain-exposure duration curve.

Obtaining the current interpolated gain-exposure duration curve using the current angular speed value includes determining whether the current angular speed value is greater than the defined medium angular speed threshold and less than the defined high angular speed threshold. For example, the image capture apparatus, or a component thereof, may determine that the current angular speed value is greater than the defined medium angular speed threshold and less than the defined high angular speed threshold. In response to determining that the current angular speed value is greater than the defined medium angular speed threshold and less than the defined high angular speed threshold, the current interpolated gain-exposure duration curve is obtained by interpolating between the second previously defined gain-exposure duration curve and the third previously defined gain-exposure duration curve.

In some implementations, the image capture apparatus, or the component thereof, may determine that current angular speed value is less than or equal to the defined low angular speed threshold, and determining whether the current angular speed value is equal to the defined medium angular speed threshold, determining whether the current angular speed value is equal to or greater than the defined high angular speed threshold, determining whether the current angular speed value is greater than the defined low angular speed threshold and less than the defined medium angular speed threshold, determining whether the current angular speed value is greater than the defined medium angular speed threshold and less than the defined high angular speed threshold, or a combination thereof may be omitted.

In some implementations, the image capture apparatus, or the component thereof, may determine that current angular speed value is equal to the defined medium angular speed threshold, and determining whether the current angular speed value is less than or equal to the defined low angular speed threshold, determining whether the current angular speed value is equal to or greater than the defined high angular speed threshold, determining whether the current angular speed value is greater than the defined low angular speed threshold and less than the defined medium angular speed threshold, determining whether the current angular speed value is greater than the defined medium angular speed threshold and less than the defined high angular speed threshold, or a combination thereof, may be omitted.

In some implementations, the image capture apparatus, or the component thereof, may determine that current angular speed value is equal to or greater than the defined high angular speed threshold and determining whether the current angular speed value is less than or equal to the defined low angular speed threshold, determining whether the current angular speed value is equal to the defined medium angular speed threshold, determining whether the current angular speed value is greater than the defined low angular speed threshold and less than the defined medium angular speed threshold, determining whether the current angular speed value is greater than the defined medium angular speed threshold and less than the defined high angular speed threshold, or a combination thereof, may be omitted.

In some implementations, the image capture apparatus, or the component thereof, may determine that current angular speed value is greater than the defined low angular speed threshold and less than the defined medium angular speed threshold and determining whether the current angular speed value is less than or equal to the defined low angular speed threshold, determining whether the current angular speed value is equal to the defined medium angular speed threshold, determining whether the current angular speed value is equal to or greater than the defined high angular speed threshold, determining whether the current angular speed value is greater than the defined medium angular speed threshold and less than the defined high angular speed threshold, or a combination thereof, may be omitted.

In some implementations, the image capture apparatus, or the component thereof, may determine that current angular speed value is greater than the defined medium angular speed threshold and less than the defined high angular speed threshold and determining whether the current angular speed value is less than or equal to the defined low angular speed threshold, determining whether the current angular speed value is equal to the defined medium angular speed threshold, determining whether the current angular speed value is equal to or greater than the defined high angular speed threshold, determining whether the current angular speed value is greater than the defined low angular speed threshold and less than the defined medium angular speed threshold, or a combination thereof, may be omitted.

Figure 12:
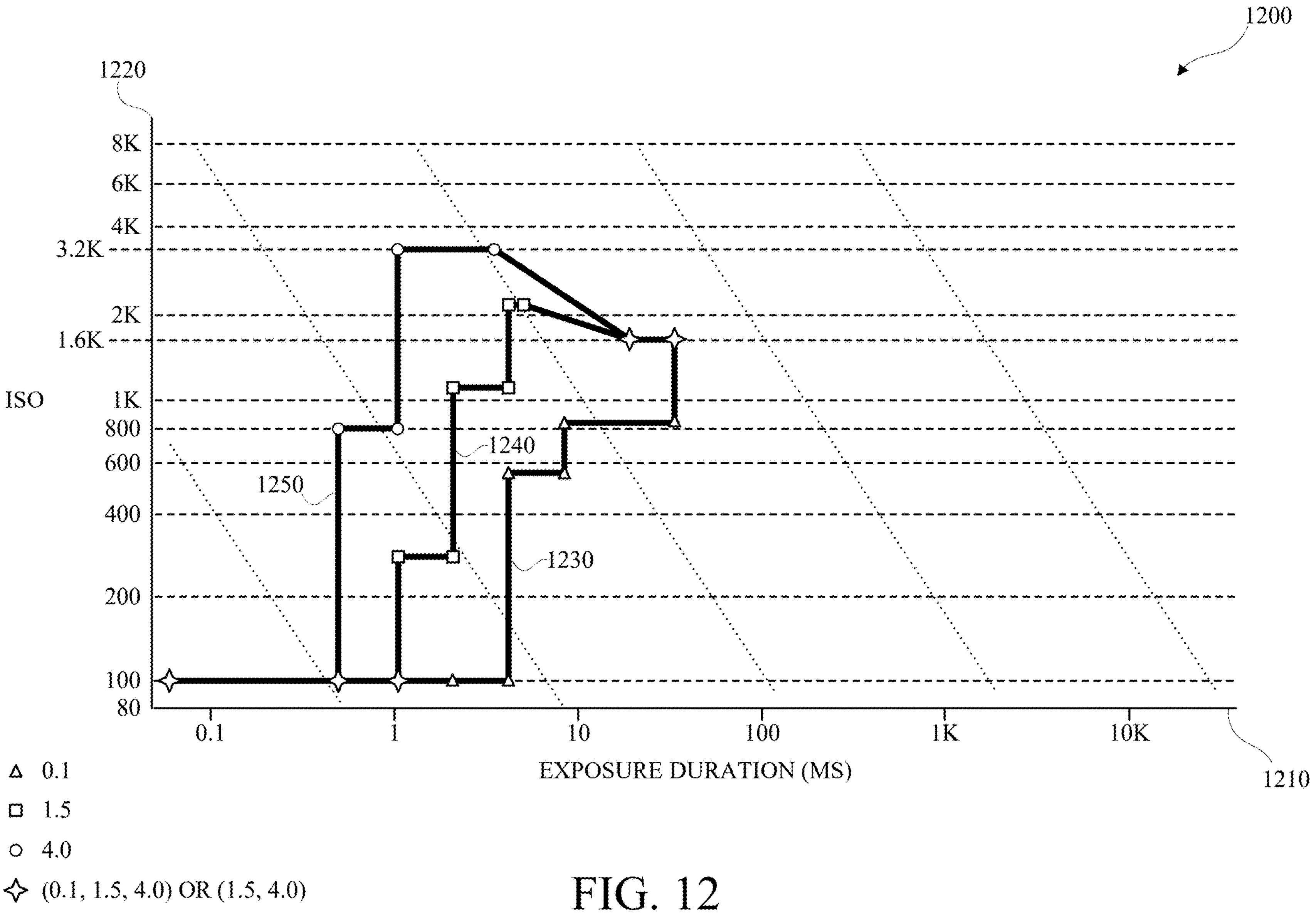
FIG. 12 is a graph of an example of updated current interpolated gain-exposure duration curves.

Obtaining the current interpolated gain-exposure duration curve includes obtaining the current interpolated gain-exposure duration curve using the current maximum gain. For example, the image capture apparatus, or a component thereof, may obtain the current interpolated gain-exposure duration curve using the current maximum gain subsequent to obtaining the current interpolated gain-exposure duration curve using the current angular speed value. Obtaining the current interpolated gain-exposure duration curve using the current maximum gain includes generating an updated current interpolated gain-exposure duration curve using the current maximum gain as a maximum gain for the updated current interpolated gain-exposure duration curve. Using the current maximum gain as the maximum gain for the updated current interpolated gain-exposure duration curve includes modifying the current interpolated gain-exposure duration curve using the current angular speed value by substituting the maximum gain from the current interpolated gain-exposure duration curve with the current maximum gain. Obtaining the current interpolated gain-exposure duration curve using the current maximum gain includes using the updated current interpolated gain-exposure duration curve as the current interpolated gain-exposure duration curve. An example showing updated current interpolated gain-exposure duration curves corresponding to the previously defined gain-exposure duration curves 700 shown in FIG. 7 is shown in FIG. 12.

Obtaining the target scene exposition data 1160 may be similar to obtaining a scene exposition value by the auto-exposure luminance determination component 530 shown in FIG. 5 or by the target exposure component 830 shown in FIG. 8, except as is described herein or as is otherwise clear from context. The target scene exposition data may include a target gain value (gain), a target exposure duration value (exposureDuration), or a combination or collection thereof. For example, the target scene exposition data may include a target scene exposition value (sceneExposition), which is a product of multiplying the target sensor gain value (gain) by the target exposure duration value (exposureDuration) (sceneExposition=gain*exposure Duration).

Obtaining the frame using the target scene exposition data 1170 includes controlling the image sensor of the image capture apparatus to capture the frame in accordance with the target scene exposition data. Obtaining the frame using the target scene exposition data 1170 includes outputting the frame for further processing, presentation to a user, inclusion in a current video, storage, or a combination thereof.

Adaptive acquisition control including limited luminance motion blur reduction 1100 improves video, or frame, quality by improving the balance between motion blur and signal-to-noise ratio relative to video capture that omits using limited luminance motion blur reduction 1100, or elements thereof. The use of the previously defined gain-exposure duration curves 700 shown in FIG. 7 for the adaptive acquisition control including limited luminance motion blur reduction 1100 is such that gain rises relatively rapidly in high angular speed conditions. The exposure duration for an exposure using limited luminance motion blur reduction 1100 may be, for example, one fourth, or more, the exposure duration for the exposure omitting using limited luminance motion blur reduction 1100, or elements thereof, significantly improving motion blur, which is proportional to exposure duration.

For example, the angular speed may be between zero and ten, the current luminance may be between $10^1$ lux and $10^2$ lux, and the reduction in exposure duration may be between one and 1.2. In another example, the angular speed may be between four and eight, the current luminance may be $10^3$ lux, and the reduction in exposure duration may be between 1.8 and 2.2.

FIG. 12 is a graph of an example of updated current interpolated gain-exposure duration curves 1200 corresponding to the previously defined gain-exposure duration curves 700 shown in FIG. 7, wherein the current maximum gain, such as the current maximum gain obtained as shown in FIG. 11 at 1130, is used as the maximum gain. The example of updated current interpolated gain-exposure duration curves 1200 shown in FIG. 12 includes a horizontal axis 1210 representing to exposure duration, expressed in milliseconds. The example of updated current interpolated gain-exposure duration curves 1200 shown in FIG. 12 includes a vertical axis 1220 representing to ISO value, corresponding to 100 times gain.

The example of updated current interpolated gain-exposure duration curves 1200 shown in FIG. 12 includes an updated current interpolated low angular speed gain-exposure duration curve 1230, corresponding to the previously defined low angular speed gain-exposure duration curve 730 shown in FIG. 7 updated in accordance with a current maximum gain, on which points are represented as triangles, corresponding to an angular speed of 0.1 radians per second (0.1 rad/s), which is a relatively low angular speed.

The example of updated current interpolated gain-exposure duration curves 1200 shown in FIG. 12 includes an updated current interpolated medium angular speed gain-exposure duration curve 1240, corresponding to the previously defined medium angular speed gain-exposure duration curve 740 shown in FIG. 7 updated in accordance with the current maximum gain, on which points are represented as squares, corresponding to an angular speed of 1.5 radians per second (1.5 rad/s), which is a relatively medium angular speed.

The example of updated current interpolated gain-exposure duration curves 1200 shown in FIG. 12 includes an updated current interpolated high angular speed gain-exposure duration curve 1250, corresponding to the previously defined high angular speed gain-exposure duration curve 750 shown in FIG. 7 updated in accordance with the current maximum gain, on which points are represented as circles, corresponding to an angular speed of 4.0 radians per second (4.0 rad/s), which is a relatively high angular speed.

For simplicity, stars are shown to represent locations where multiple points are overlapping or concurrent, such as a point of the updated current interpolated high angular speed gain-exposure duration curve 1250 that is concurrent with a point of the updated current interpolated medium angular speed gain-exposure duration curve 1240 and a point of the updated current interpolated low angular speed gain-exposure duration curve 1230 (0.1, 1.5, 4.0), or a point of the updated current interpolated high angular speed gain-exposure duration curve 1250 that is concurrent with a point of the updated current interpolated medium angular speed gain-exposure duration curve 1240 (1.5, 4.0).

The methods and techniques of adaptive acquisition control including limited luminance motion blur reduction described herein, or aspects thereof, may be implemented by an image capture apparatus, or one or more components thereof, such as the image capture apparatus 100 shown in FIGS. 1A-1B, the image capture apparatus 200 shown in FIG. 2A-2C, or the image capture apparatus 300 shown in FIG. 3. The methods and techniques of adaptive acquisition control including limited luminance motion blur reduction described herein, or aspects thereof, may be implemented by an image capture device, such as the image capture device 104 shown in FIGS. 1A-1B, one or more of the image capture devices 204, 206 shown in FIGS. 2A-2C, an image capture device of the image capture apparatus 300 shown in FIG. 3. The methods and techniques of adaptive acquisition control including limited luminance motion blur reduction described herein, or aspects thereof, may be implemented by an image processing pipeline, or one or more components thereof, such as the image processing pipeline 400 shown in FIG. 4.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An image capture apparatus comprising:

a non-transitory computer-readable medium; and a processor configured to execute instructions stored on the non-transitory computer-readable medium to:

obtain target scene exposition data including a target gain value and a target exposure duration value, wherein, to obtain the target scene exposition data, the processor is configured to execute the instructions to:

obtain a current scene luminance value;

obtain a current maximum exposure duration;

obtain a current maximum gain in accordance with the current scene luminance value, wherein, to obtain the current maximum gain, the processor is configured to execute the instructions to:

in response to a determination that the current scene luminance value is less than or equal to a first defined luminance threshold, use a first defined gain as the current maximum gain;

in response to a determination that the current scene luminance value is equal to or greater than a second defined luminance threshold, use a second defined gain as the current maximum gain; and in response to a determination that the current scene luminance value is greater than the first defined luminance threshold and is less than the second defined luminance threshold, interpolate the current maximum gain between the first defined gain and the second defined gain;

obtain a current angular speed value;

obtain a current interpolated gain-exposure duration curve in accordance with the current angular speed value and the current maximum gain; and obtain the target gain value and the target exposure duration value from the current interpolated gain-exposure duration curve in accordance with the current maximum exposure duration;

obtain a frame of a video in accordance with the target scene exposition data; and output the video.

2. The image capture apparatus of claim 1, wherein, to obtain the current maximum exposure duration, the processor is configured to execute the instructions to:

obtain the current maximum exposure duration in accordance with a current defined frame rate defined for the video.

3. The image capture apparatus of claim 2, wherein, to obtain the current maximum gain, the processor is configured to execute the instructions to:

determine that the current defined frame rate differs from a defined reference frame rate; and in response to a determination that the current defined frame rate differs from the defined reference frame rate:

obtain, as a normalized first defined luminance threshold, a product of multiplication of the first defined luminance threshold by a result of division of the defined reference frame rate by the current defined frame rate;

use the normalized first defined luminance threshold as the first defined luminance threshold;

obtain, as a normalized second defined luminance threshold, a product of multiplication of the second defined luminance threshold by the result of division of the defined reference frame rate by the current defined frame rate; and use the normalized second defined luminance threshold as the second defined luminance threshold.

4. The image capture apparatus of claim 1, wherein, to obtain the target scene exposition data, the processor is configured to execute the instructions to:

obtain a product of multiplication of the target gain value by the target exposure duration value as a target scene exposition value.

5. The image capture apparatus of claim 1, wherein, to obtain the current interpolated gain-exposure duration curve, the processor is configured to execute the instructions to:

obtain the current interpolated gain-exposure duration curve based on at least one of a first previously defined gain-exposure duration curve, a second previously defined gain-exposure duration curve, or a third previously defined gain-exposure duration curve.

6. The image capture apparatus of claim 5, wherein, to obtain the current interpolated gain-exposure duration curve, the processor is configured to execute the instructions to:

obtain the current interpolated gain-exposure duration curve in accordance with the current angular speed value by:

in response to a determination that the current angular speed value is less than or equal to a defined low angular speed threshold, use the first previously defined gain-exposure duration curve as the current interpolated gain-exposure duration curve;

in response to a determination that the current angular speed value is greater than the defined low angular speed threshold and less than a defined medium angular speed threshold, interpolate the current interpolated gain-exposure duration curve between the first previously defined gain-exposure duration curve and the second previously defined gain-exposure duration curve;

in response to a determination that the current angular speed value is equal to the defined medium angular speed threshold, use the second previously defined gain-exposure duration curve as the current interpolated gain-exposure duration curve;

in response to a determination that the current angular speed value is greater than the defined medium angular speed threshold and less than a defined high angular speed threshold, interpolate the current interpolated gain-exposure duration curve between the second previously defined gain-exposure duration curve and the third previously defined gain-exposure duration curve; and in response to a determination that the current angular speed value is equal to or greater than the defined high angular speed threshold, use the third previously defined gain-exposure duration curve as the current interpolated gain-exposure duration curve.

7. The image capture apparatus of claim 5, wherein, to obtain the current interpolated gain-exposure duration curve, the processor is configured to execute the instructions to:

obtain the current interpolated gain-exposure duration curve in accordance with the current maximum gain, wherein, to obtain the current interpolated gain-exposure duration curve in accordance with the current maximum gain, the processor is configured to execute the instructions to:

subsequent to obtaining the current interpolated gain-exposure duration curve in accordance with the current angular speed value:

generate an updated current interpolated gain-exposure duration curve in accordance with the current maximum gain as a maximum gain for the updated current interpolated gain-exposure duration curve; and use the updated current interpolated gain-exposure duration curve as the current interpolated gain-exposure duration curve.

8. The image capture apparatus of claim 1, wherein the processor is further configured to execute instructions to:

obtain, by a target exposure component of the image capture apparatus, a target exposure value for processing the frame;

obtain, by an aggregate gain component of the image capture apparatus, a target aggregate gain value and a remaining gain value for processing the frame;

obtain, by an auto-exposure compensation component of the image capture apparatus, an auto-exposure compensation tone curve and an auto-exposure compensation gain value for processing the frame, in accordance with the target scene exposition data;

obtain, by a contrast control component of the image capture apparatus, a contrast control tone curve and a contrast control black point value for processing the frame;

obtain, by a tone control driver of the image capture apparatus, a tone control tone curve and a tone control black point value for processing the frame, in accordance with the target scene exposition data;

process the frame in accordance with the tone control tone curve and the tone control black point value to obtain a processed frame; and include the processed frame in the video.

9. An image capture apparatus comprising:

a non-transitory computer-readable medium; and a processor configured to execute instructions stored on the non-transitory computer-readable medium to:

obtain, by a target exposure component of an image capture apparatus, a target gain value and a target exposure duration value, wherein, to obtain the target gain value and the target exposure duration value, the processor is configured to execute the instructions to:

obtain a current scene luminance value;

obtain a current maximum gain in accordance with the current scene luminance value;

obtain a current interpolated gain-exposure duration curve in accordance with the current maximum gain and a current angular speed value; and obtain the target gain value and the target exposure duration value from the current interpolated gain-exposure duration curve in accordance with a current maximum exposure duration;

obtain a frame of a video in accordance with the target gain value and the target exposure duration value; and output the video.

10. The image capture apparatus of claim 9, wherein, to obtain the current maximum gain, the processor is configured to execute the instructions to:

in response to a determination that the current scene luminance value is less than or equal to a first defined luminance threshold, use a first defined gain as the current maximum gain;

in response to a determination that the current scene luminance value is equal to or greater than a second defined luminance threshold, use a second defined gain as the current maximum gain; and in response to a determination that the current scene luminance value is greater than the first defined luminance threshold and is less than the second defined luminance threshold, interpolate the current maximum gain between the first defined gain and the second defined gain.

11. The image capture apparatus of claim 10, wherein, to obtain the target gain value and the target exposure duration value, the processor is configured to execute the instructions to:

obtain the current maximum exposure duration.

12. The image capture apparatus of claim 11, wherein, to obtain the current maximum exposure duration, the processor is configured to execute the instructions to:

obtain the current maximum exposure duration in accordance with a current defined frame rate defined for the video.

13. The image capture apparatus of claim 12, wherein, to obtain the current maximum gain, the processor is configured to execute the instructions to:

determine that the current defined frame rate differs from a defined reference frame rate; and in response to a determination that the current defined frame rate differs from the defined reference frame rate:

obtain, as a normalized first defined luminance threshold, a product of multiplication of the first defined luminance threshold by a result of division of the defined reference frame rate by the current defined frame rate;

use the normalized first defined luminance threshold as the first defined luminance threshold;

obtain, as a normalized second defined luminance threshold, a product of multiplication of the second defined luminance threshold by the result of division of the defined reference frame rate by the current defined frame rate; and use the normalized second defined luminance threshold as the second defined luminance threshold.

14. The image capture apparatus of claim 9, wherein, to obtain the target gain value and the target exposure duration value, the processor is configured to execute the instructions to:

obtain, as a target scene exposition value, a product of multiplication of the target gain value by the target exposure duration value.

15. The image capture apparatus of claim 9, wherein, to obtain the current interpolated gain-exposure duration curve, the processor is configured to execute the instructions to:

obtain the current interpolated gain-exposure duration curve based on at least one of a first previously defined gain-exposure duration curve, a second previously defined gain-exposure duration curve, or a third previously defined gain-exposure duration curve.

16. The image capture apparatus of claim 15, wherein, to obtain the current interpolated gain-exposure duration curve, the processor is configured to execute the instructions to:

obtain the current interpolated gain-exposure duration curve in accordance with the current angular speed value by:

in response to a determination that the current angular speed value is less than or equal to a defined low angular speed threshold, use the first previously defined gain-exposure duration curve as the current interpolated gain-exposure duration curve;

in response to a determination that the current angular speed value is greater than the defined low angular speed threshold and less than a defined medium angular speed threshold, interpolate the current interpolated gain-exposure duration curve between the first previously defined gain-exposure duration curve and the second previously defined gain-exposure duration curve;

in response to a determination that the current angular speed value is equal to the defined medium angular speed threshold, use the second previously defined gain-exposure duration curve as the current interpolated gain-exposure duration curve;

in response to a determination that the current angular speed value is greater than the defined medium angular speed threshold and less than a defined high angular speed threshold, interpolate the current interpolated gain-exposure duration curve between the second previously defined gain-exposure duration curve and the third previously defined gain-exposure duration curve; and in response to a determination that the current angular speed value is equal to or greater than the defined high angular speed threshold, use the third previously defined gain-exposure duration curve as the current interpolated gain-exposure duration curve.

17. The image capture apparatus of claim 15, wherein, to obtain the current interpolated gain-exposure duration curve, the processor is configured to execute the instructions to:

obtain the current interpolated gain-exposure duration curve in accordance with the current maximum gain, wherein, to obtain the current interpolated gain-exposure duration curve in accordance with the current maximum gain, the processor is configured to execute the instructions to:

subsequent to obtaining the current interpolated gain-exposure duration curve in accordance with the current angular speed value:

generate an updated current interpolated gain-exposure duration curve in accordance with the current maximum gain as a maximum gain for the updated current interpolated gain-exposure duration curve; and use the updated current interpolated gain-exposure duration curve as the current interpolated gain-exposure duration curve.

18. The image capture apparatus of claim 9, wherein the processor is further configured to execute instructions to:

obtain, by a target exposure component of the image capture apparatus, a target exposure value for processing the frame;

obtain, by an aggregate gain component of the image capture apparatus, a target aggregate gain value and a remaining gain value for processing the frame;

obtain, by an auto-exposure compensation component of the image capture apparatus, an auto-exposure compensation tone curve and an auto-exposure compensation gain value for processing the frame, in accordance with the target gain value and the target exposure duration value;

obtain, by a contrast control component of the image capture apparatus, a contrast control tone curve and a contrast control black point value for processing the frame;

obtain, by a tone control driver of the image capture apparatus, a tone control tone curve and a tone control black point value for processing the frame, in accordance with the target gain value and the target exposure duration value;

process the frame in accordance with the tone control tone curve and the tone control black point value to obtain a processed frame; and include the processed frame in the video.

19. A non-transitory computer-readable storage medium having stored thereon executable instructions that, when executed by one or more processors of an image capture apparatus, cause the image capture apparatus to:

obtain, by a target exposure component of the image capture apparatus, first target scene exposition data including a first target exposure duration value and a first target sensor gain value;

access, by the target exposure component, a first input frame of a video captured by an image sensor of the image capture apparatus in accordance with a defined frame rate, an adaptive acquisition control sample rate that is one third of the defined frame rate, and the first target scene exposition data;

obtain, by the target exposure component, in accordance with the first target scene exposition data and the first input frame, second target scene exposition data including a second target exposure duration value and a second target sensor gain value, wherein to obtain the second target scene exposition data the executable instructions include instructions that, when executed by the one or more processors, cause the image capture apparatus to:

obtain a current scene luminance value in accordance with the first input frame;

obtain a current maximum gain using the current scene luminance value;

obtain a current interpolated gain-exposure duration curve using the current maximum gain and angular speed data corresponding to capturing the first input frame; and obtain the second target sensor gain value and the second target exposure duration value from the current interpolated gain-exposure duration curve in accordance with a current maximum exposure duration; and access, by the target exposure component, a second input frame of the video captured by the image sensor of the image capture apparatus in accordance with the defined frame rate, the second target exposure duration value, and the second target sensor gain value.

20. The non-transitory computer-readable storage medium of claim 19, wherein to obtain the current maximum gain the executable instructions include instructions that, when executed by the one or more processors, cause the image capture apparatus to:

in response to a determination that the current scene luminance value is less than or equal to a first defined luminance threshold, use a first defined gain as the current maximum gain;

in response to a determination that the current scene luminance value is equal to or greater than a second defined luminance threshold, use a second defined gain as the current maximum gain; and in response to a determination that the current scene luminance value is greater than the first defined luminance threshold and is less than the second defined luminance threshold, interpolate the current maximum gain between the first defined gain and the second defined gain.

* * * * *